(12) United States Patent
Davis et al.

(10) Patent No.: US 10,997,843 B2
(45) Date of Patent: *May 4, 2021

(54) IMPACT FORCE ESTIMATION AND EVENT LOCALIZATION

(71) Applicant: UNIVERSITY OF SOUTH CAROLINA, Columbia, SC (US)

(72) Inventors: Benjamin Davis, Columbia, SC (US); Juan M. Caicedo, Columbia, SC (US)

(73) Assignee: University of South Carolina, Columbia, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/996,200

(22) Filed: Aug. 18, 2020

(65) Prior Publication Data
US 2020/0380841 A1    Dec. 3, 2020

Related U.S. Application Data

(63) Continuation of application No. 15/491,084, filed on Apr. 19, 2017, now Pat. No. 10,783,764.
(Continued)

(51) Int. Cl.
| | |
|---|---|
| *G08B 21/04* | (2006.01) |
| *G01L 5/00* | (2006.01) |
| *G01N 29/48* | (2006.01) |
| *G08B 25/08* | (2006.01) |
| *G01N 29/14* | (2006.01) |

(Continued)

(52) U.S. Cl.
CPC ............ *G08B 21/043* (2013.01); *G01H 1/08* (2013.01); *G01L 5/0052* (2013.01); *G01N 29/045* (2013.01); *G01N 29/14* (2013.01); *G01N 29/4427* (2013.01); *G01N 29/48* (2013.01); *G08B 25/08* (2013.01)

(58) Field of Classification Search
CPC ..... G08B 21/043; G08B 25/08; G01L 5/0052; G01N 29/045; G01N 29/14; G01N 29/4427; G01N 29/48
See application file for complete search history.

(56) References Cited

U.S. PATENT DOCUMENTS

| | | | |
|---|---|---|---|
| 7,693,668 B2 | 4/2010 | Vock et al. | |
| 10,783,764 B2 * | 9/2020 | Davis | G01N 29/48 |

OTHER PUBLICATIONS

Balbinot et al. "Measurement of Transmissibility on Individuals" IEEE Int'l. Instrum. Meas. Techn. Conf. (2013) pp. 1-5.
(Continued)

*Primary Examiner* — Toan M Le
(74) *Attorney, Agent, or Firm* — Dority & Manning, P.A.

(57) ABSTRACT

An impact detection methodology is disclosed. Systems and methods can be utilized to detect impacts of concern such as collisions, falls, or other incidents. Systems and methods can be utilized to monitor an area and detect falls or collisions of an individual, for instance, as may require intervention to aid the subject. A system can include two or more accelerometers and a controller. The accelerometers can be in communication with the structure (e.g., within or on the walls or floor of a structure) and can monitor the structure for vibrations. The accelerometers can be coupled to a controller that is configured to process data obtained from the accelerometers and provide output with regard to the force and/or location of an impact within the structure.

24 Claims, 48 Drawing Sheets

Related U.S. Application Data

(60) Provisional application No. 62/324,468, filed on Apr. 19, 2016.

(51) Int. Cl.
*G01N 29/44* (2006.01)
*G01H 1/08* (2006.01)
*G01N 29/04* (2006.01)

(56) References Cited

OTHER PUBLICATIONS

Bendat et al. "Random Data: Analysis and Measurement Procedures" *John Wiley and Sons Inc.* (2000).
Chameau, et al. "Measurement and Analysis of Civil Engineering Vibrations" *Proc. 4th Int'l. Conf. Case Hist. Geotech. Eng.* (1998) pp. 1-13.
Davis, et al. "Use of Wireless Smart Sensors for Detecting Human Falls through Structural Vibrations" *Proc. Soc. Exp. Mech. Ser.* (2011) pp. 1-7.
Erwins, D.J. "Modal Testing: Theory, Practice and Application" *Research Studies Press Ltd.* (2003).
Ganz, et al. "Will my patient fall?" *JAMA* 297 (2007) pp. 77-86.
Pastor et al. "Modal Assurance Criterion" *Proc. Eng.* 48 (2012) pp. 543-548.
Yi, et al. "Study on Car Body Vibration Transmissibility Analysis Approach for Railway Passenger Carriage" *IEEE* (2011) pp. 5281-5284.

\* cited by examiner

IMPACT FORCE ESTIMATION AND EVENT LOCALIZATION

CROSS REFERENCE TO RELATED APPLICATION

This application is a continuation application of U.S. patent application Ser. No. 15/491,084, now U.S. Pat. No. 10,783,764, having a filing date of Apr. 19, 2017, which claims filing benefit of U.S. Provisional Patent Application Ser. No. 62/324,468, having a filing date of Apr. 19, 2016, both of which are incorporated herein by reference.

GOVERNMENT SUPPORT CLAUSE

This invention was made with government support under DGE-1450810, awarded by the National Science Foundation. The government has certain rights in the invention.

BACKGROUND

One of the leading causes of death among the elderly, accounting for more than 50% of all injury-related deaths, is quite simply—a fall. It is estimated that ⅓ of individuals 65 years or older will fall in any given year, with 5 to 10% of those falls resulting in a major injury and about 40% of falls resulting in permanent reduction in activity. One of the more serious results of falls in the elderly is hip fracture. Of those 65 or over that suffer a hip fracture, about 50% will require residence in a full-time care facility following the fall, and about 50% will die within one year. Falls can also be symptomatic of more serious conditions such as dementia, hypothermia, and pneumonia, and undetected falls can delay diagnosis of such serious underlying conditions.

Strides in the field of fall detection have been made producing products such as the Life Alert® pendant and other individual-worn devices, use of which allows a wearer to summon help following a fall. Such products do not provide an ideal solution, however, as they rely on the wearer's cooperation in wearing the device, as well as requiring the wearer to maintain the ability to summon help by use of the device when needed. Other approaches to fall detection such as camera monitoring, the use of full-time care givers, moving in with family members, or even use of restraints have been utilized, but these approaches involve a loss of privacy and independence that is not desirable for many at-risk individuals and can be extremely expensive.

An ideal fall detection system would monitor environmental signals that are independent of cooperation from the at-risk individual(s). Such an approach could reduce the risk of missing an event as can occur with previously known approaches in those instances in which an individual is not wearing the sensor or is rendered incapable of response due to the event. Moreover, an environmental-based system could be used to monitor an entire area, rather than be limited to single or select individuals, and thus could provide protection for all individuals within the monitored area and not be limited to protection of only those individuals previously considered to be at-risk. Unfortunately, environmental monitoring has presented challenges due to a variety of factors, one of which being that the response of sensors varies depending upon the distance between the sensor and the impact event. As such, adequate sensor coverage of an area of any size has proven difficult.

What are needed in the art are effective non-intrusive, patient-independent systems and methods for fall detection.

SUMMARY

According to one embodiment, disclosed is a method for detecting an impact within or on a structure (e.g., a room, apartment, vehicle, building, bridge, etc.). A method can include monitoring a first sensor (e.g., an accelerometer, a motion sensor, etc.) that is in communication with the structure (e.g., within or on a wall, floor, or ceiling of a structure). The first sensor can provide a first response to a controller. Analysis of the first response can be utilized to determine that structural vibrations as measured at the first sensor meet or exceed a predetermined first signal (e.g., a predetermined threshold amplitude). A second sensor can also be monitored, and the second sensor can provide a second response to the controller. Analysis of the second response can likewise be utilized to determine that structural vibrations as measured at the second sensor meet or exceed a predetermined second signal (which can be the same signal type and same signal metric as the first sensor, or different, as desired). A method can also include normalizing the first response and the second response according to first and second transfer functions, respectively, e.g., when both the first and second responses meet or exceed their respective signals. Comparison of the first and second normalized responses can then be utilized to determine the location and/or force of an impact within or on the structure.

In one embodiment, the method can utilize additional sensors, which can decrease the margin of error in determination of the force and/or location of an impact within or on a structure.

A method can also include communicating the impact determination results to a designated party so as to, e.g., inform a first responder that a potential emergency situation such as a fall has occurred within or on the structure.

Also disclosed are systems for use in detecting an impact within or on a structure. For instance, a system can include two or more sensors configured for placement in mechanical communication with a structure. In addition, a system can include a controller that is configured for communication with the sensors and is also configured to process the signal responses of the sensors. Upon detection of an impact, a controller can also be configured to communicate information regarding the impact (e.g., the location and/or the force of impact) to a second location, e.g., an emergency first responder.

BRIEF DESCRIPTION OF THE DRAWINGS

The present invention may be better understood with reference to the accompanying figures, in which.

DETAILED DESCRIPTION

Figure 1:
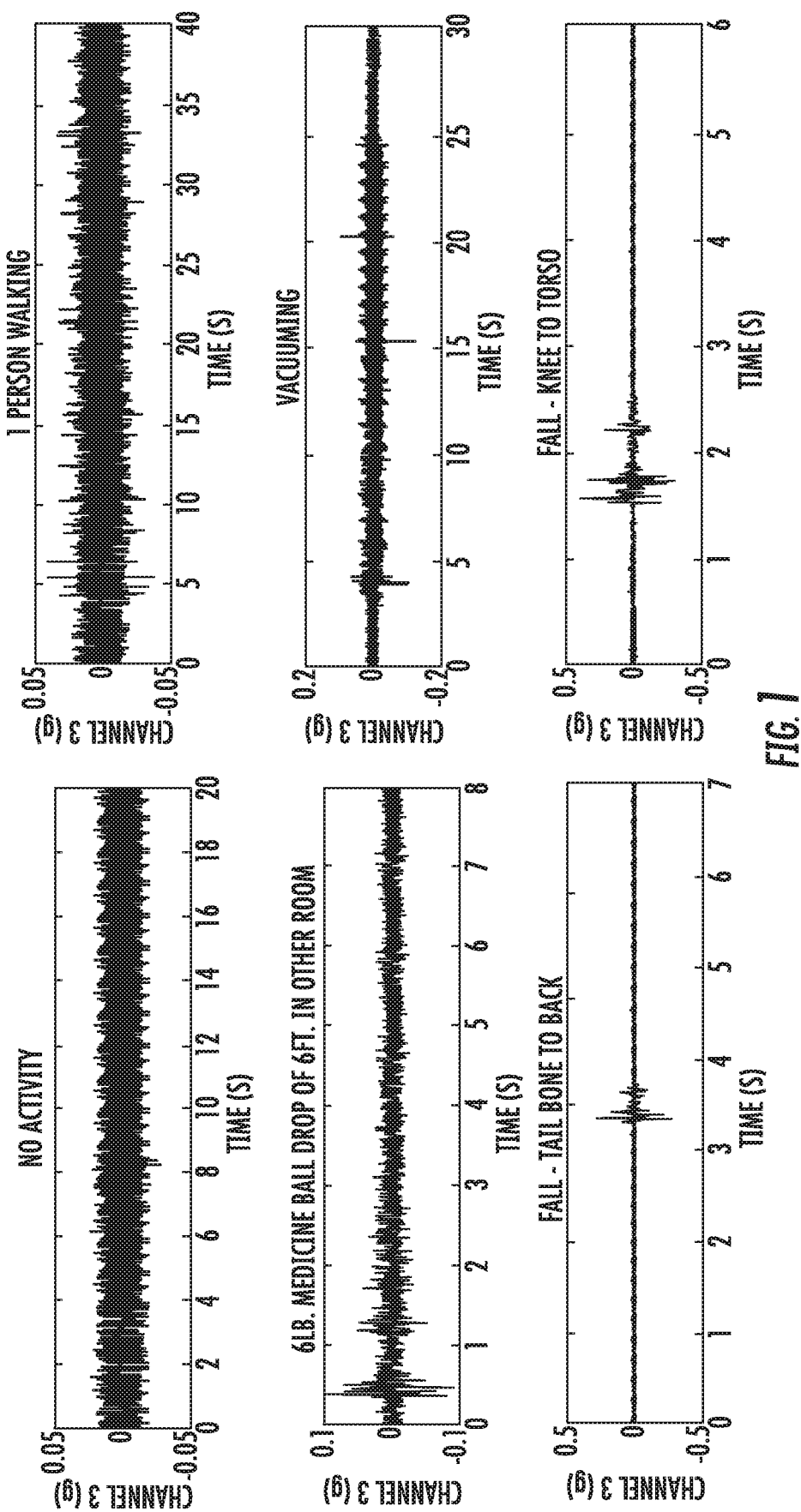
FIG. 1 demonstrates accelerometer vibrational response under several different conditions.

The following description and other modifications and variations to the presently disclosed subject matter may be practiced by those of ordinary skill in the art, without departing from the spirit and scope of the present invention. In addition, it should be understood that aspects of the various embodiments may be interchanged both in whole and in part. Furthermore, those of ordinary skill in the art will appreciate that the following description is by way of example only, and is not intended to limit the disclosed subject matter.

In general, disclosed herein are methods and systems for use in detecting impacts in or on a structure. Systems and methods can be utilized to detect impacts of concern such as collisions, falls, or other accidents. In one particular embodiment, systems and methods can be utilized to monitor an area and detect falls or collisions of an individual; for instance, as may require intervention to aid the subject.

A system can include two or more sensors and a controller. The sensors can be in communication with the structure (e.g., within or on the walls, ceiling, floor, or other surface of a structure) and can monitor the structure for structural vibrations that indicate a collision. For example, in one embodiment, a system can incorporate two or more accelerometers as sensors and the structure can be monitored for structural vibrations that indicate a collision.

While the following discussion is primarily directed to utilization of accelerometers as sensors, it should be understood that the system is not limited to accelerometers as the sensors. For instance, in other embodiments a system can be designed to indicate a collision based on data from a motion sensor or other presence sensor. In some embodiments, a system can include multiple different types of sensors, e.g., both motion sensors and accelerometers, and the system can utilize the different types of sensors simultaneously or at different times, and in the same or different locations, as desired. In any case, the sensors can monitor the structure for structural vibrations within/on the structure and can communicate a sensor response to a controller. Analysis of the sensors' responses can indicate a collision within/on the structure when a response signal meets or exceeds a predetermined value at one or more of the sensors. The signal type can depend upon the sensor type, as well as other design parameters of the system. For instance, the signal can be the crossing of a threshold value, a pattern recognition in the time domain or frequency domain, or any other representation of the response the sensors are providing.

Similarly, the metric utilized to determine when the response meets or exceeds the predetermined signal value can vary. Moreover, the signal indication can be based on a single metric or combination of metrics. When considering a threshold-type response, for instance, the threshold value indication can include, without limitation, response amplitude, response energy, zero-crossing rate, etc. Threshold amplitude can be the most common metric for determination of a collision as this metric determination can be relatively simple to implement, particularly when accelerometers are utilized as the sensors. In any case, a system processor (e.g., a component of a controller) can process the responses obtained from the sensors to recognize the predetermined signal metric value and provide output with regard to the force and/or location of an impact within/on the structure.

In exemplary embodiments, a system may be utilized to detect impacts within/on a building or a vehicle. By way of example, a system may be utilized to detect impacts such as due to a person falling or colliding within a single room, e.g., a bedroom, a hotel room, a hospital room, an office etc., or within a group of rooms, e.g., an apartment, an office suite, a house, a hospital wing, etc. In one embodiment, a system can be utilized to detect an impact in a vehicle including, without limitation, a car, a train, a boat, an airplane, etc. Disclosed systems and methods are not limited to such structures, however, and can also be utilized in conjunction with bridges, sidewalks, roads, etc.

One positive aspect of the system is that it can provide effective monitoring of an area without the need for a person within the area to wear or carry a device. Thus, an area can be monitored for falls, collisions, etc. constantly without the need for any individuals in the area to interact with any components of the system. This can provide a route for monitoring the safety of individuals in an area while maintaining privacy and independence of the individuals. Moreover, the methods and systems can be battery-free and can utilize wireless communications, and as such, can be worry-free for both the at-risk individuals and the caregiver.

Upon recognition of an impact event, the systems can provide for rapid response by parties through automatic notification of an event by the systems. This can improve quality of care for the at-risk individuals through not only rapid response and treatment of any direct consequences of the impact event (e.g., the fall) but also through quicker recognition and diagnosis of any underlying causes of the fall, e.g., dementia, dehydration, etc.

Devices and methods disclosed herein are based upon the realization that an impact can have a unique vibrational signature depending upon the force and the location of the impact with respect to the sensor that recognizes the vibrational response to the impact. For instance, the vibrational response of a fall is distinct from other vibration inducing activities. By way of example, FIG. 1 illustrates the vibrational response of an accelerometer in contact with a floor to a variety of different events including no activity, one person walking across the floor, a 6-pound ball dropped on to the floor in an adjacent room, a person vacuuming the floor, a person falling from tail bone to back, and a person falling from knee to torso. As can be seen, not only does each event demonstrate a recognizable signature, but the two different types of falls also demonstrate a different and recognizable signature from one another.

Difficulties in environmental monitoring that can be overcome by the disclosed methods and systems include the ability to recognize parameters such as distances between the event, e.g., an impact caused by a fall, and the sensors and the ability to recognize physical characteristics (e.g., size) of the object colliding with the structure that induces the sensor response. These difficulties have in the past made any sort of system calibration an impractical task. The disclosed method removes these difficulties by normalizing the structural vibration response through individual sensor transfer functions that relate the input to the structural system (a force) to output (structural vibrations). Taking only the recognized vibrations and a transfer function, the impact can be reverse engineered to provide the force induced on the structure and the location of the force within the structure. When considering a potential fall, this can therefore provide information with regard to the force experienced by a subject and the location of the fall.

Prior to use in detecting an impact, each sensor of a system can be calibrated for the particular location within an interrogation area at which it will be placed during use. The calibration process can include determination of the typical signal under normal activity at each location. This can provide a predetermined signal value for use during processing. For instance, during processing, a signal below the predetermined threshold value can be disregarded as not being an impact of concern. During use, the processing can include determination as to whether or not the response signals obtained are below or above the threshold value (e.g., a threshold amplitude value) and also whether or not the signals define an impact (e.g., a fall) or merely a typical activity (e.g., walking, cleaning, etc.)

The calibration process can also yield a transfer function for each sensor of the system. More specifically, a calibration process can include determining the relationship between of an impact force as measured at a known location in the interrogation area with the vibrational response to the impact at the sensor (e.g., the accelerometer) and by use of that force measurement, determination of a particular transfer function for that particular sensor.

As a component of the calibration of each sensor and prior to determination of the transfer function, it may be desirable to preprocess the data that is utilized to determine the transfer function. Data preprocessing may include applying frequency filters, waveform selection, or other techniques/methods as are known in the art. In some cases, this may improve the descriptive capability of the transfer function and thereby also increase the accuracy of results during use.

Following calibration and during operation, the force of impact and/or event localization causing a sensed structural vibration as detected by a first sensor can be estimated for each of a plurality of locations within the area using the inverse transfer function of that first sensor with the sensed data. In some embodiments, the raw data obtained by the sensors can be preprocessed prior to normalization by the transfer function that is used to perform force estimation and/or event localization operations. For instance, the raw data can be preprocessed via application of frequency filters, waveform selection, or other techniques/methods as are known in the art to provide sensed data that can then be normalized by the transfer function of a sensor.

Following force estimation and/or event localization using the inverse transfer function of a first sensor with the sensed data (either raw data or preprocessed data), the same estimation process for each of the plurality of locations can then be carried out for every other sensor of the interrogation area using the transfer function for each of those other sensors with the sensed data. To identify the force and/or location of an impact within the area, the estimation results from all of the sensors are compared. The detected impact force and/or location can then be identified as that impact estimate that demonstrates the greatest agreement in the data from the different sensors.

During the calibration process, force data and resulting vibrations can be recorded at the same sampling rate at each sensor for use in determining the transfer functions. By way of example, a first transfer function for a first accelerometer is presented in Equation (1) in which x is input (force), y is output (accelerations), $T_{xy}(f)$ is the transfer function of x to y, $P_{xy}(f)$ is the cross power spectral density of x to y, and $P_{xx}(f)$ is the power spectral density of x:

$$T_{xy}(f) = \frac{P_{xy}(f)}{P_{xx}(f)} \quad (1)$$

To improve the accuracy of the transfer function for the accelerometer, a second transfer function can be determined for the accelerometer as well. A second transfer function is presented in Equation (2) in which x is input (force), y is output (accelerations), $T_{yx}(f)$ is the transfer function of y to x, $P_{yx}(f)$ is the cross power spectral density of y to x, and $P_{yy}(f)$ is the power spectral density of y:

$$T_{yx}(f) = \frac{P_{yy}(f)}{P_{yx}(f)} \quad (2)$$

According to this embodiment, the transfer function to be used for the accelerometer can be obtained by averaging Equation (2) and Equation (1) together point by point as in Equation (3) below in which $\hat{T}(f)$ is the transfer function estimate and i is the index. This can be done to reduce the amount of noise and measurement error present if only a single transfer function were considered.

$$\hat{T}(f) = \frac{T_{xy}(f) + T_{yx}(f)}{2} \quad (3)$$

Figure 2:
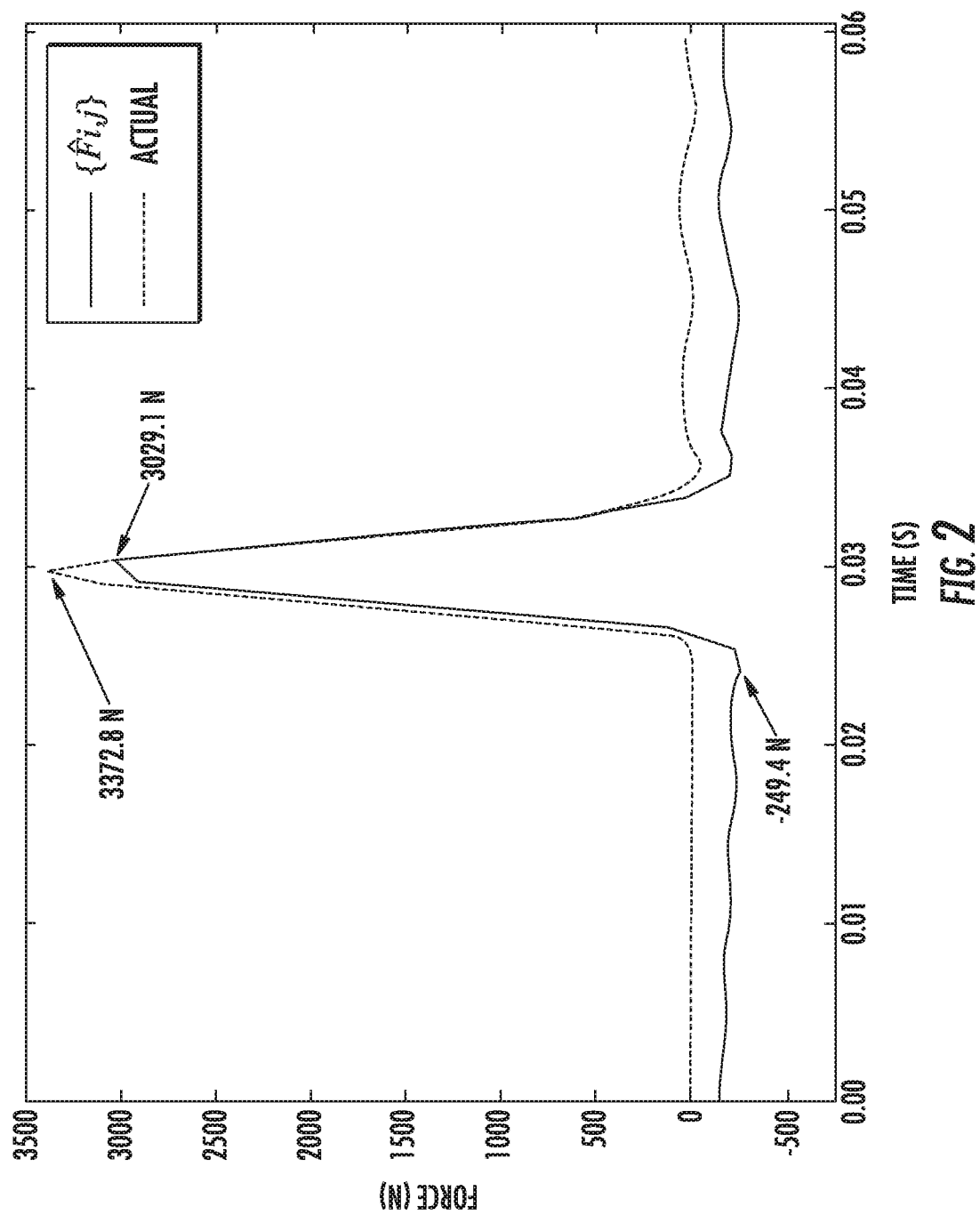
FIG. 2 graphically demonstrates a method for calculation of a force magnitude estimate and comparison of estimated values to actual measured force values.

To estimate the force at each location, the acceleration signal window S can be taken and the $\hat{T}(f)$ transfer function can be applied for each calibrated location as seen in the following:

$$[I_{i,j}] = \frac{FFT(S)}{[\hat{T}_{i,j}(f)]} \quad (4)$$

$$[\hat{F}_{i,j}] = IFFT([I_{i,j}]) \quad (5)$$

in which FFT is the Fast Fourier Transform (note that the same nFFT value (the number of points in the FFT window) is used for each part of the algorithm, but different nFFT values could alternatively be used), S is a recorded signal, IFFT( ) is the Inverse Fast Fourier Transform, $\hat{F}_{i,j}$ is the force estimation vector for the $i^{th}$ location and $j^{th}$ sensor. The force estimation magnitude of the $i^{th}$ location and $j^{th}$ sensor $j^{th}$ sensor is thus:

$$\hat{F}_{i,j} = \max(\{F_{i,j}\}) - \min(\{F_{i,j}\}) \quad (6)$$

in which $\hat{F}_{i,j}$ is the force estimation vector for the $i^{th}$ location and $j^{th}$ sensor produced from Equation (5), max( ) is the maximum value function, and min( ) is the minimum value function. The maximum and minimum values are taken based on the peak located within the force estimate as illustrated in FIG. 2. This accounts for bias in the force estimate and increases the accuracy of the force estimate.

The center of the response peak can be located using the relationships presented in Equation (8) for the index, and Equation (9) for the time (below). The force magnitude for the specific acceleration event can be assumed to be the average of those sensors' force estimation magnitudes for which the force estimation vectors more closely agree as seen in Equation (7) where $\hat{F}_{i,1}$ and $\hat{F}_{i,2}$ are the two sensor force estimate magnitudes that most closely match relative to other pairings $$\hat{F} = \frac{\hat{F}_{i,1} + \hat{F}_{i,2}}{2} \quad (7)$$

In one embodiment, the force magnitude calculation can be carried out after the location of impact has been discerned using techniques such as described below.

Event localization requires utilization of at least two sensors. While the present disclosure is not to be considered to be limited to the particular methods described herein, the presented methods have been found to be robust due to redundancy, with reliability increasing with the use of additional sensors.

A Correlated Force Estimates Method can begin by determining the window of the force estimation to be considered based on the maximum peak within the acceleration window. The absolute values of each point within the acceleration window can be considered so as to eliminate challenges with sensor orientation relative to the impact. In one embodiment, a threshold crossing method can be utilized to select an index within the force estimate. For example, the index of the acceleration window can be taken at that point at which the signal first crosses out of the "noise" range.

Beneficially, the relationship between the index of the acceleration window and that of the force estimation window can remain the same regardless of the index choosing method. Equation (8) contains this relationship wherein $i_F$ the index in the force estimate, $i_S$ is the index within the acceleration window (e.g., the maximum amplitude), $n_{FFT}$ is the number of points in the FFT window, and $n_S$ is the number of points in the acceleration window.

$$i_{\hat{F}} = \frac{i_S \cdot n_{FFT}}{2 \cdot n_S} \quad (8)$$

Equation 9 can be easily converted into time $t_{\hat{F}}$ using the sampling frequency $f_s$ as seen in Equation (9).

$$i_{\hat{F}} = \frac{i_{\hat{F}}}{f_s} \quad (9)$$

Symmetrical or asymmetrical windows about the peak may be used. The windows may be taken on a per sensor basis, by choosing one sensor as a reference and using its index for all of the sensors, or any combination thereof. In one embodiment, a symmetrical window based on using one sensor as a reference can be used, as the method can be time-independent and the force estimates at each sensor can show peaks at the same index across all estimates, with the method being based on the shape of the peak in the force estimates, making a symmetrical window a good option for capturing the similarity of symmetrical peaks. The force estimates typically maintain a similar shape at the location of impact which lends localization towards this method.

After window selection is done, a Pearson product-moment correlation coefficient matrix can be formed using only the real portion of the force estimate as in Equation (10) in which $\{L_i\}$ is the maximum normalized correlation coefficient for the $i^{th}$ location (ignoring the auto-correlation along the diagonal which will always be one), max is the maximum value function, $\rho_{xy}(\ )$ is the Pearson product-moment correlation coefficient function, $\hat{F}_{i,j}$ is the force estimation of the $i^{th}$ location at the $j^{th}$ sensor, and n is the number of points in the window.

$$\{L_i\} = \max \begin{bmatrix} 0 & \rho_{xy}(\hat{F}_{i,1}(n), \hat{F}_{i,2}(n)) & \ldots & \rho_{xy}(\hat{F}_{i,1}(n), \hat{F}_{i,j}(n)) \\ & 0 & \ldots & \rho_{xy}(\hat{F}_{i,2}(n), \hat{F}_{i,j}(n)) \\ & & \ddots & \vdots \\ sym. & & & 0 \end{bmatrix} \quad (10)$$

The normalized correlation coefficients are then compared by location with the largest value being the location of impact as in Equation (11) where $\hat{L}$ is the highest correlation coefficient and max( ) is the maximum value function.

$$\hat{L} = \max(\{L_i\}) \quad (11)$$

A benefit of this approach stems from the pair matching in the correlation matrix. Each force estimate is compared to the other, providing redundancy when more sensors and consequently, more force estimates are available. There may be events during which poor force estimates appear, and by taking the best pair of estimates (i.e., the pair having the highest correlation value), error in locating the impact can be greatly reduced.

According to another embodiment, a location can be determined according to a process in which following the selection of a window, the standard deviation can be taken between the resulting real portions of the force estimations from each sensor to each location, point by point within the window. Equation (12) demonstrates this step with $\{L_1\}$ being a vector of maximum standard deviations $\sigma$ for each location, $\hat{F}_{i,j}$ being the force estimate for the $i^{th}$ location and $j^{th}$ sensor, k being the point within the force estimate vector being compared, and n being the number of points in the force estimate window.

$$\{L_i\} = \max \begin{Bmatrix} \sigma(\ \hat{F}_{i,1}(k) & \hat{F}_{i,2}(k) & \ldots & \hat{F}_{i,j}(k)\ ) \\ \sigma(\ \hat{F}_{i,1}(k+1) & \hat{F}_{i,2}(k+1) & \ldots & \hat{F}_{i,j}(k+1)\ ) \\ \vdots & \vdots & \ddots & \vdots \\ \sigma(\ \hat{F}_{i,1}(k+n) & \hat{F}_{i,2}(k+n) & \ldots & \hat{F}_{i,j}(k+n)\ ) \end{Bmatrix} \quad (12)$$

The maximum standard deviation of the force at each location is then compared in Equation (13) where $\hat{L}$ is the lowest standard deviation which indicates the impact location, and min( ) is the minimum value function.

$$\hat{L} = \min(\{L_i\}) \quad (13)$$

The reasoning is that the location of impact is indicated by the location force estimates that more closely match in magnitude for the specified window.

The disclosed method can work very well as it can intrinsically embed structure properties into the algorithm and can accurately relate the force of impact to vibrations that can be detected in the structure. In addition, the method does not require the sensors to be time synchronized, it is not necessary for all of the installed sensors to be active at all times, and the method merely requires initial installation of sensors in mechanical communication with the structure with no further action required during use.

Figure 3:
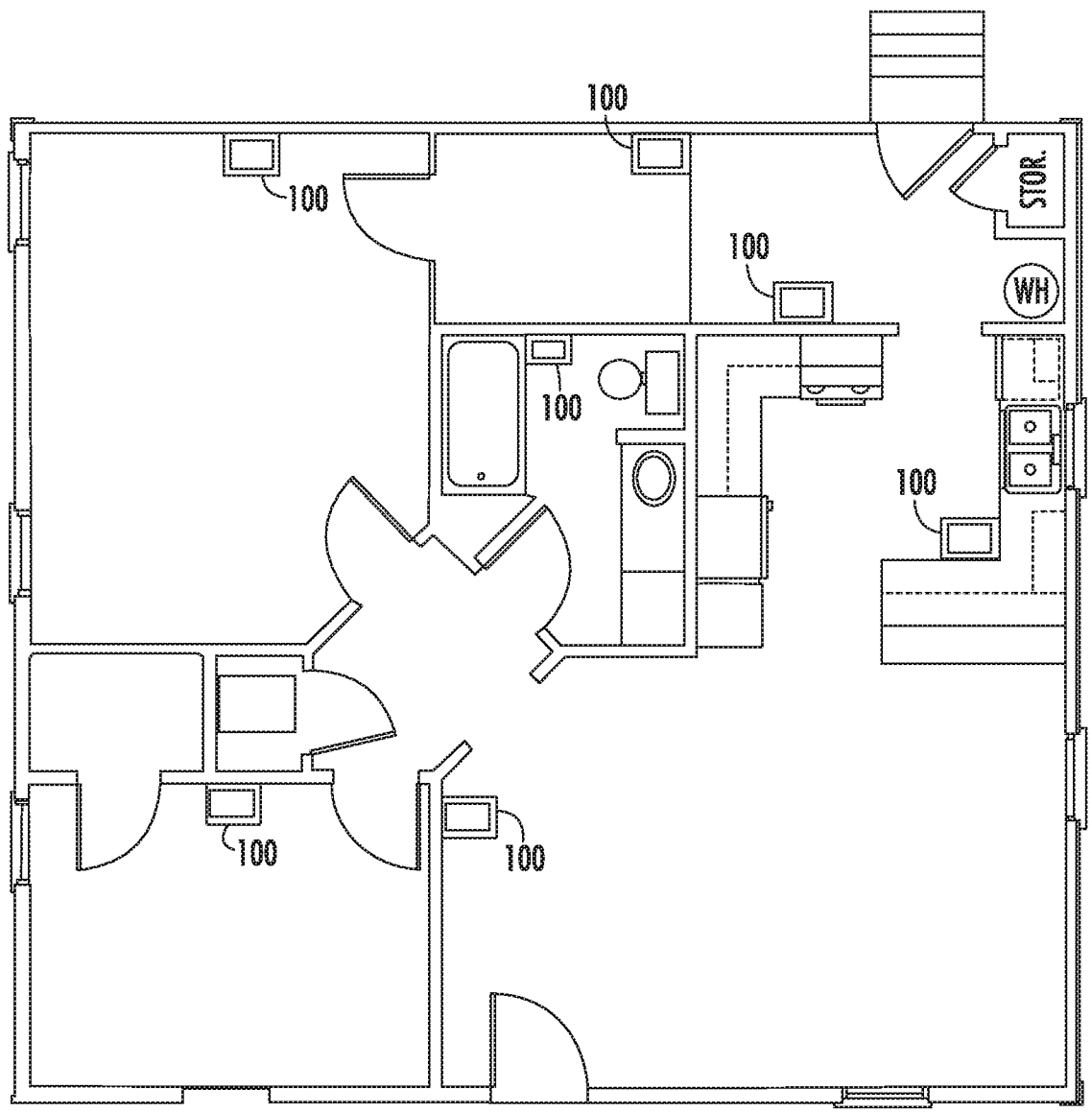
FIG. 3 schematically illustrates one embodiment of a system for use in monitoring impact events within a home.

A system can include sensors and a controller, and during use, the sensors can be located at desired locations within the interrogation area. In one embodiment, sensors can be located at those locations that have shown high incidence of falls. By way of example, FIG. 3 schematically illustrates an example of sensor locations in a typical home, e.g., an apartment, with accelerometers 100 located in the bedrooms, great room, kitchen, bath, etc. The detection strategy can be based on these locations and the multiple sensors can be in communication with a controller (not illustrated in FIG. 2). During use, the force estimations of an impact event that exceeds the threshold value and is detected at multiple sensors can be compared to discern the most likely impact location and the energy of the impact, which can be utilized to indicate the type of event.

A control system can include a processor that can be a microcontroller, microprocessor, system on chip (SOC), or any processor capable of being in communication with a sensor 100. It should be understood that a processor may be incorporated in a sensor 100, or may be remote from the sensor 100 and in communication therewith through a suitable wired or wireless connection. In general, a processor can collect raw data from sensors 100 and can carry out desired data manipulation according to input instruction, such as according to algorithms as discussed. Memory can be integral to the processor (for example, in the case of an SOC) or separable there from (for example, a memory chip). Moreover, a sensor 100 can utilize multiple different memory devices and methods, as are known in the art.

A processor can interact with a user interface that performs device-level operations. These operations could include, for example, turning one or more accelerometer sensors 100 on and/or off, resetting internally stored data, downloading internally stored data to an external device, setting the time and date, and setting various other parameters of the methods used to detect impact events. Options can control how the feedback is provided to the user. Other operations can customize the operation of the device based upon the user's preferences. For example, the device can be made to operate only in certain time-of-day windows, or to provide certain types of feedback.

A processor may correspond to a microcontroller depending on the desired operational capabilities of the system. For example, if a relatively simple construction or model of system is desired, such as one capable of limited operation, a microcontroller may be suitable as the processor. A more functionally advanced model of system may require more sophisticated onboard processing capability and, thus, may require the use of a microprocessor.

A system can include additional features. For instance, a system can include a radio-frequency identification ("RFID") chip or other contactless user identification system that uniquely identifies the system. A system may also include a contactless smart chip (CSC) or other central processing unit with associated memory and integrated bus that enables the system to perform bi-directional data communication with properly equipped external devices and systems.

Data from a system may be transferred or communicated externally via any communication link that may correspond to telephone modem, direct, wireless, and internet connection or other communications methodologies as may be available or made available. Transmission of a signal to a remote site may be carried out with a radio frequency transmission scheme or with any other wireless-type transmission scheme, as is generally known in the art. For instance, a wireless telephone or internet communications scheme can be utilized to transmit a signal to a remote location according to known methods.

An external device may be accessible to only a single site or may be a shared device. For instance, an external device may be a private computer within a caregiver's home, office, or so forth, or may be at a monitoring facility, for instance at a medical facility, such that appropriate medical personal may informed of an impact event. Upon receipt of data from a system at the external device, appropriate action may be taken by the party (e.g., contact the monitored individual and/or other designated parties) and the data may be converted to sequential user records and stored in a relational database format (RDBMS) where at least a User ID, Mode, and Date/Time of Event may be used as primary keys along with the User's unique ID (e.g., as maintained in the RFID chip).

The present invention may be better understood with reference to the Examples, set forth below.

EXAMPLE 1

Figure 4:
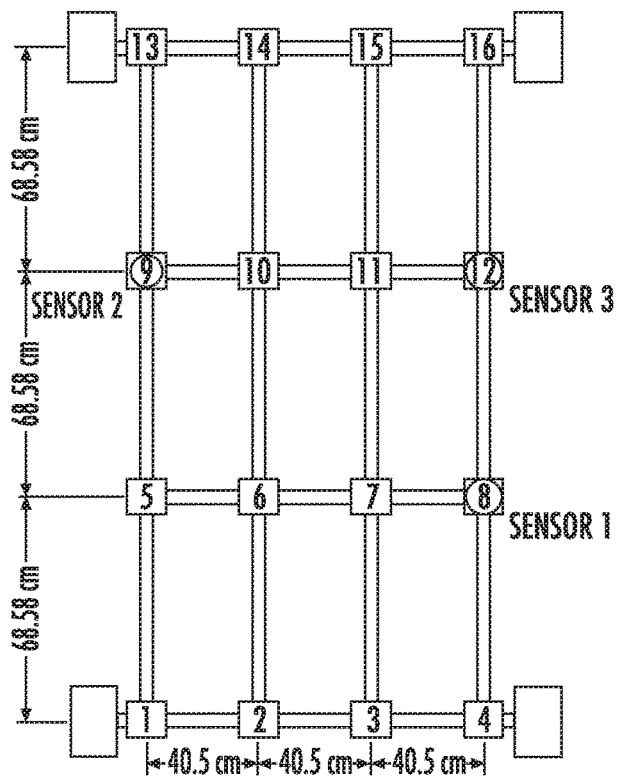
FIG. 4 schematically illustrates a steel test frame layout utilized herein.

The methods were tested on a small scale steel structure at the Structural Dynamics and Intelligent Infrastructure Laboratory (SDII) at the University of South Carolina. A schematic of the structure is shown in FIG. 4 and was built using 3.18 cm (1.25 in) o.d.×0.478 cm (0.188 in) wall thickness DOM cold-rolled tube steel as the beams and 2.54 cm (1 in) NC 2C threaded rods to connect the beams to the 6.35 cm (2.5 in) cubic 1018 cold-rolled bar. The tubes and cubes were thread in a 20.32 cm (8 in) pitch. The structure was suspended on steel supports and allowed to rotate around the horizontal axis using mounted bearings.

Three PCB® 333B50 ICP® accelerometers with a sensitivity of 1000 mV/g were attached to the structure using magnetic mounts at nodes 8, 9, and 12 (FIG. 4). A 2.22N (0.5 lb) PCB® Piezotronics ICP® Impulse Hammer having a sensitivity of 2.33 mV/N (10.35 mV/lb) was used to excite the structure. Data was collected at a rate of 2049 Hz, filtered using a finite impulse response (FIR), and down sampled to 400 Hz using the Fourier Method. The lower rate was chosen in order to be more realistic in an actual implementation scenario.

Figure 5:
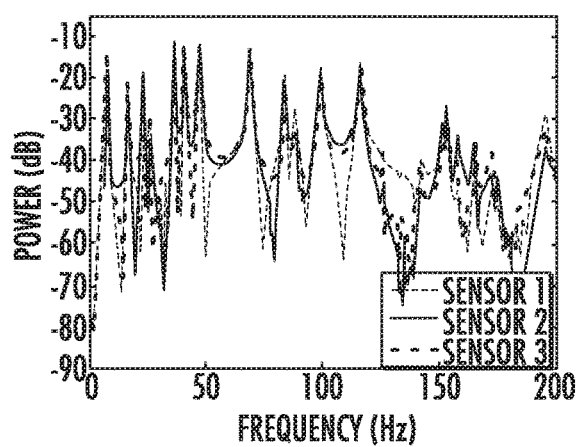
FIG. 5 presents the transfer functions at a node of the test frame.
Figure 6:
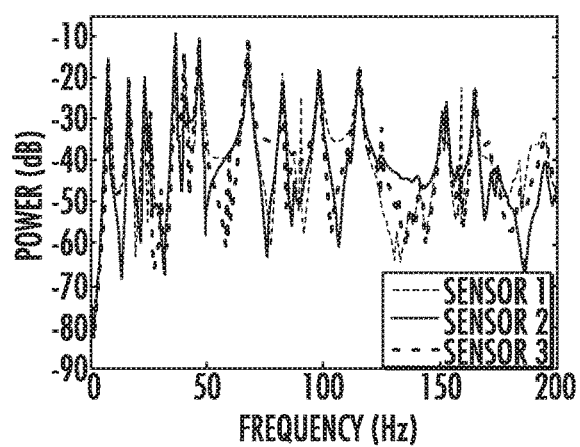
FIG. 6 presents the transfer functions at another node of the test frame.

Transfer functions were calculated using Equation (3) (above) at node 7 (FIG. 5) and 10 (FIG. 6) for all three sensors, which subsequently saw impacts from the impulse force hammer. The data used for the transfer functions were captured in one continuous record of forces and accelerations. Five impacts were performed, with the structure being allowed to return to rest after each impact.

Figure 7:
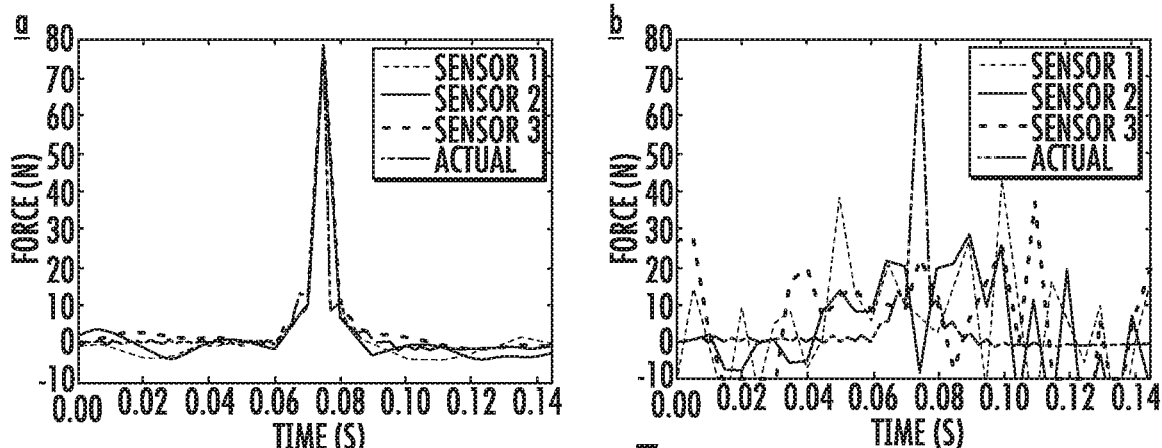
FIG. 7 displays the force estimation for an impact at a first node using the transfer functions at that node (a) and at another node (b).
Figure 8:
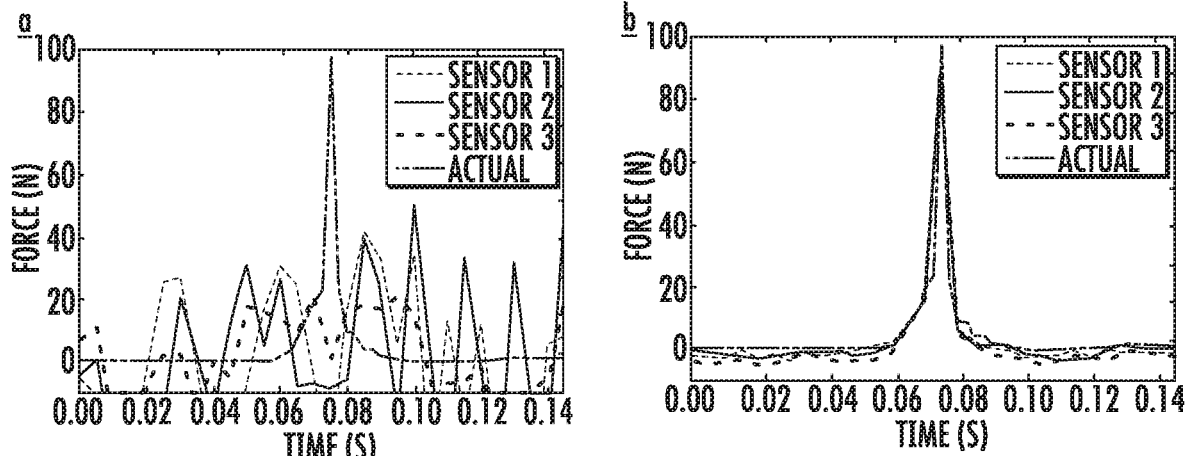
FIG. 8 displays the force estimation for an impact at a first node using the transfer functions at another node (a) and at that first node (b).

The transfer functions were then used to estimate the force of impact using Equation (4), and Equation (5) as previously described. FIG. 7 displays the results for an impact on Node 7 using the Node 7 transfer functions at (a) and using the Node 10 transfer functions at (b), and FIG. 8 displays the results for an impact on Node 10 using the Node 7 transfer functions at (a) and the Node 10 transfer functions at (b).

Figure 9:
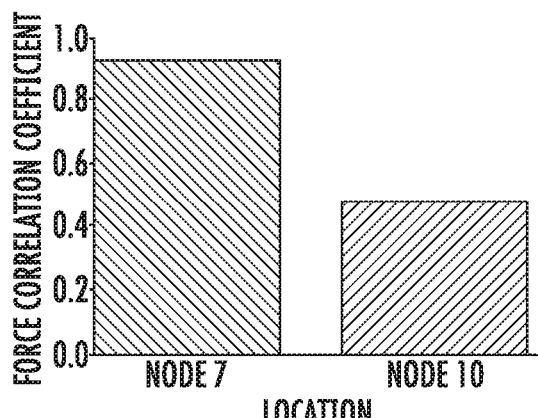
FIG. 9 graphically presents the force correlation coefficients by location for an impact at a node.
Figure 10:
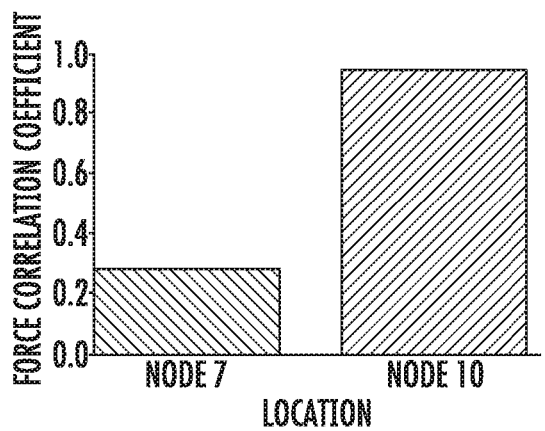
FIG. 10 graphically presents the force correlation coefficients by location for an impact at a node.

The force estimations for both impacts were used to identify the location of an impact based on the method described herein. FIG. 9 illustrates the force correlation coefficient results determined at Node 7 and at Node 10 for an impact on Node 7, and FIG. 10 illustrates the force correlation coefficient results determined at Node 7 and at Node 10 for an impact on Node 10.

The results from the trial indicate the method's viability. Each impact set correctly identified the node the impact occurred on, and closely estimated the maximum force of the impact (Table 1).

TABLE 1

| Impact | $\hat{L}$ | Actual (N) | $\hat{F}_{i,j}(N)$ |
| --- | --- | --- | --- |
| Node 7 | Node 7 | 78.8 | 80.0 |
| Node 10 | Node 10 | 97.0 | 91.7 |

EXAMPLE 2

Figure 11:
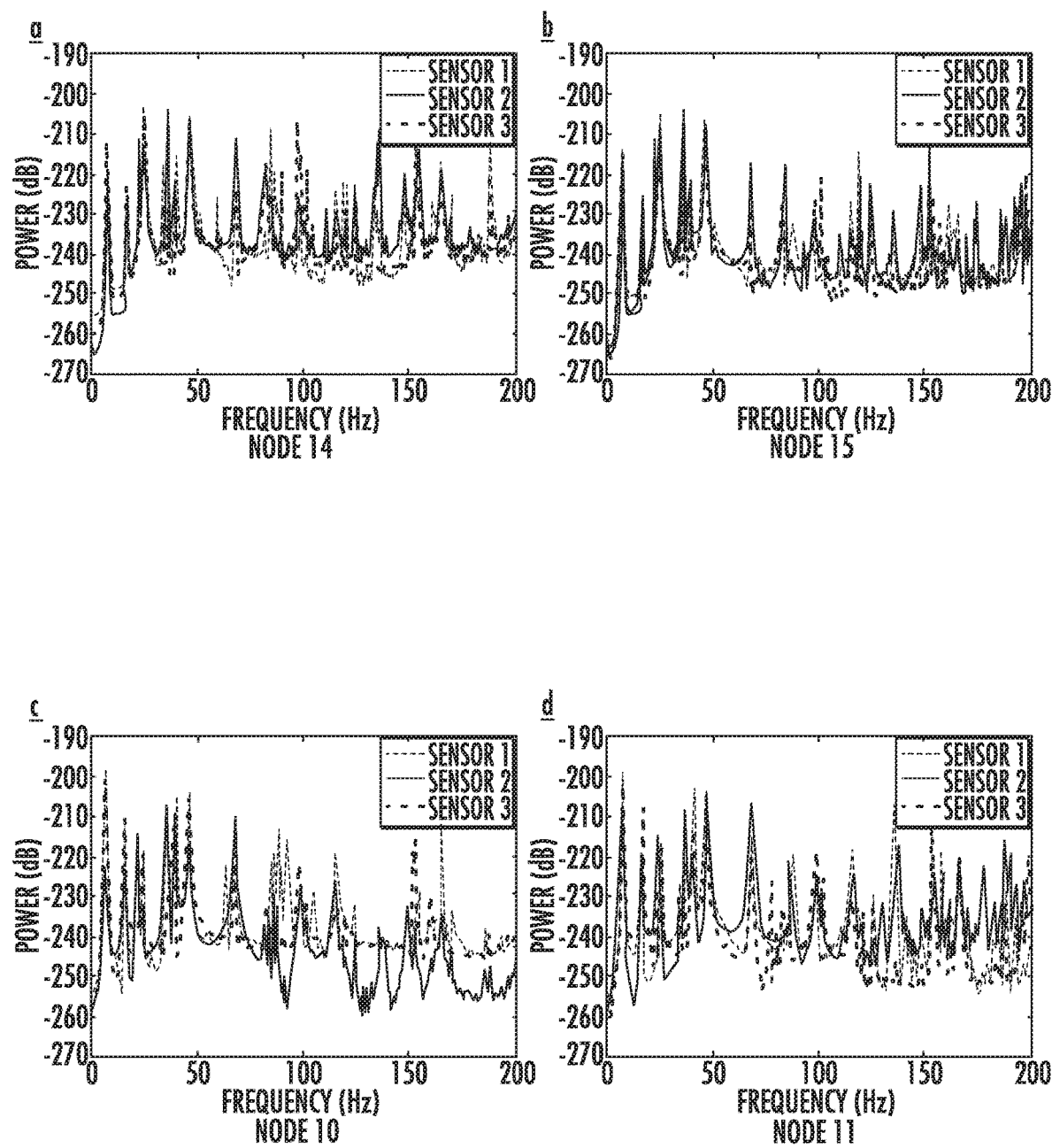
FIG. 11 presents transfer functions at several different nodes.
Figure 11:
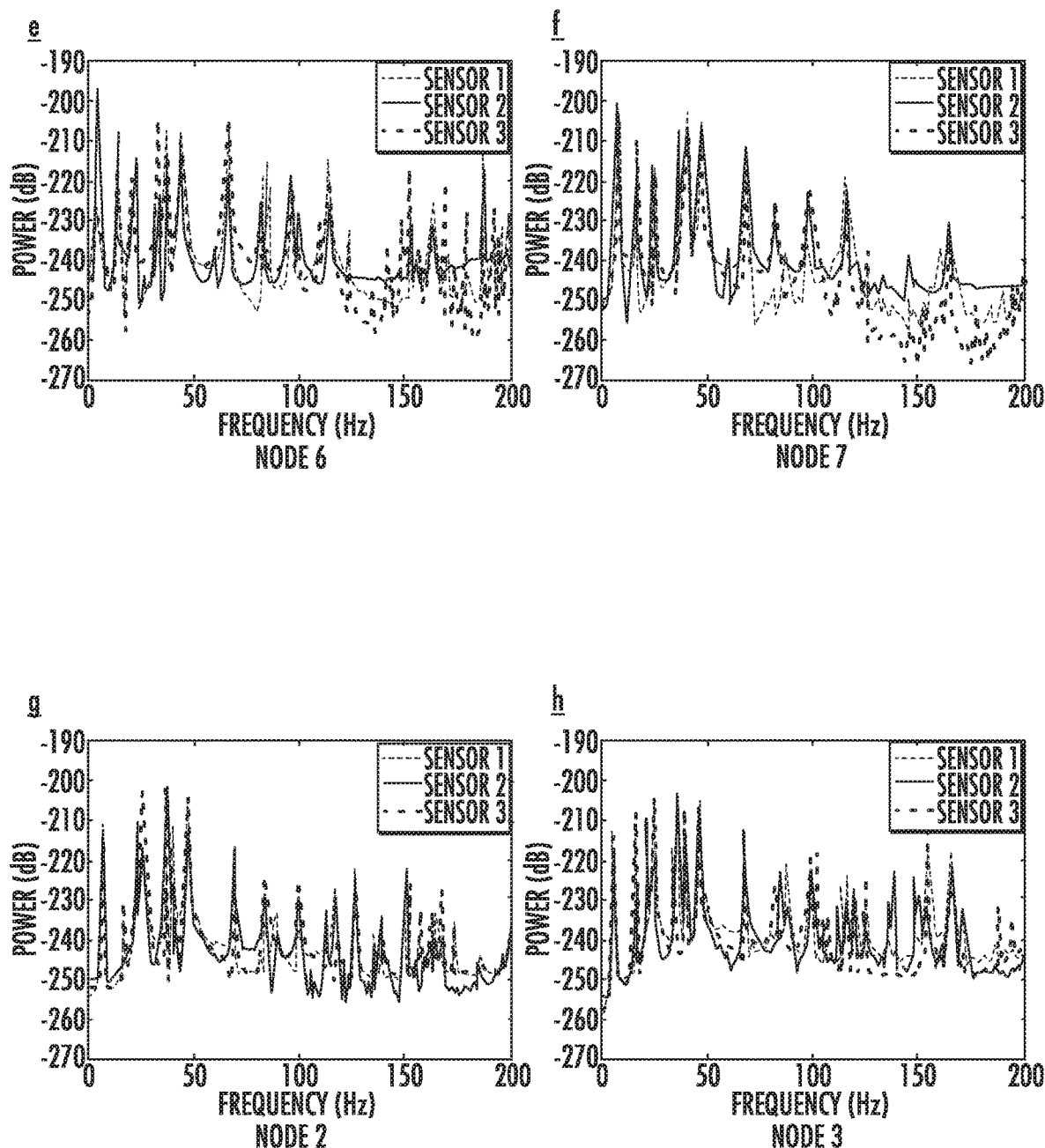

The method was applied to 8 of the 16 nodes present on the steel frame illustrated in FIG. 4. Nodes 1, 4, 5, 8, 9, 12, 13, and 16 were not taken into consideration as they were assumed to be under a wall. Each of the remaining nodes was excited 20 times using an impulse force hammer, with 10 records being used to generate transfer functions. Each hit was stored as a record containing 10 seconds of data from the time of impact. The rest of the procedure progressed as described previously. Transfer functions for each node examined are presented in FIG. 11. The transfer functions from Node 7 and Node 10 differed from those from the steel frame preliminary trial (Example 1). This was due to the different techniques used for combining data for the generation of each transfer function. Here, the transfer function was generated using several records spliced together, whereas in Example 1, the record was continuous.

Figure 12:
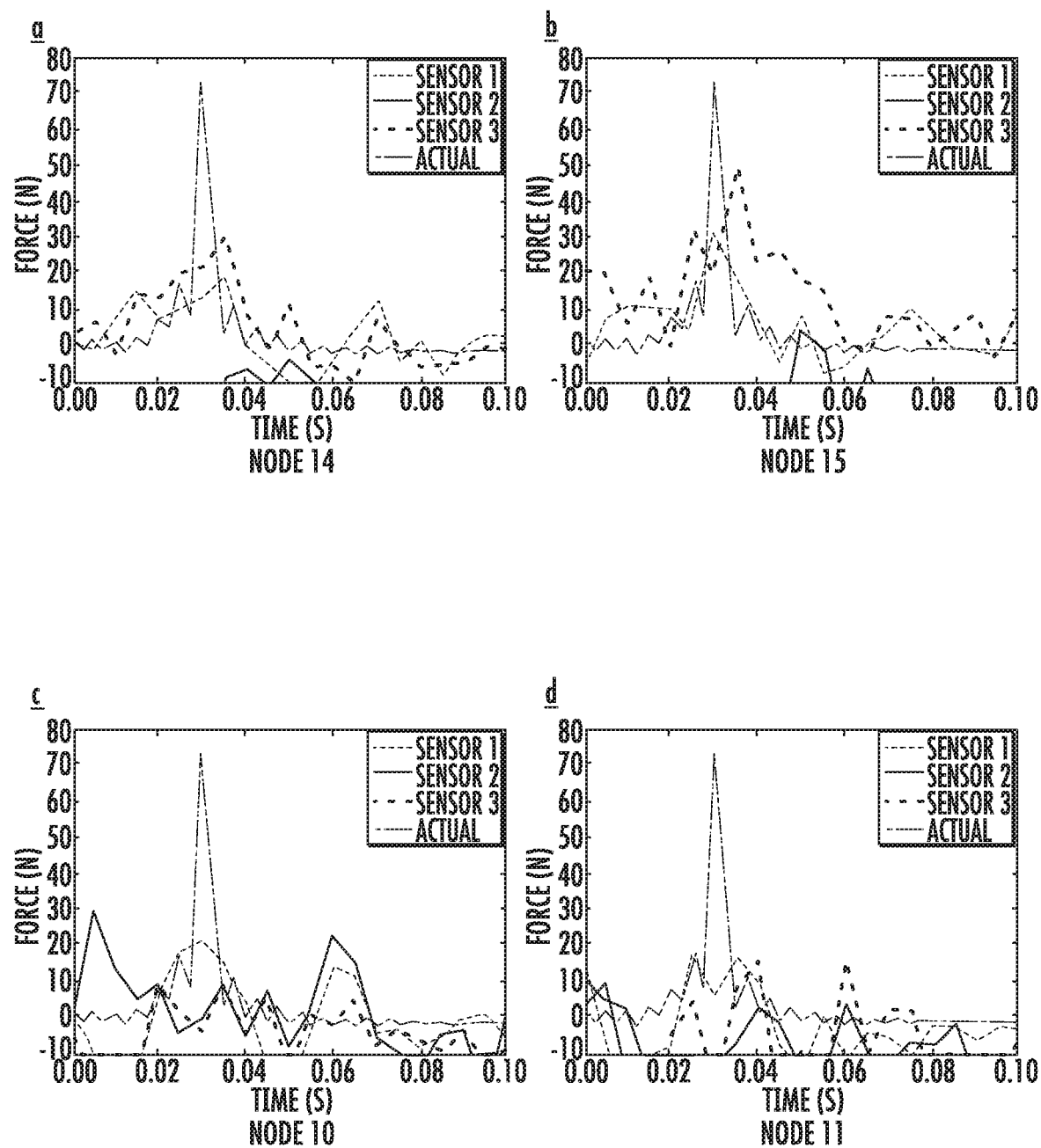
FIG. 12 presents the force estimates by node for an impact at one of the nodes.
Figure 12:
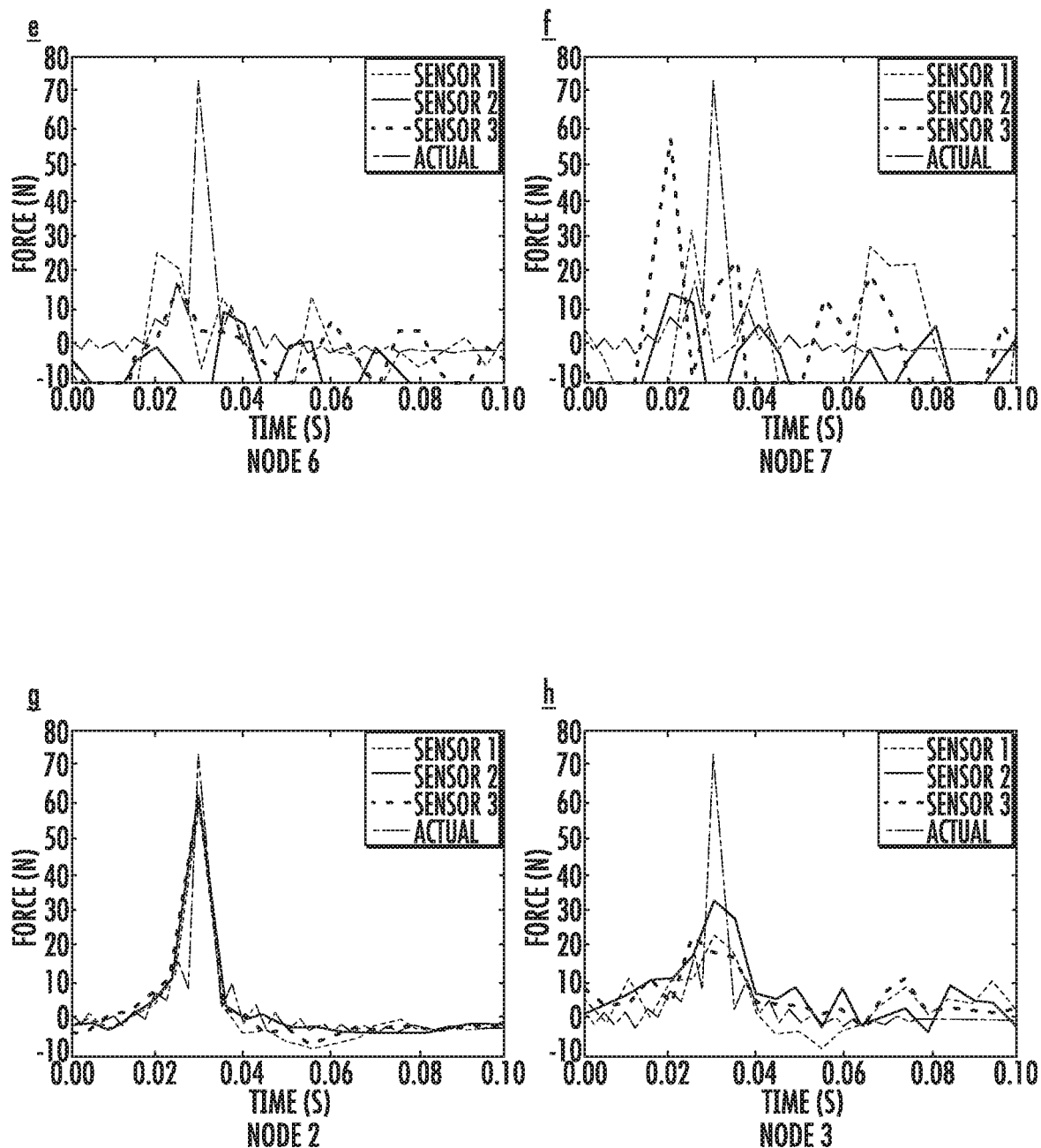
Figure 13:
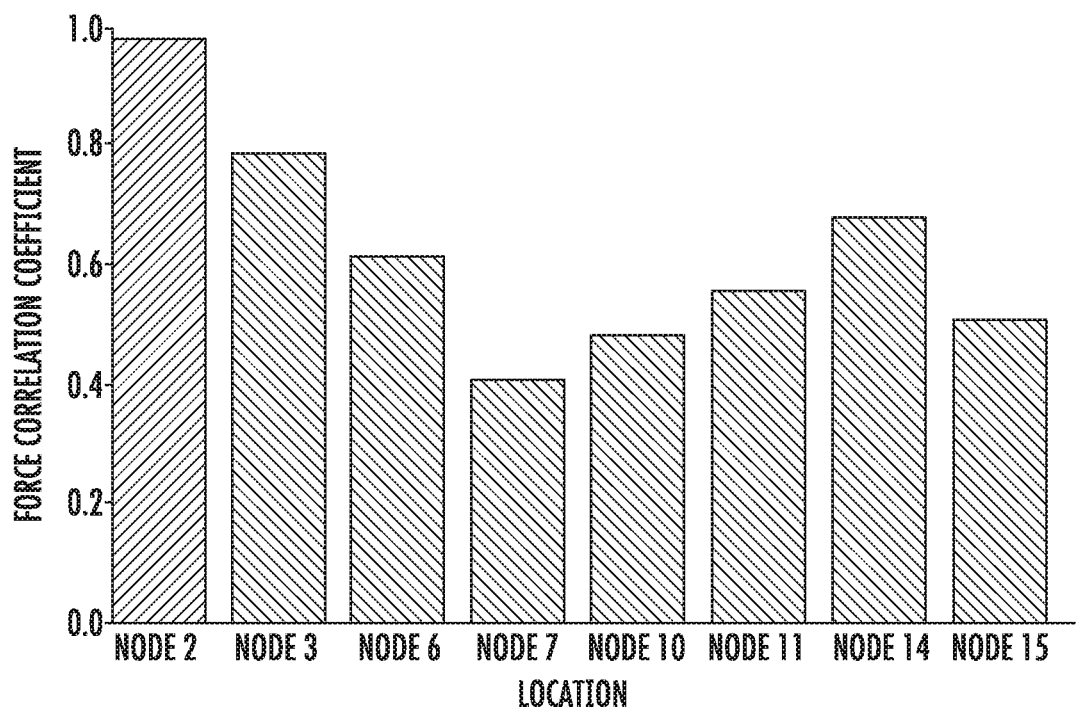
FIG. 13 presents the force correlation coefficients by location for an impact at one of the nodes.

An impact was instigated at Node 2. FIG. 12 shows the force estimates for all locations, and FIG. 13 shows the force correlation by location with the identified location being correctly identified at Node 2.

Figure 15:
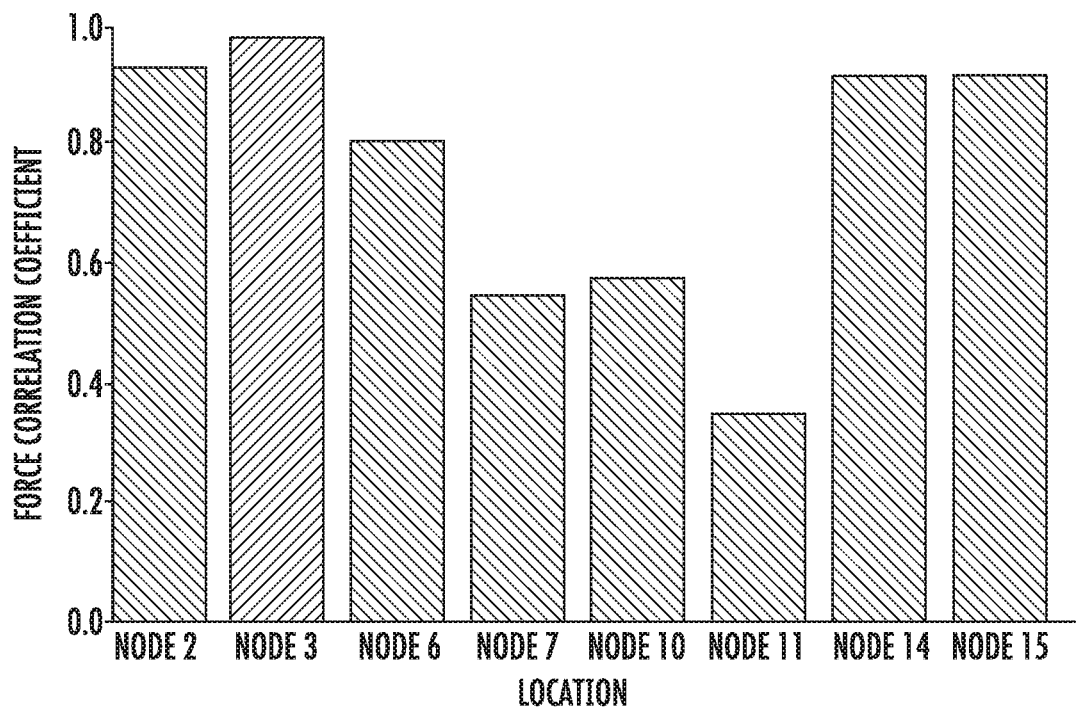
FIG. 15 presents the force correlation coefficients by location for an impact at one of the nodes.
Figure 14:
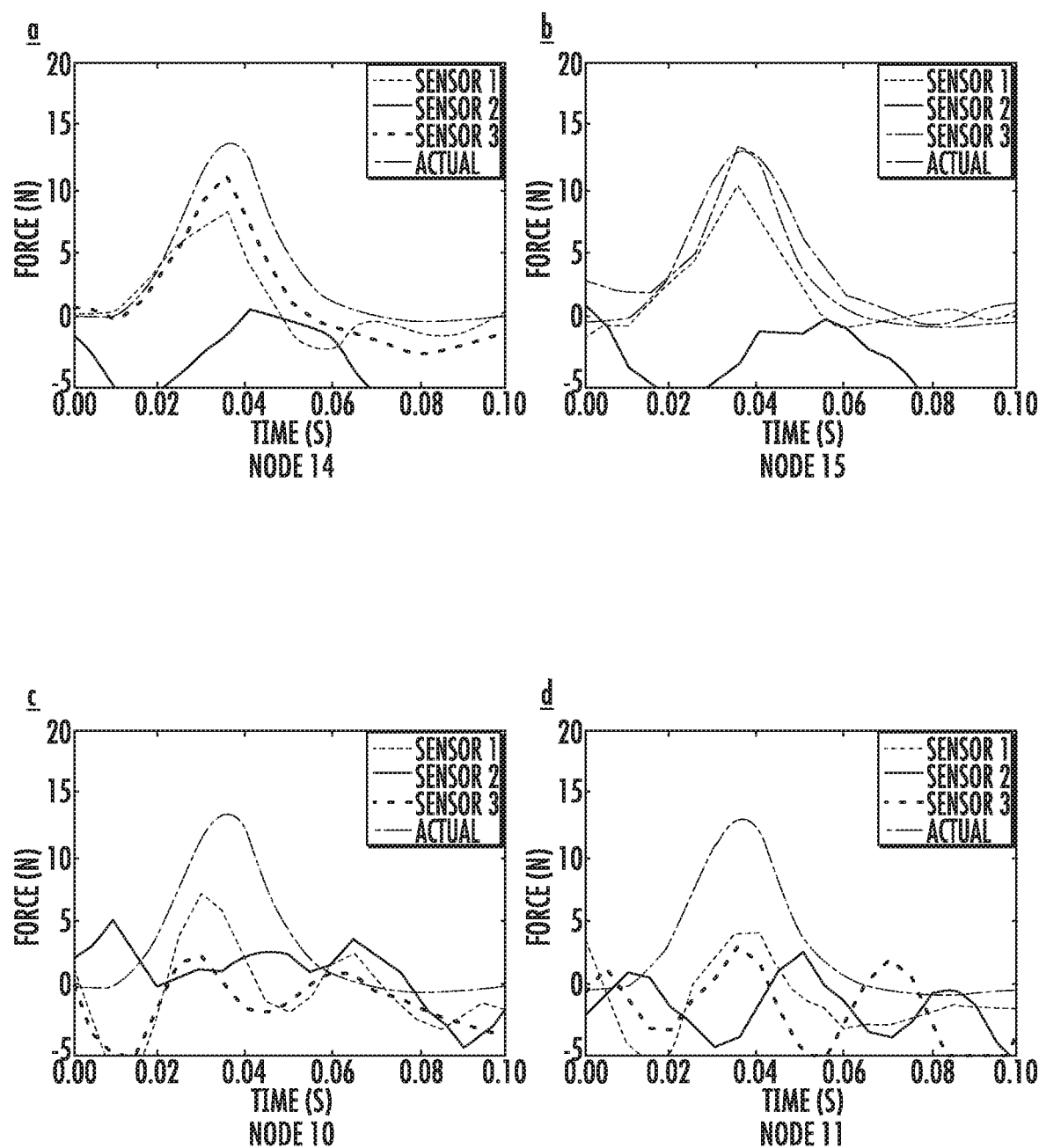
FIG. 14 presents the force estimates by node for an impact at one of the nodes.
Figure 14:
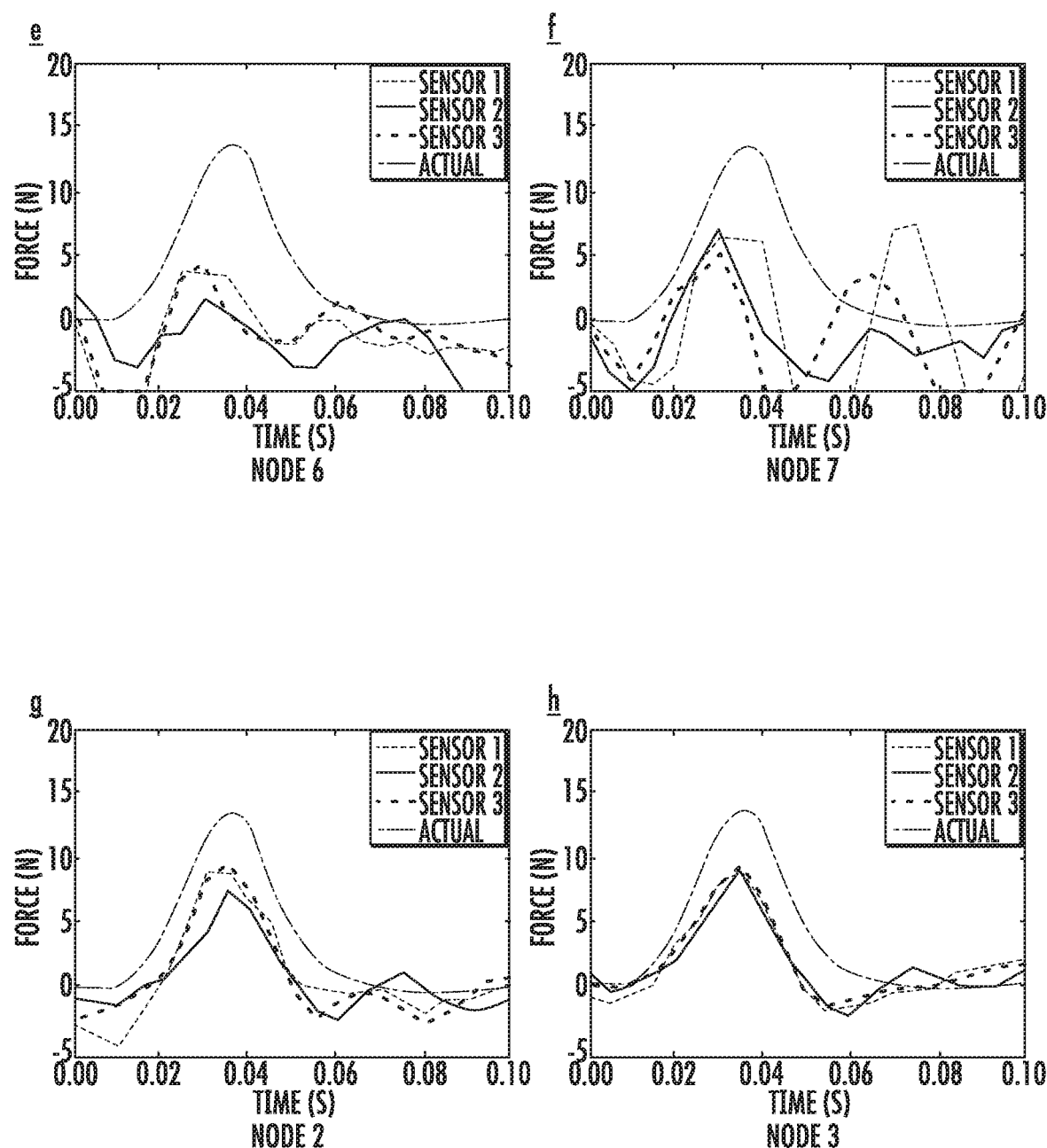

FIGS. 14-27 present results from impacts that occurred on the rest of the nodes including:

Force estimates by node for an impact on node 3 in FIG. 14, and the force correlation coefficient by location of the impact on node 3 in FIG. 15.

Figure 16:
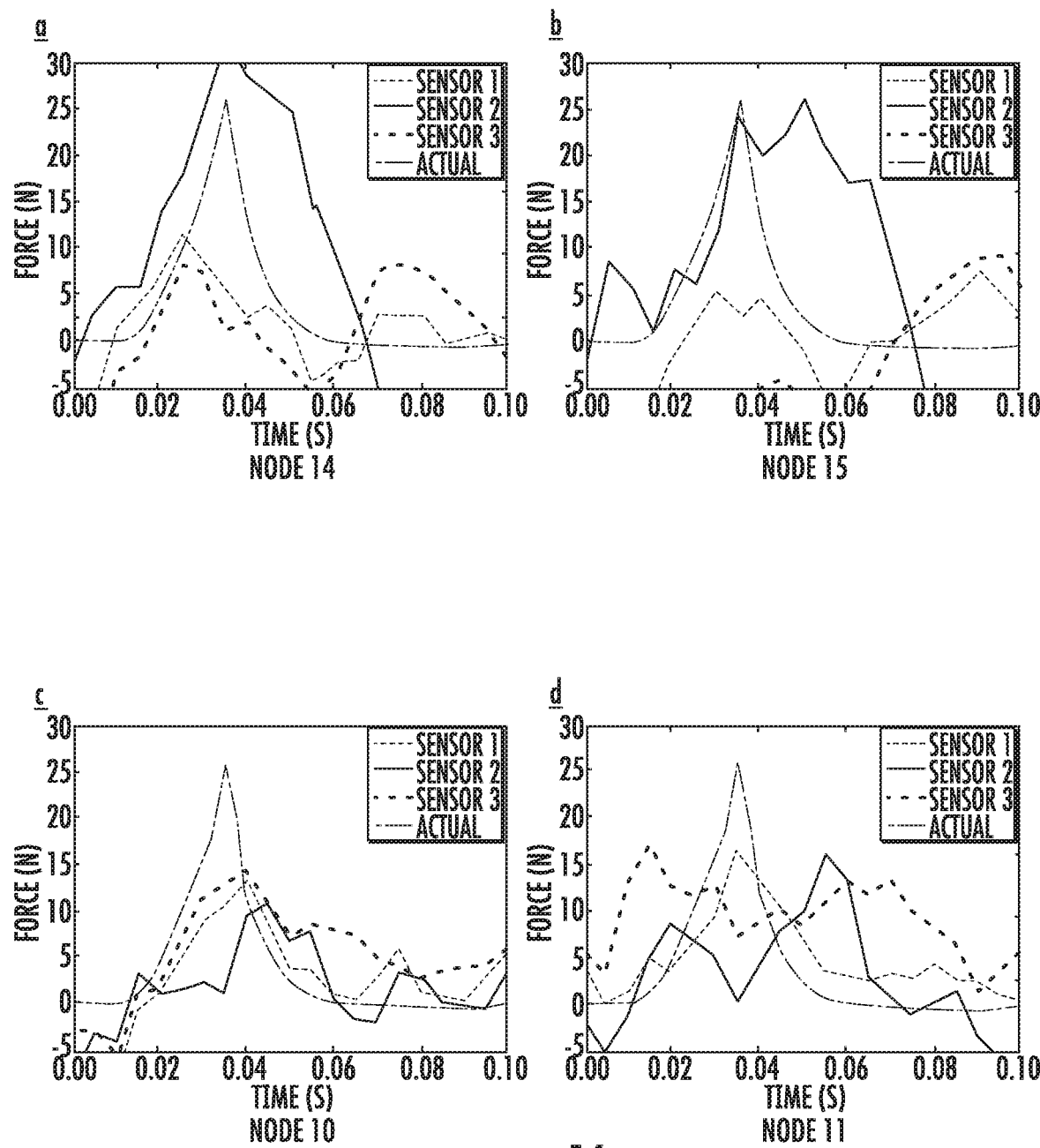
FIG. 16 presents the force estimates by node for an impact at one of the nodes.
Figure 16:
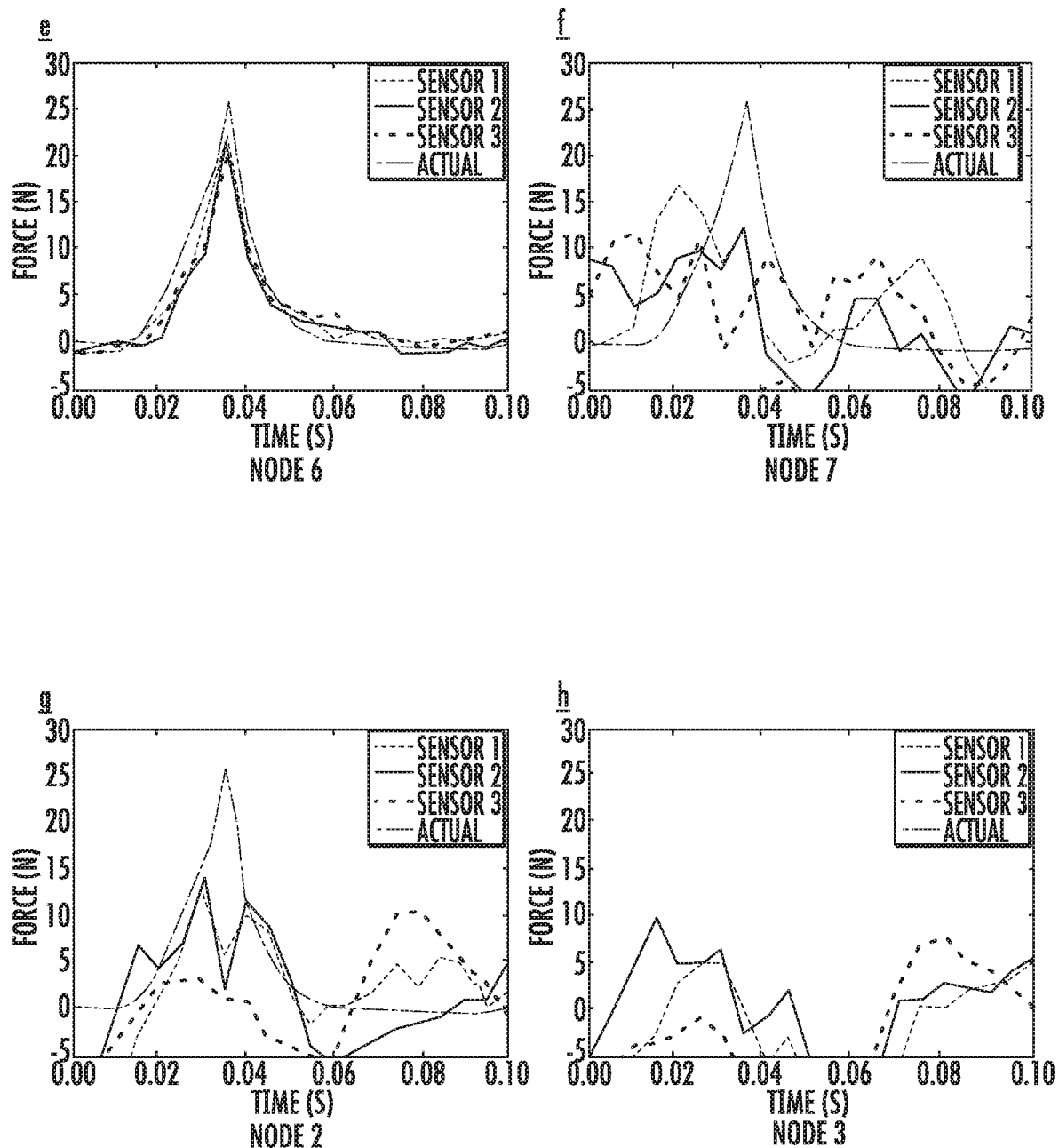
Figure 17:
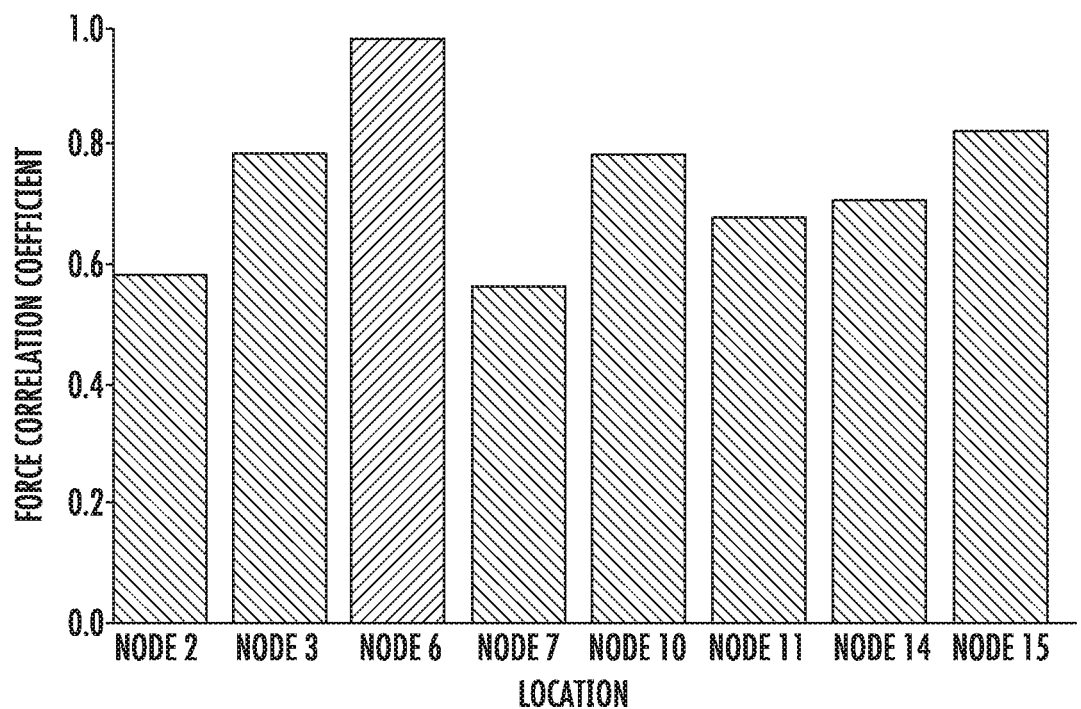
FIG. 17 presents the force correlation coefficients by location for an impact at one of the nodes.

Force estimates by node for an impact on node 6 in FIG. 16, and the force correlation coefficient by location of the impact on node 6 in FIG. 17.

Figure 19:
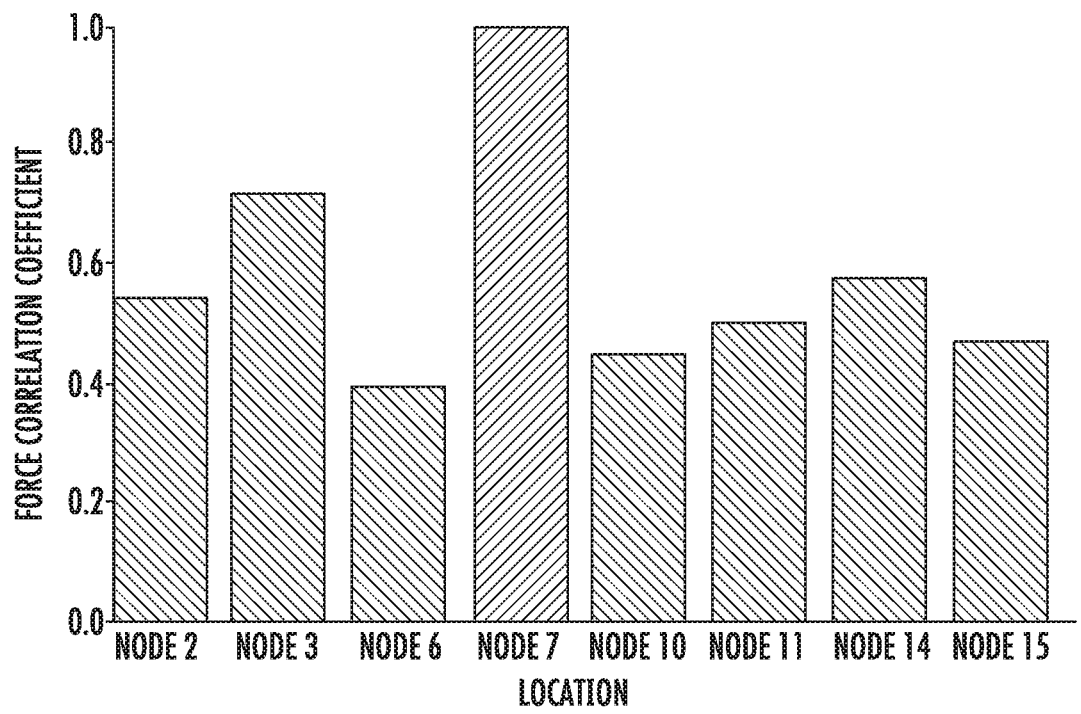
FIG. 19 presents the force correlation coefficients by location for an impact at one of the nodes.
Figure 18:
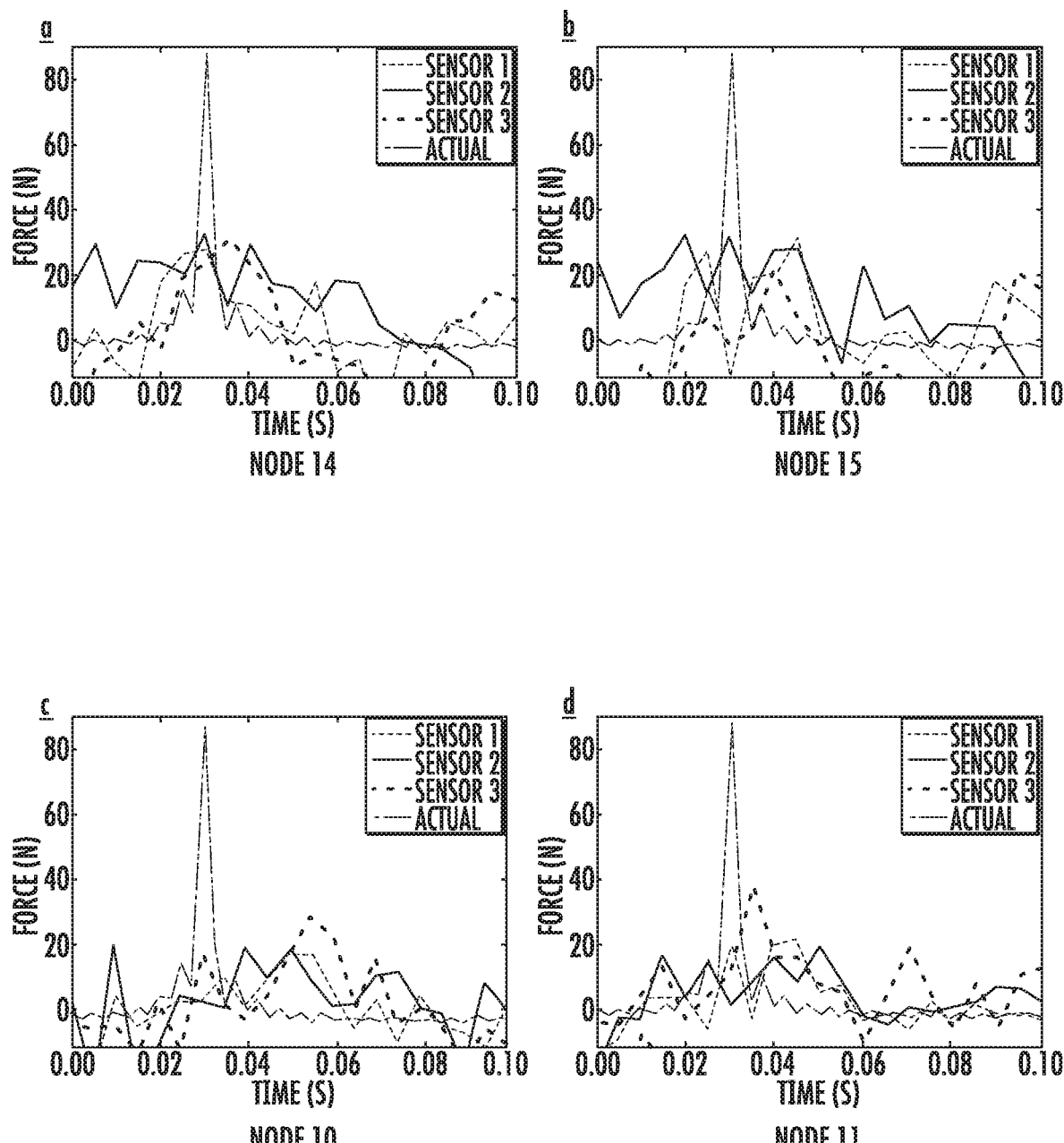
FIG. 18 presents the force estimates by node for an impact at one of the nodes.
Figure 18:
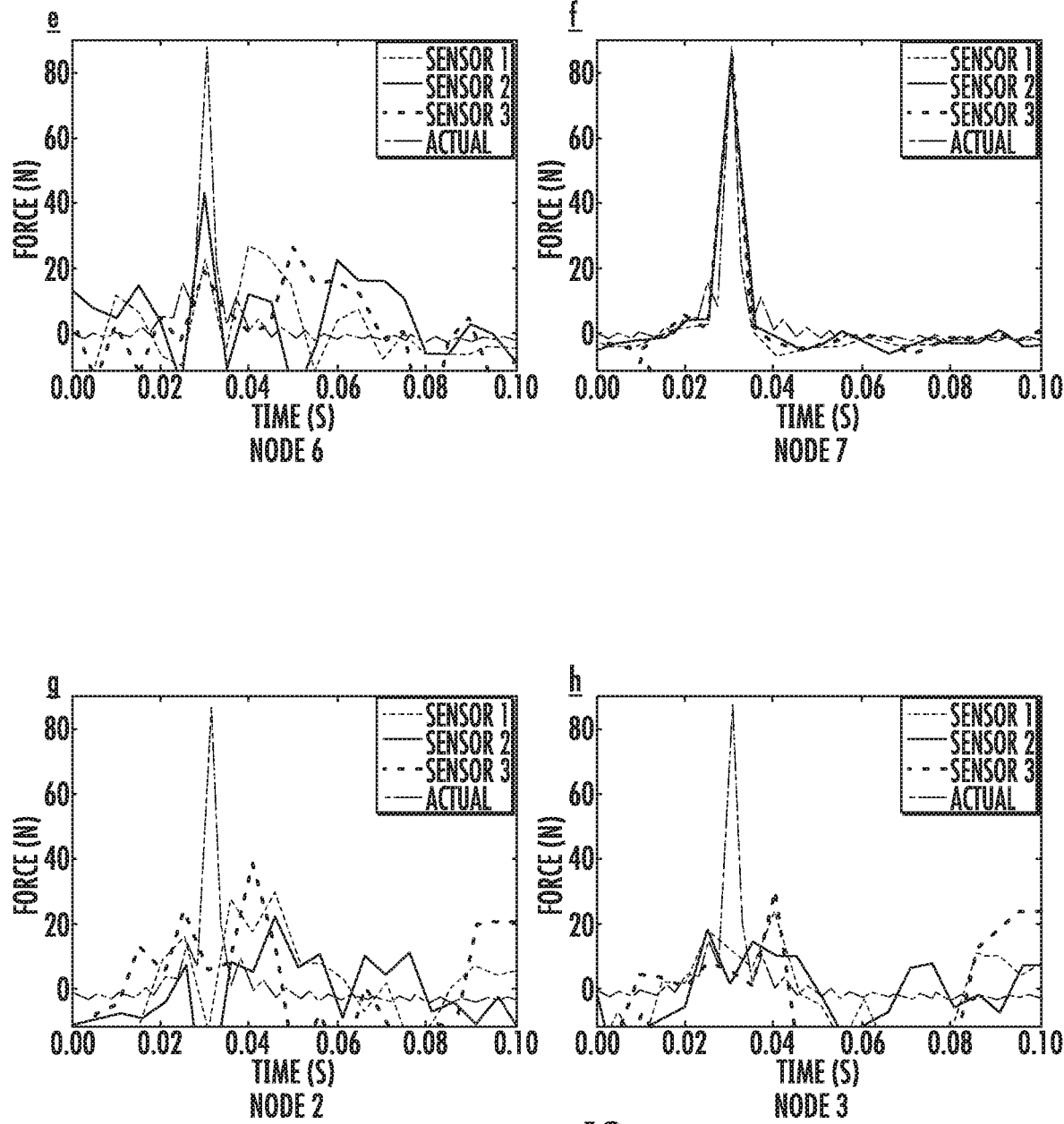

Force estimates by node for an impact on node 7 in FIG. 18, and the force correlation coefficient by location of the impact on node 7 in FIG. 19.

Figure 20:
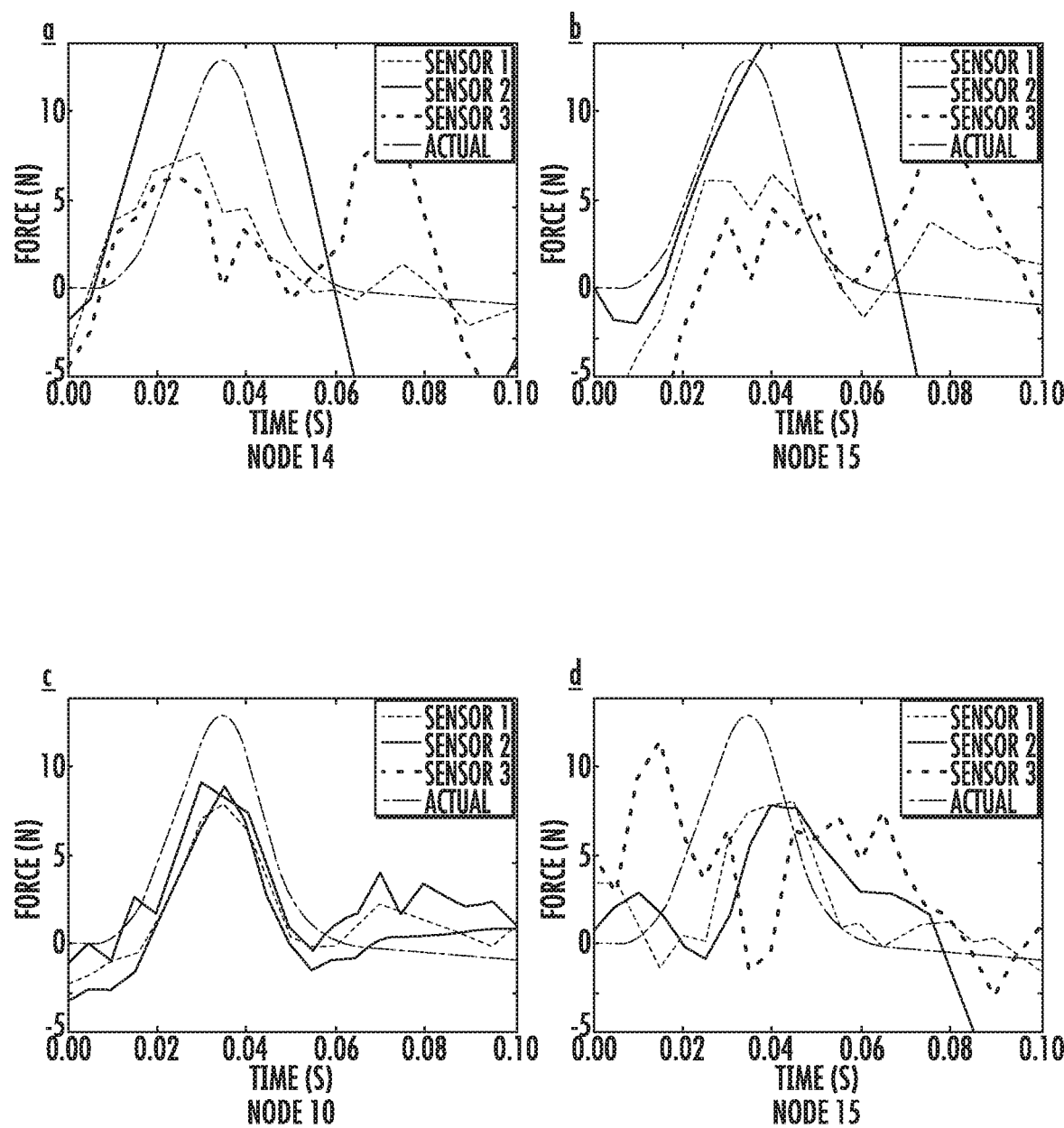
FIG. 20 presents the force estimates by node for an impact at one of the nodes.
Figure 20:
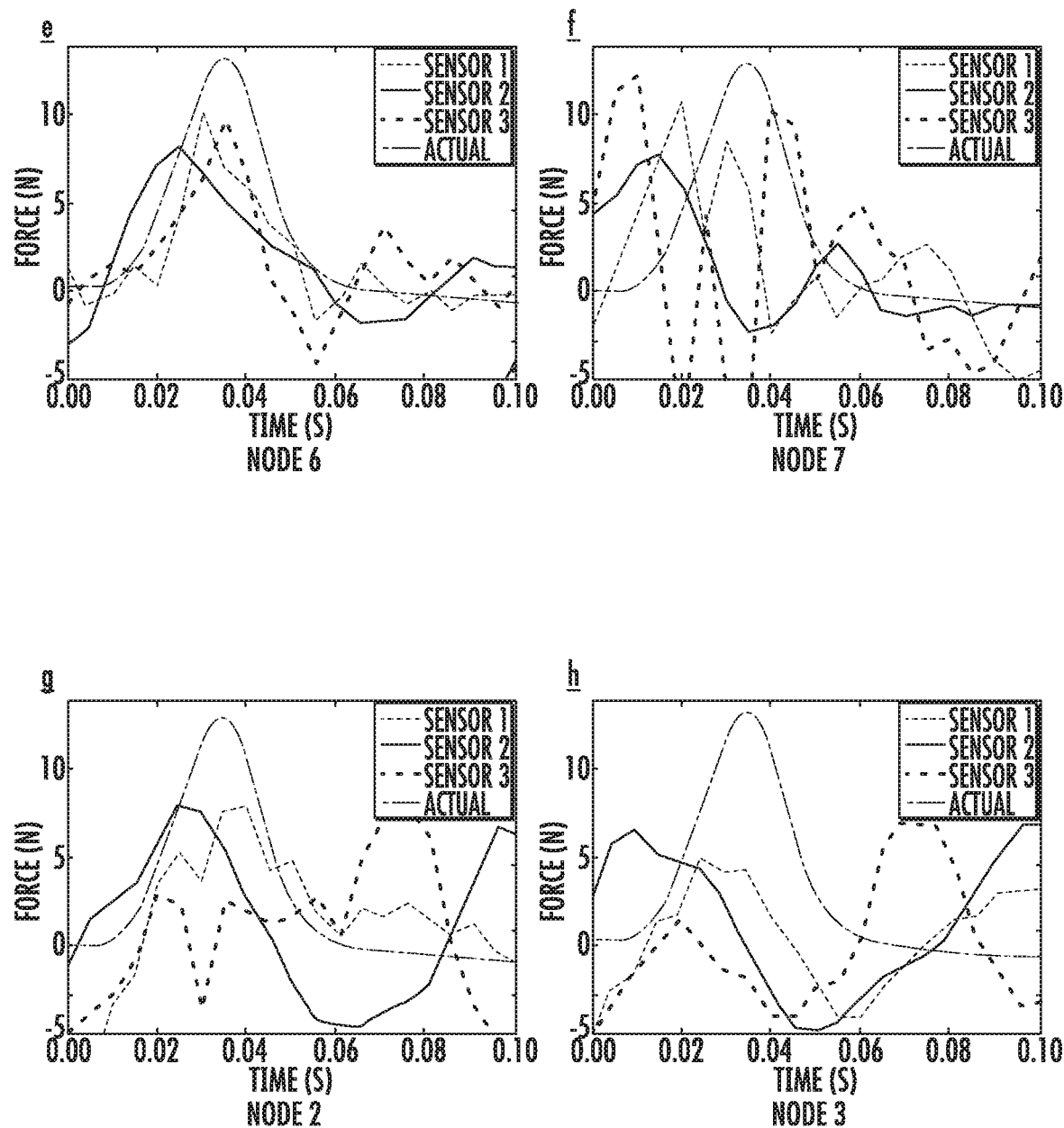
Figure 21:
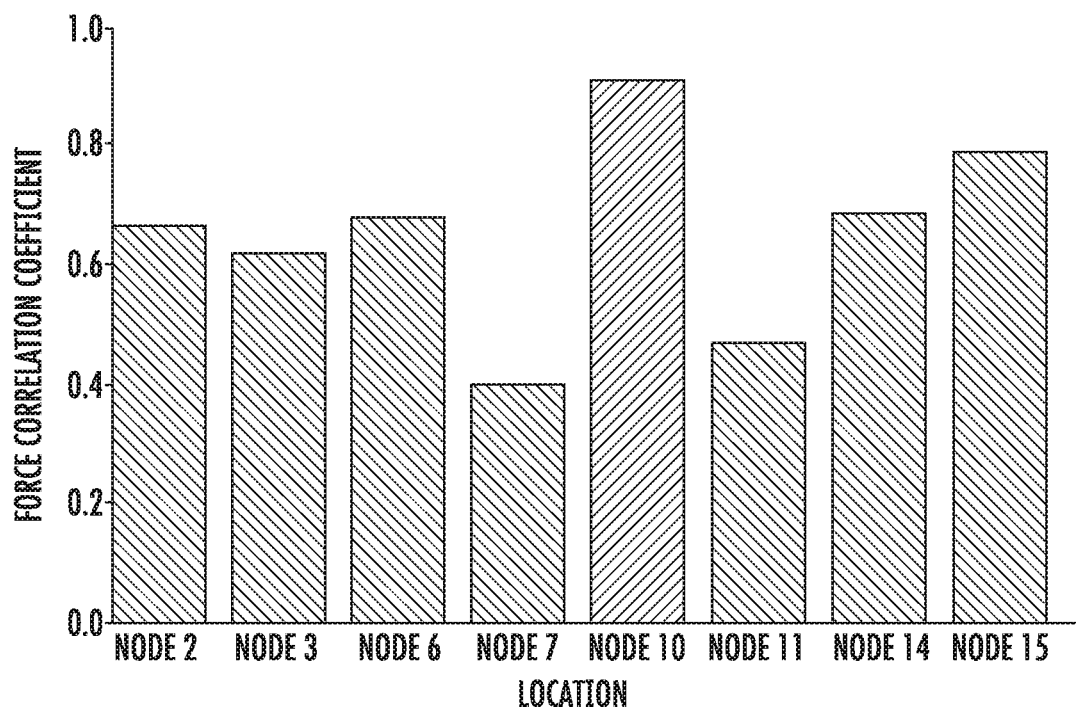
FIG. 21 presents the force correlation coefficients by location for an impact at one of the nodes.

Force estimates by node for an impact on node 10 in FIG. 20, and the force correlation coefficient by location of the impact on node 10 in FIG. 21.

Figure 23:
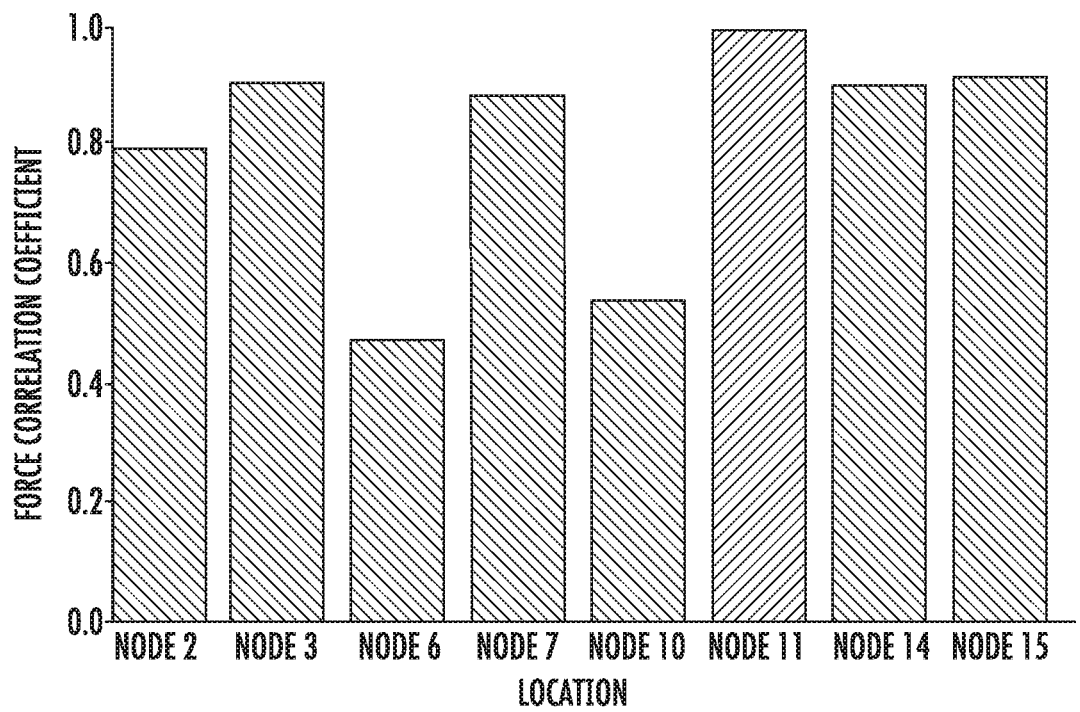
FIG. 23 presents the force correlation coefficients by location for an impact at one of the nodes.
Figure 22:
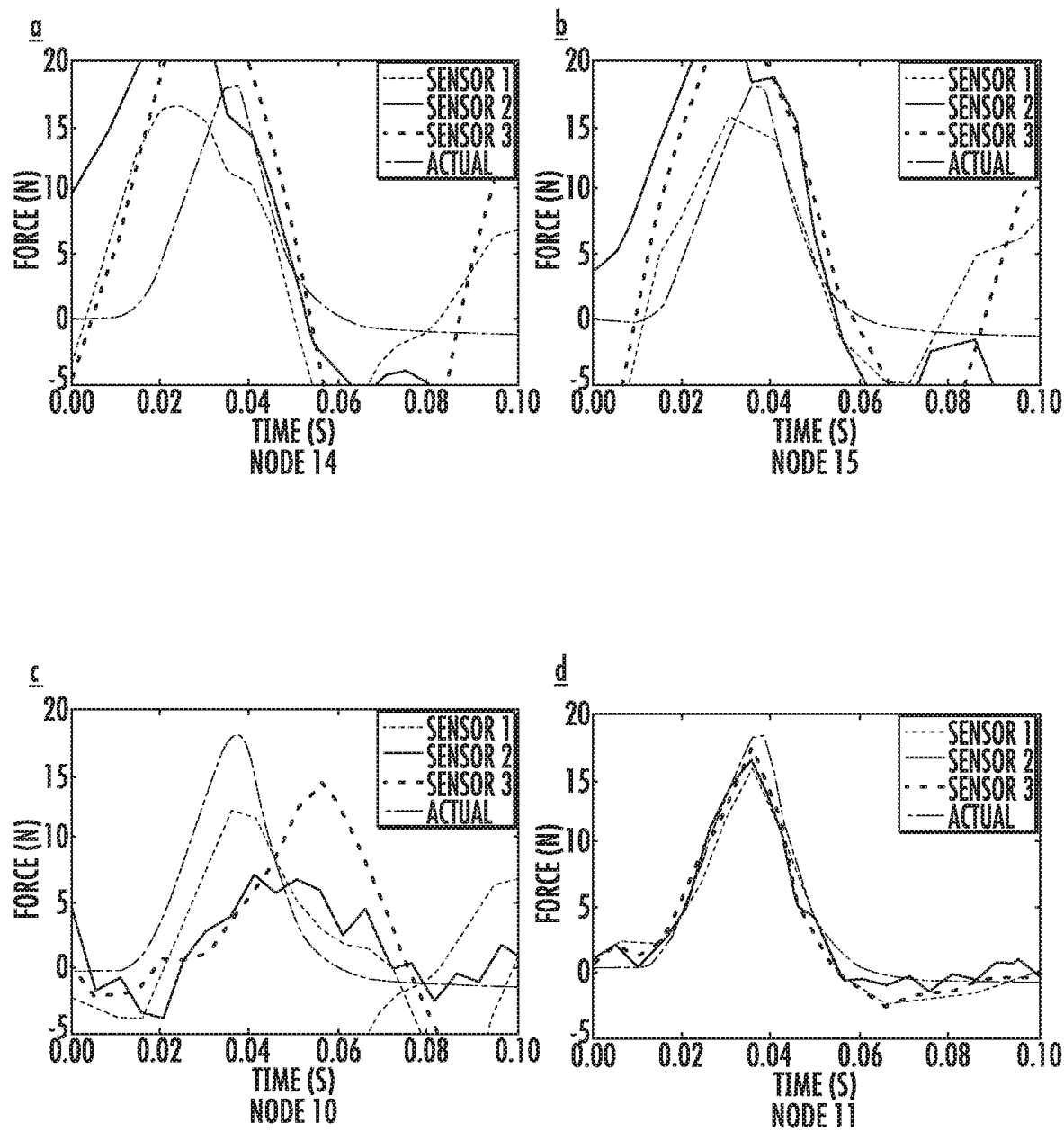
FIG. 22 presents the force estimates by node for an impact at one of the nodes.
Figure 22:
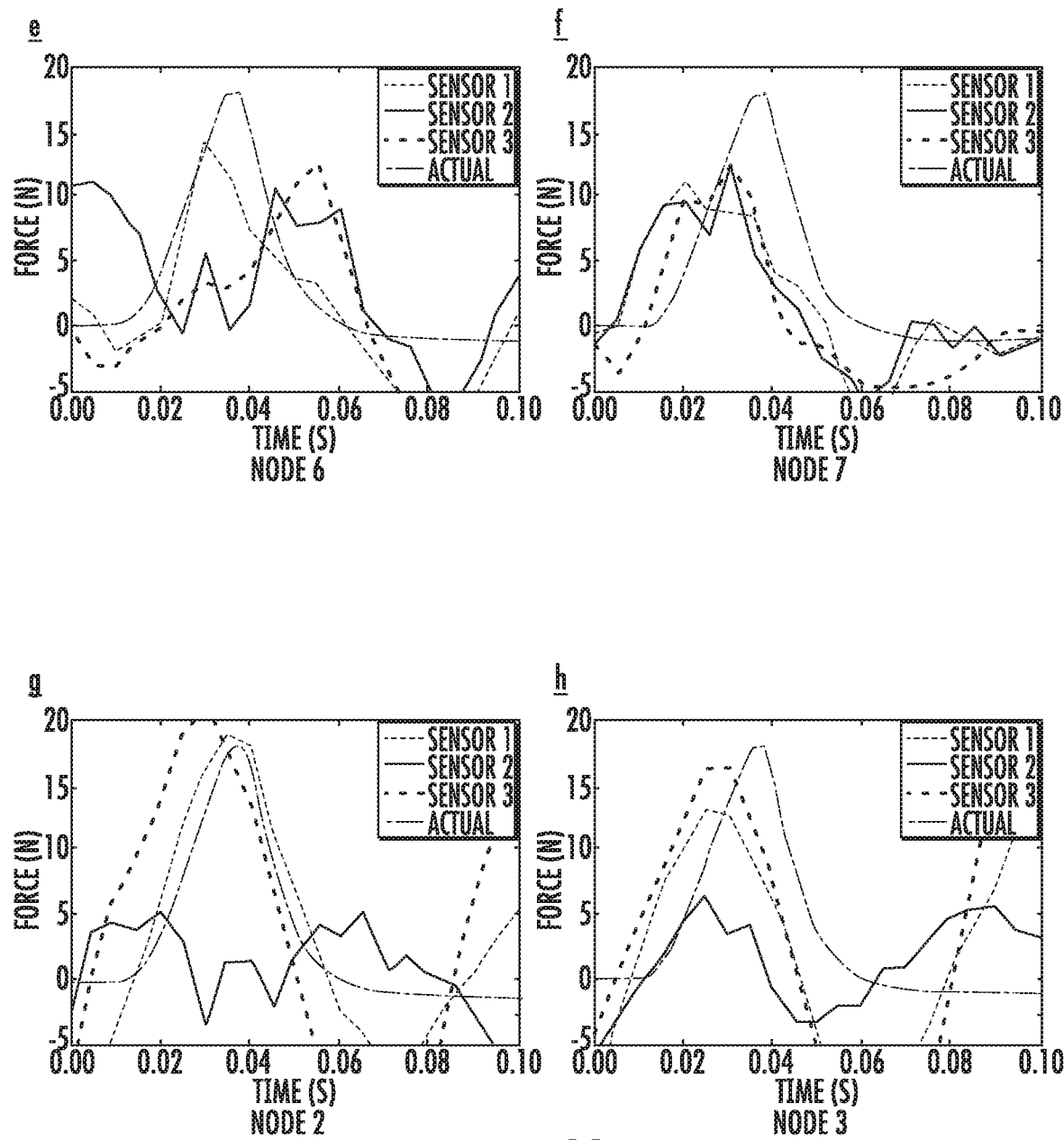

Force estimates by node for an impact on node 11 in FIG. 22, and the force correlation coefficient by location of the impact on node 11 in FIG. 23.

Figure 24:
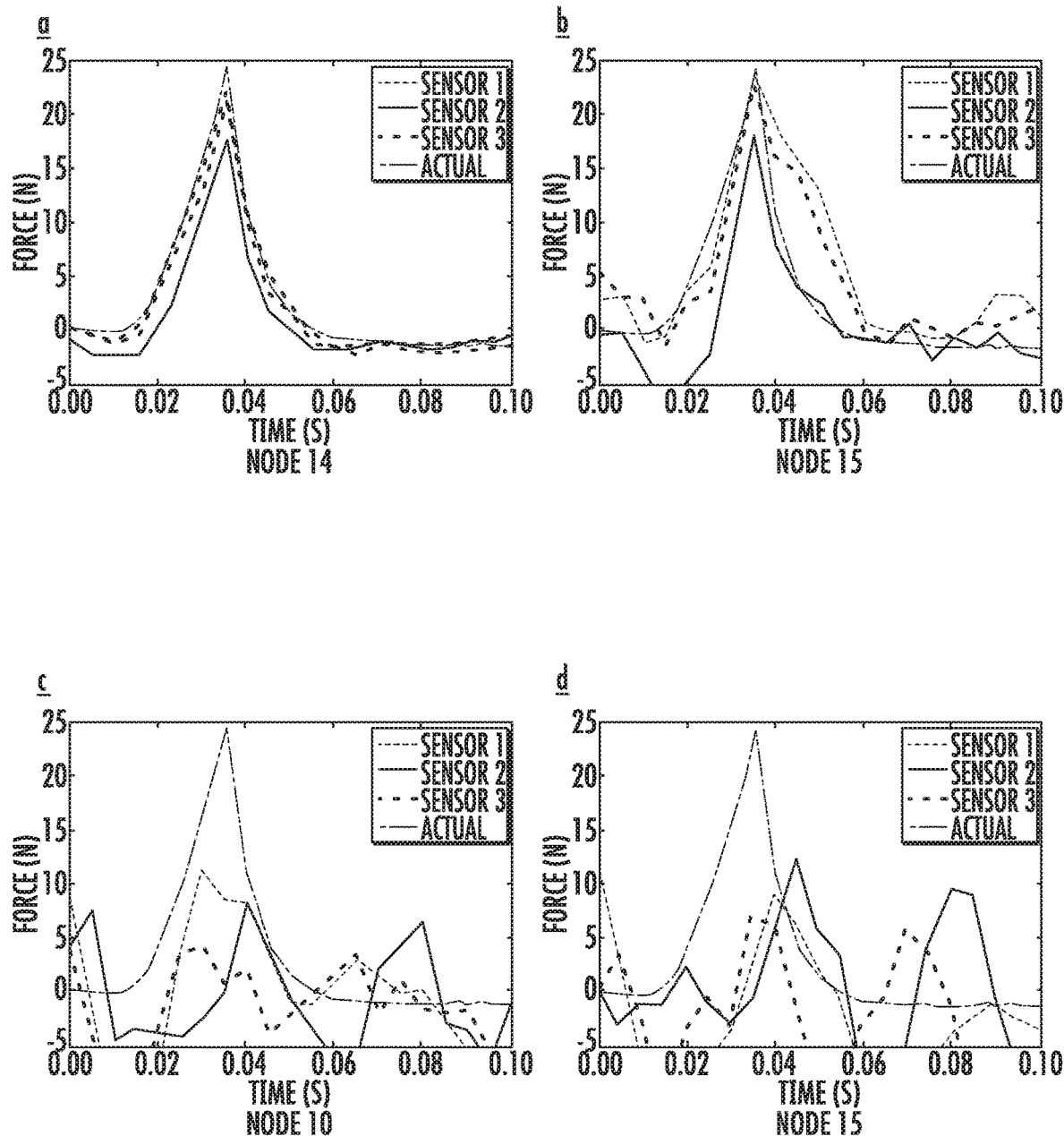
FIG. 24 presents the force estimates by node for an impact at one of the nodes.
Figure 24:
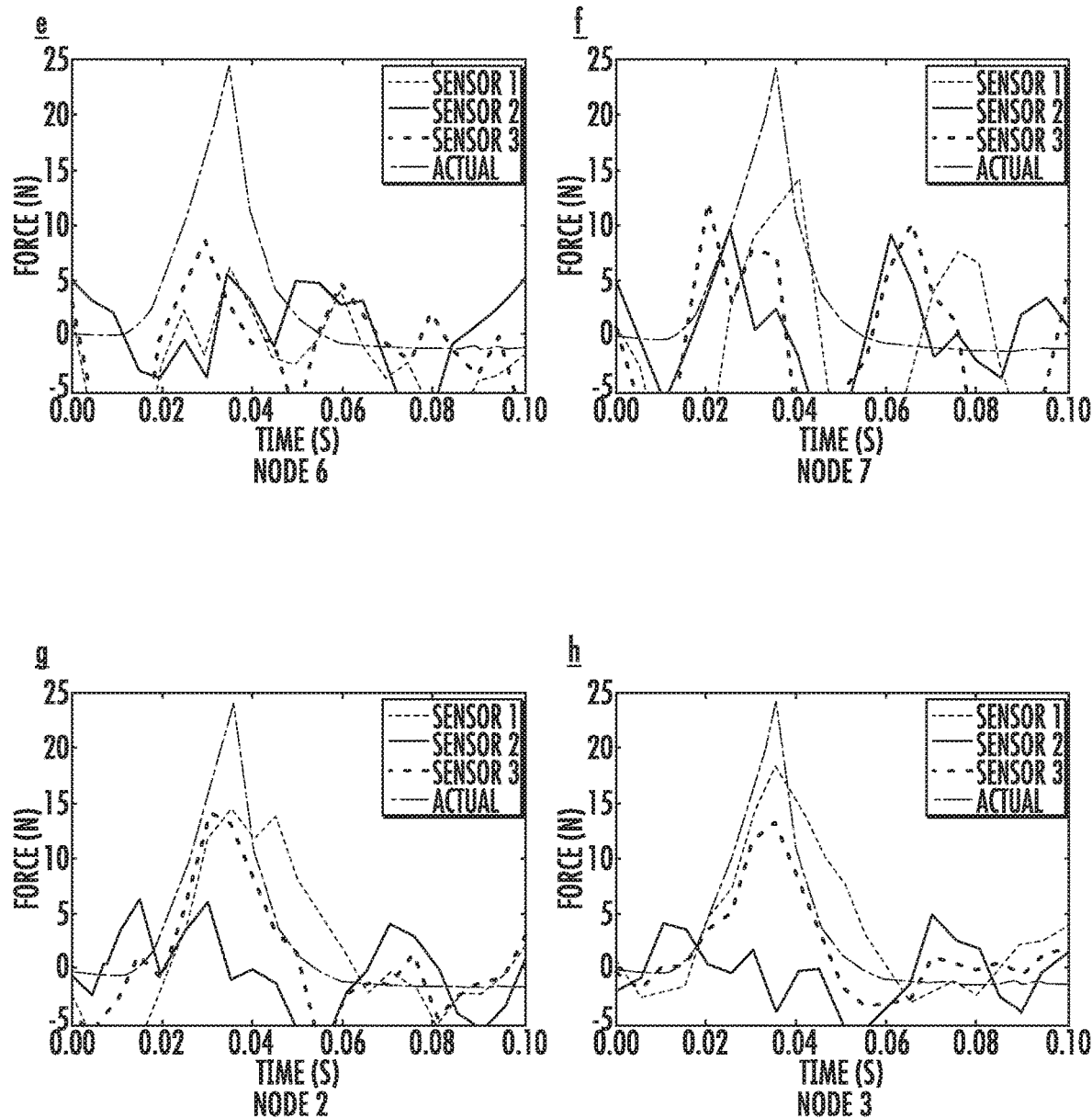
Figure 25:
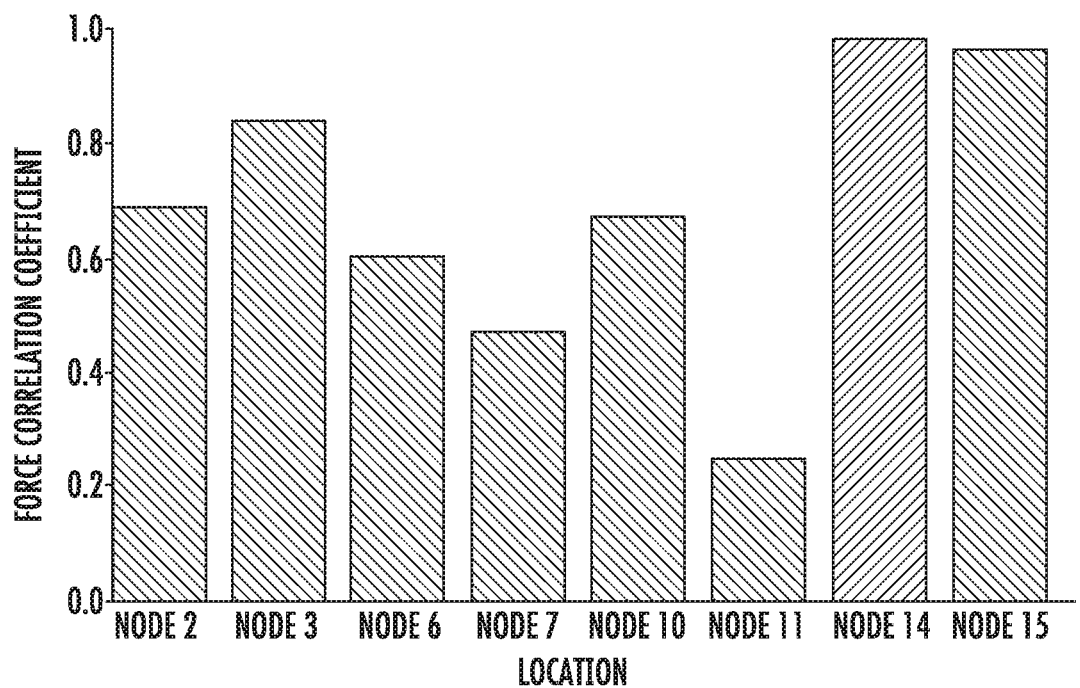
FIG. 25 presents the force correlation coefficients by location for an impact at one of the nodes.

Force estimates by node for an impact on node 14 in FIG. 24, and the force correlation coefficient by location of the impact on node 14 in FIG. 25.

Figure 27:
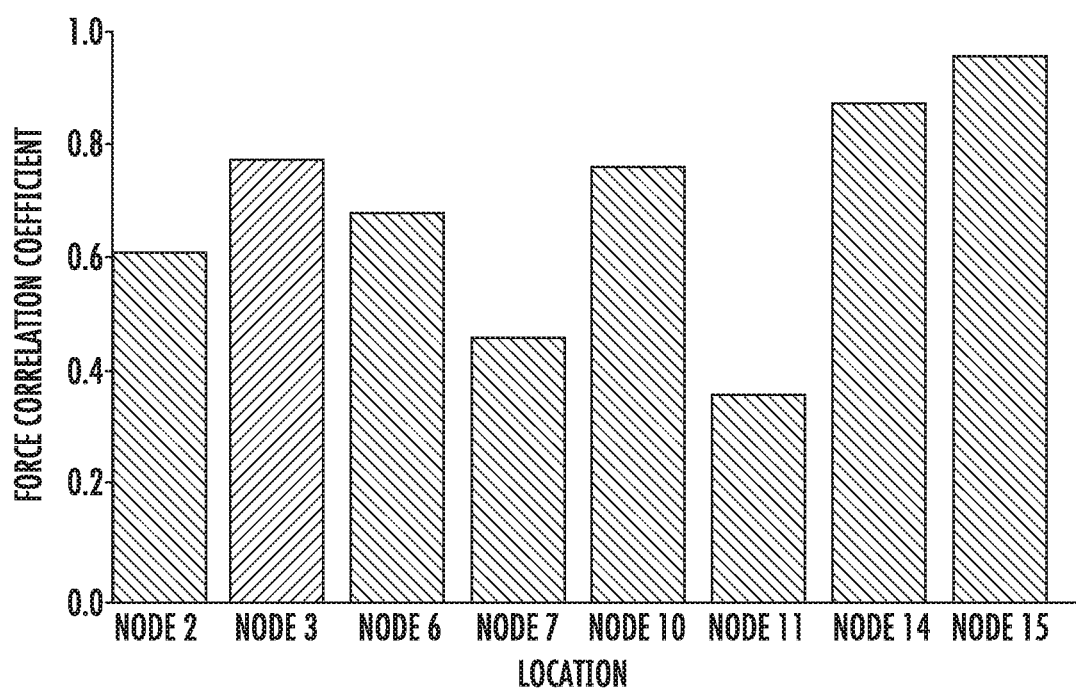
FIG. 27 presents the force correlation coefficients by location for an impact at one of the nodes.
Figure 26:
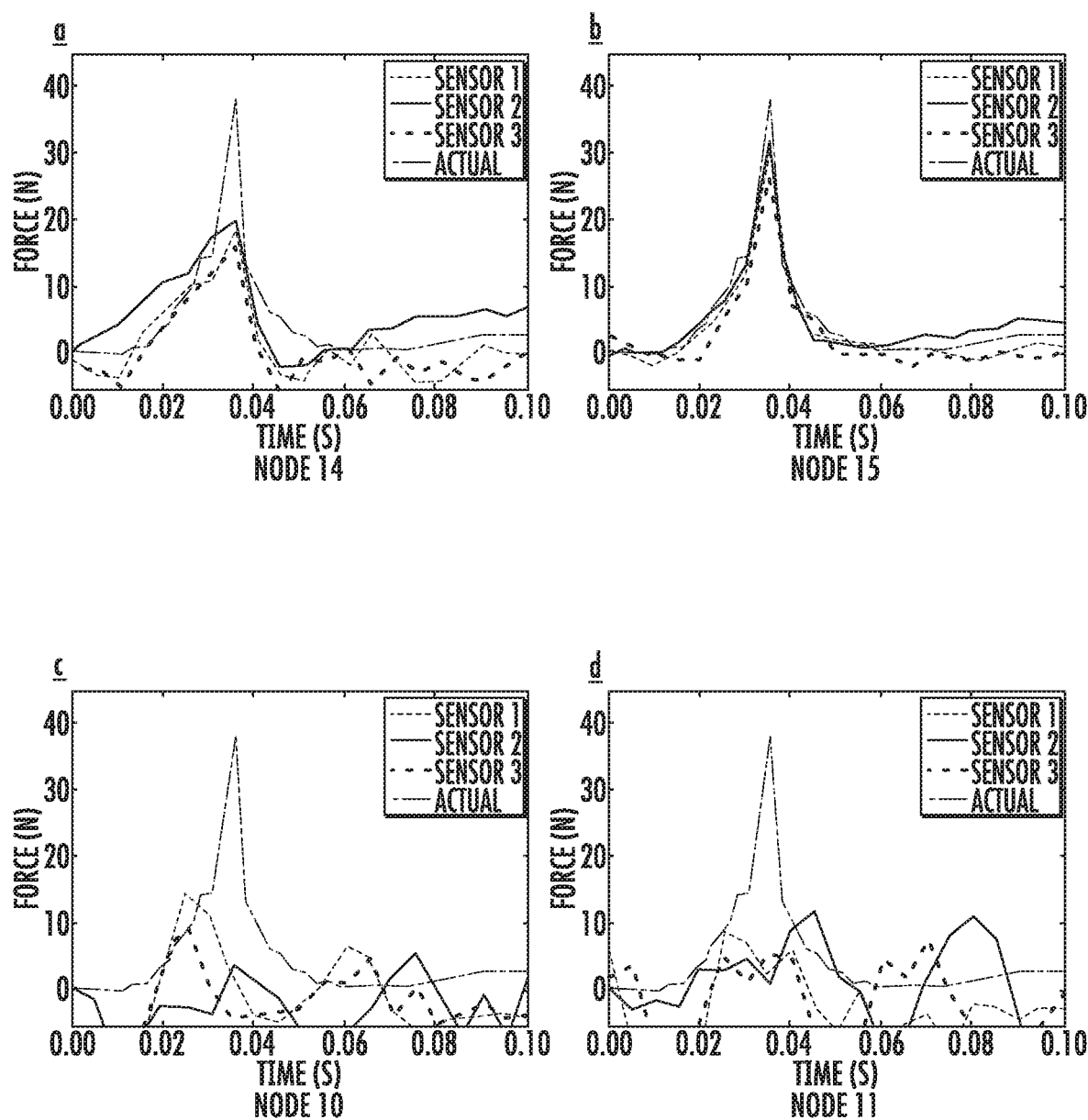
FIG. 26 presents the force estimates by node for an impact at one of the nodes.
Figure 26:
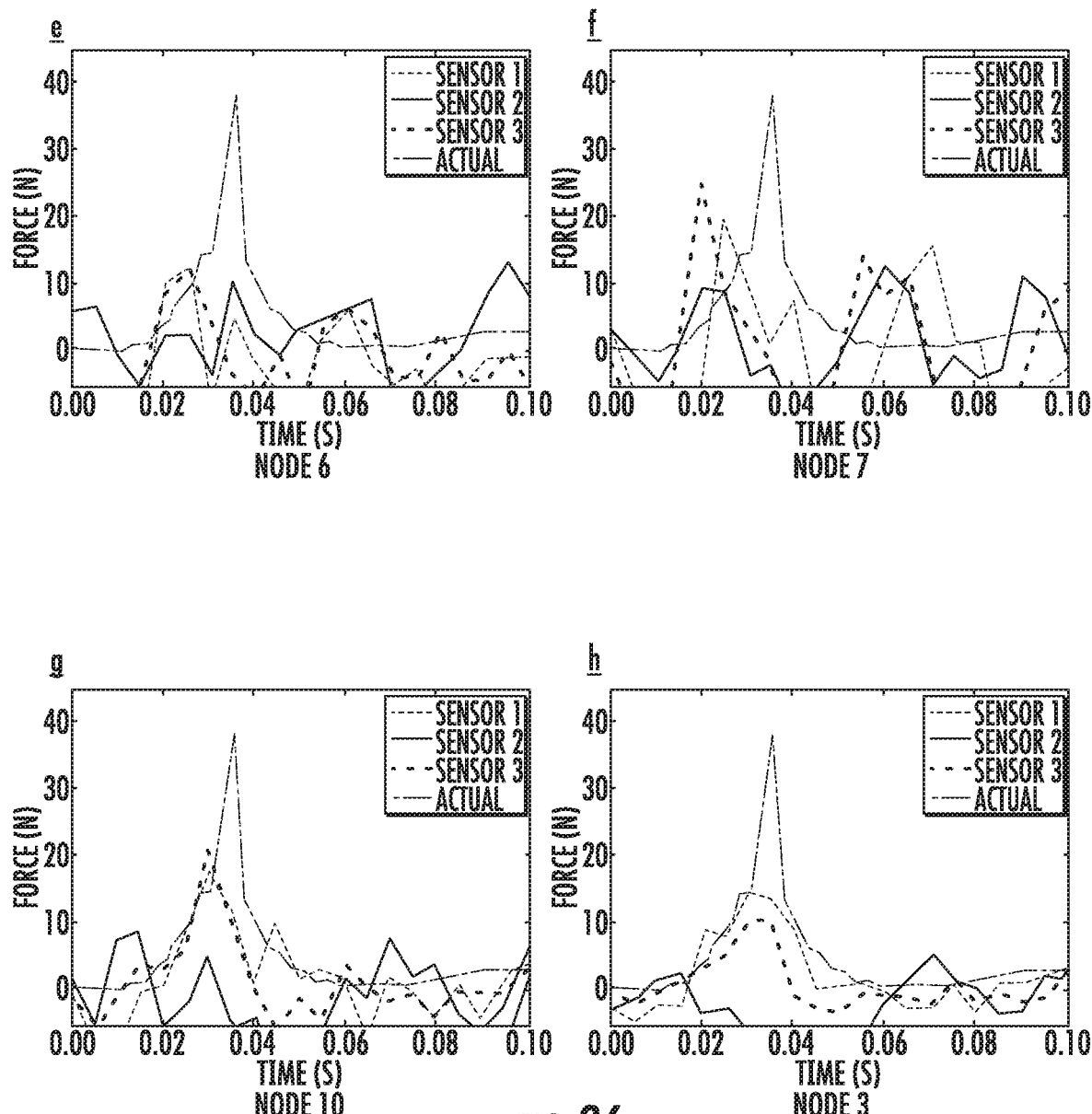

Force estimates by node for an impact on node 15 in FIG. 26, and the force correlation coefficient by location of the impact on node 15 in FIG. 27.

The results from the steel frame indicate the viability of the method. As shown, each impact set correctly identified the node the impact occurred on, and closely estimated the maximum force of the impact as seen in Table 2. Sometimes a node near the impact, such as Node 2 in FIG. 14, shows some convergence of the three sensors. This demonstrates that each transfer function has an area of influence.

TABLE 2

| Impact | $\hat{L}$ | Actual (N) | $\hat{F}_{i,j}(N)$ |
|---|---|---|---|
| Node 2 | Node 2 | 72.7 | 63.4 |
| Node 3 | Node 3 | 13.6 | 10.7 |
| Node 6 | Node 6 | 26.0 | 22.5 |
| Node 7 | Node 7 | 88.4 | 83.9 |
| Node 10 | Node 10 | 12.9 | 11.1 |
| Node 11 | Node 11 | 18.0 | 19.0 |
| Node 14 | Node 14 | 24.4 | 23.7 |
| Node 15 | Node 15 | 38.5 | 29.6 |

EXAMPLE 3

Moving from the experimental structure to an actual structure, the method was examined in a full scale structural environment. The experiments were performed in a second story office measuring 777 cm (25.5 ft) by 638 cm (20.9 ft), having reinforced concrete floors covered in vinyl tiles. The experimental layout is presented in FIG. 28.

Three PCB® Piezotronics 333B50 ICP® accelerometers with sensitivity of 1000 mV/g were installed on the floor near the walls. Data was collected at a rate of 1651.7 Hz with 2-sec windows. Five locations were chosen on the floor for the experiment. A basketball weighing 0.56 kg (1.23 lb) was dropped from two different heights at each location for a hundred repetitions. The trial named ball-low indicates a drop height of 1.42 m (4.63 ft), and the trial named ball-high indicates a drop height of 2.10 m (6.89 ft).

Figure 29:
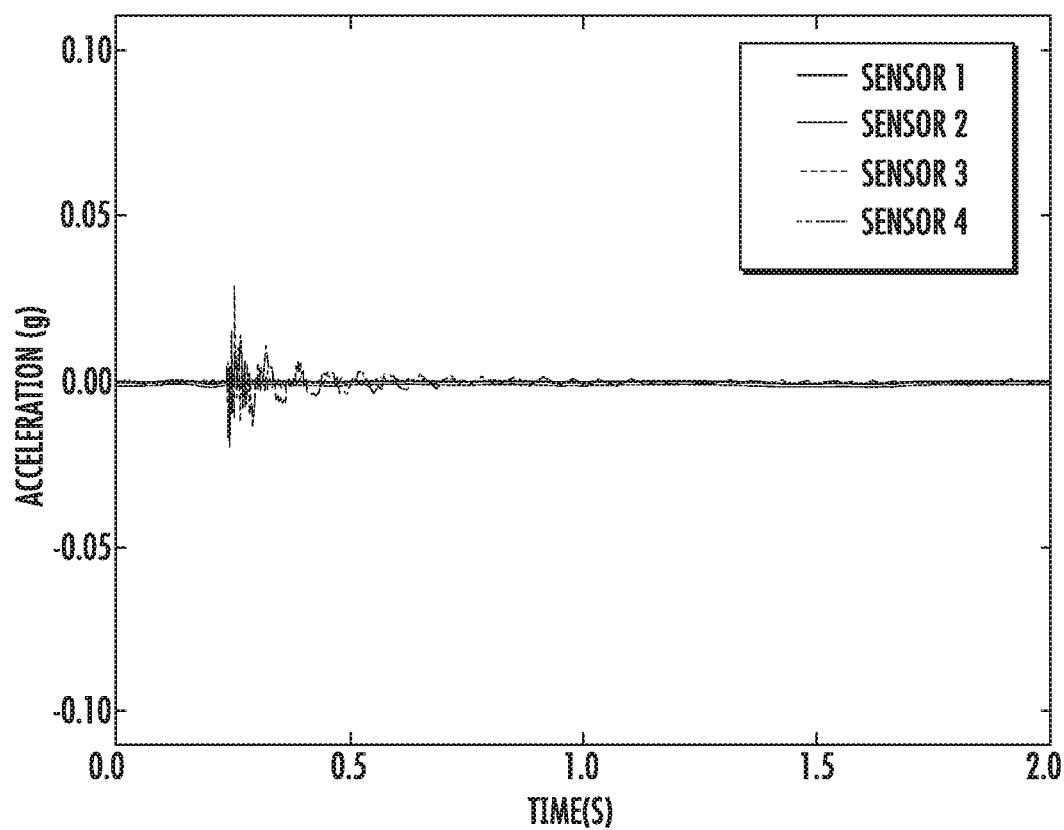
FIG. 29 presents an impact vibrational response at a several sensors.
Figure 30:
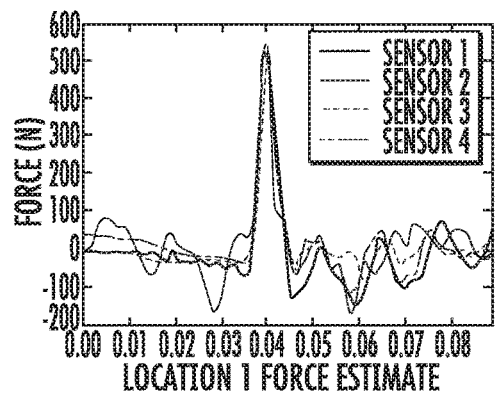
FIG. 30 presents the force estimates at different locations for an impact at one of the locations.
Figure 30:
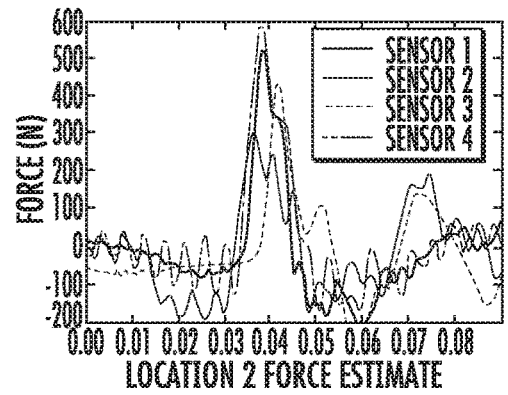
Figure 30:
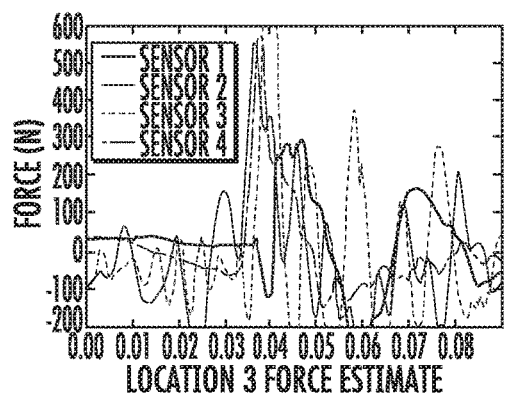
Figure 30:
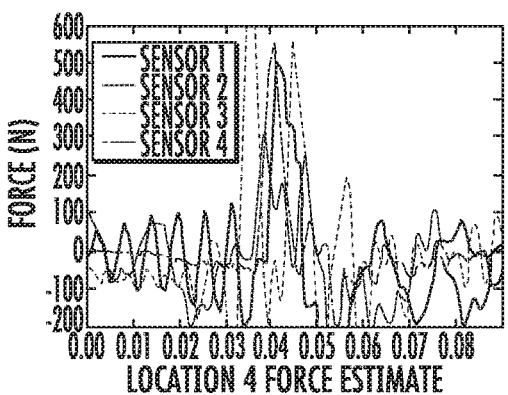
Figure 30:
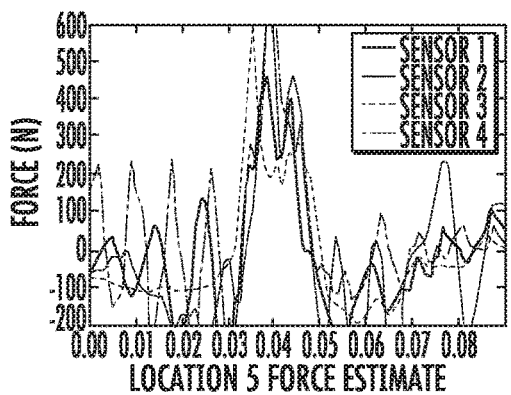
Figure 31:
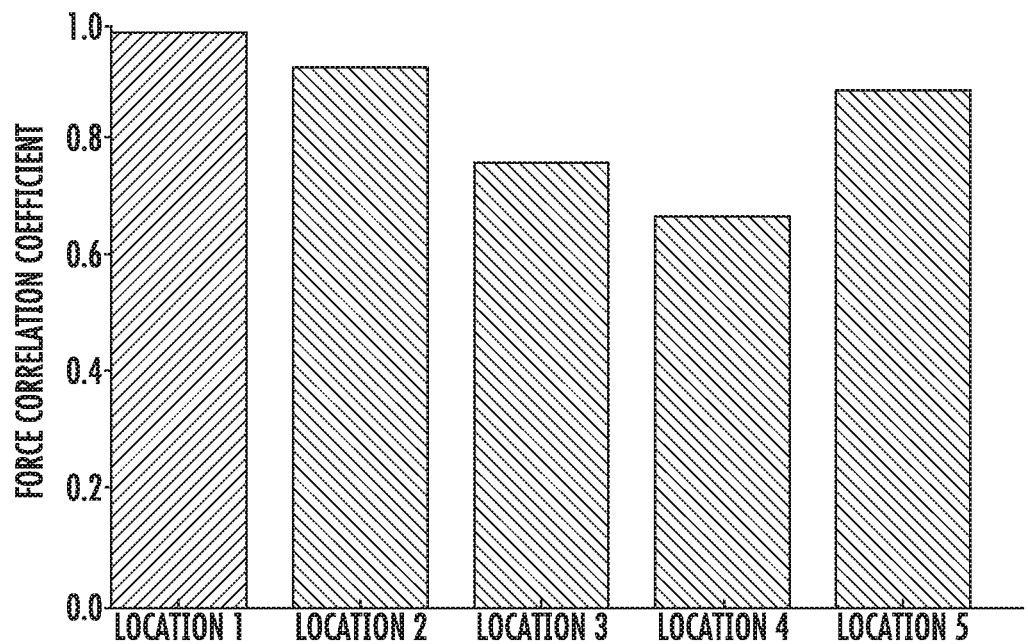
FIG. 31 presents the force correlation coefficients by location for an impact at one of the locations.

A sample impact for ball-low at location one is presented in FIG. 29 showing the structural vibration response measured by several sensors, FIG. 30 presents the force estimations at each location for this impact, and FIG. 31 shows the resulting correlation coefficients for the impact at location 1.

A location confusion matrix (Table 3) was generated to demonstrate the accuracy of the method. All 500 ball-low impacts were correctly identified giving a 100% success rate.

TABLE 3

| | | Identified | | | | |
|---|---|---|---|---|---|---|
| Location | | 1 | 2 | 3 | 4 | 5 |
| Actual | 1 | 100 | 0 | 0 | 0 | 0 |
| | 2 | 0 | 100 | 0 | 0 | 0 |
| | 3 | 0 | 0 | 100 | 0 | 0 |
| | 4 | 0 | 0 | 0 | 100 | 0 |
| | 5 | 0 | 0 | 0 | 0 | 100 |

Figure 32:
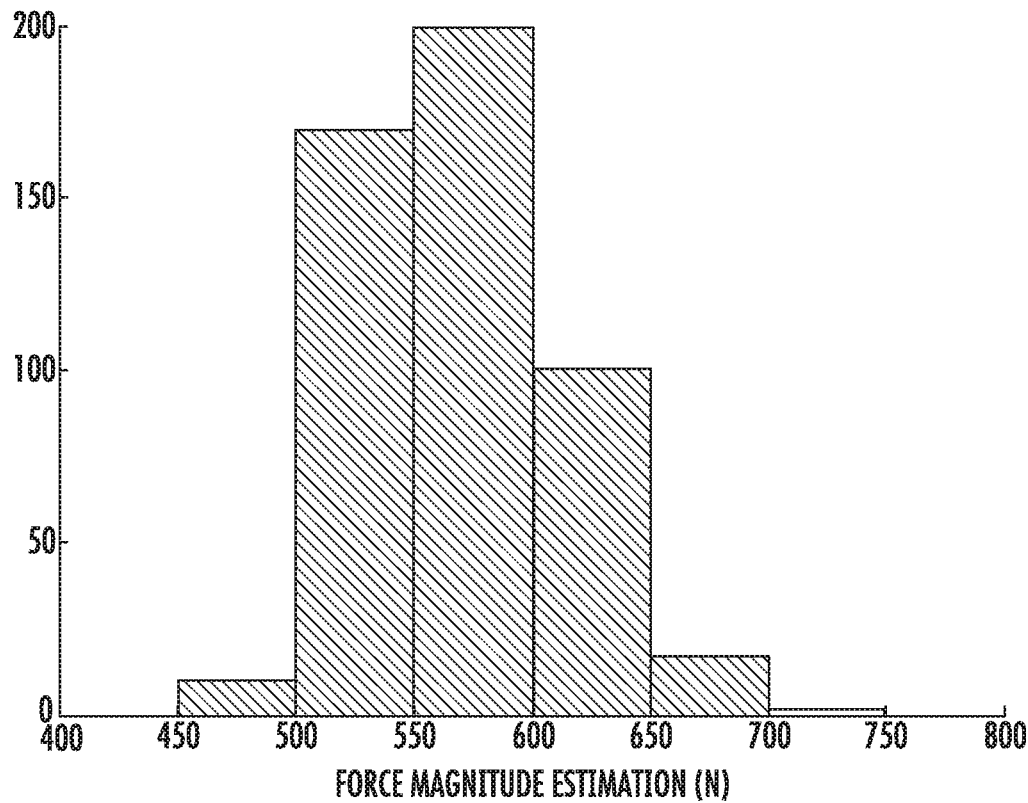
FIG. 32 presents a histogram of force magnitude estimates.

A histogram of the estimated force magnitudes shown in FIG. 32 demonstrates a tight grouping of the force estimates around 550-600 N (123-135 lb) having a mean of 569.5 N (128.0 lb) and standard deviation of 41.3 N (11.5 lb). The variation in estimates was believed to be due to how the ball drop experiment was performed, which was by a person holding and releasing the ball. As such, there would be expected to some variation between each repetition.

Figure 33:
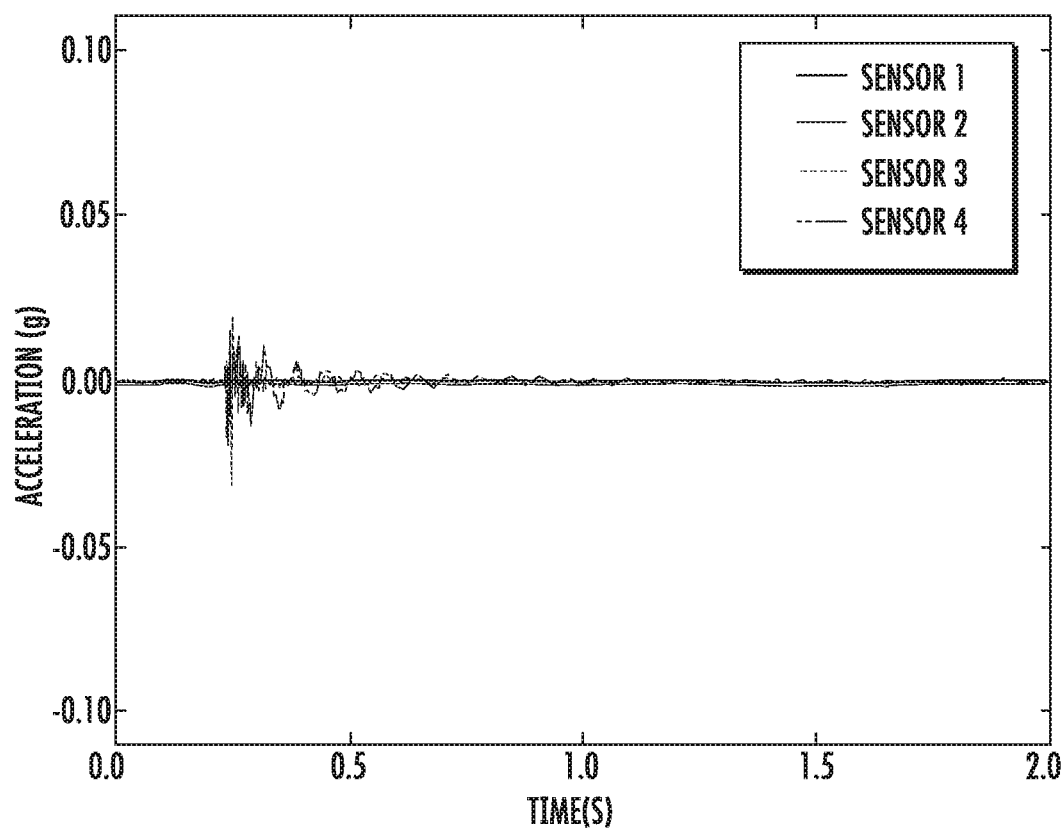
FIG. 33 presents an impact vibrational response at several sensors.
Figure 34:
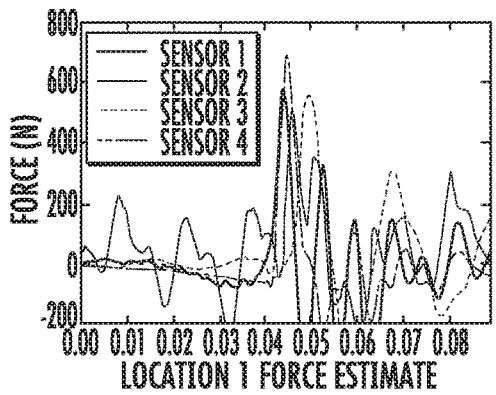
FIG. 34 presents the force estimates at different locations for an impact at one of the locations.
Figure 34:
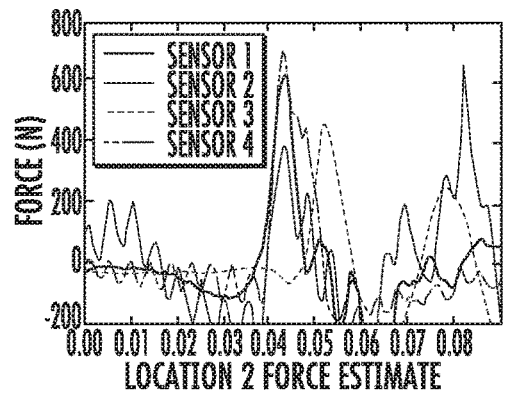
Figure 34:
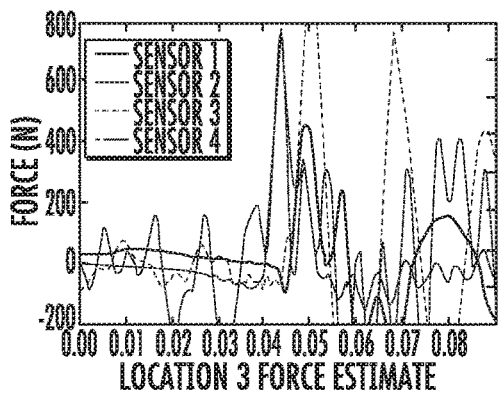
Figure 34:
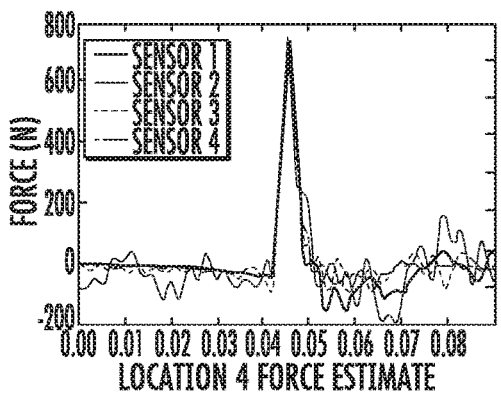
Figure 34:
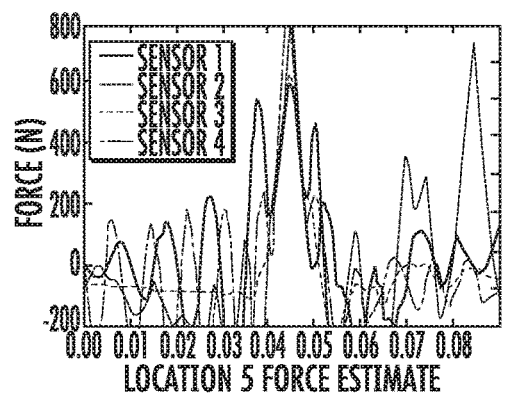
Figure 35:
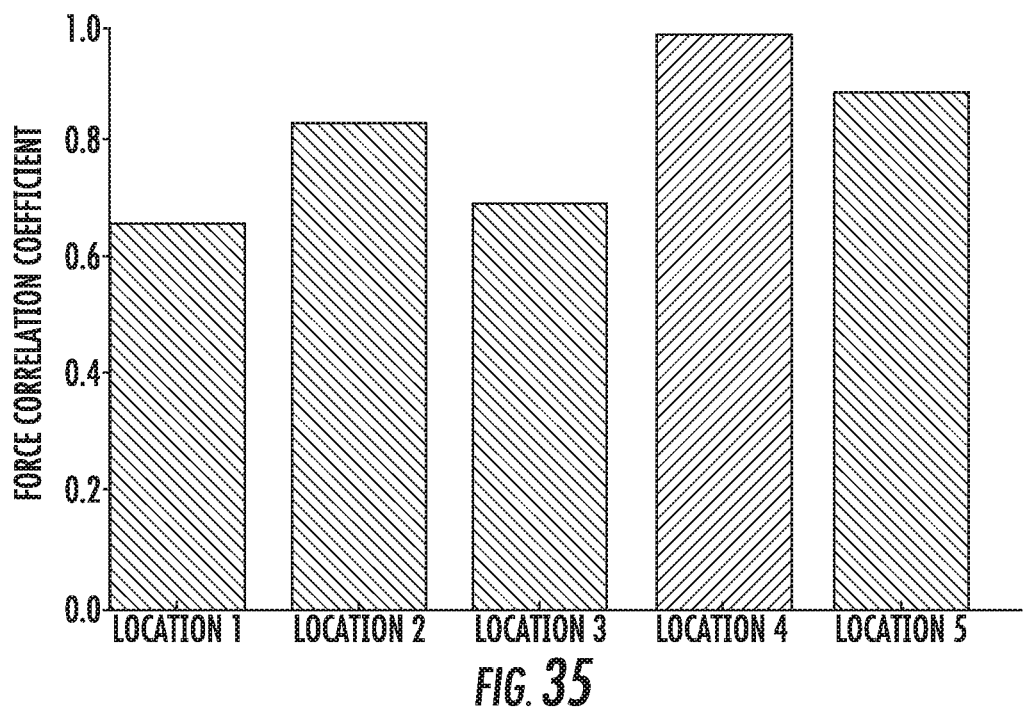
FIG. 35 presents the force correlations by location for an impact at one of the locations.

A sample impact for ball-high at location 4 was carried out. FIG. 33 shows the structural vibration response measured by the sensors. FIG. 34 shows the force estimations at each location, and FIG. 35 shows the resulting correlation coefficients, with the correct identification of location 4 as the impact site.

A location confusion matrix was generated (Table 4) to demonstrate the accuracy of the method for localization. Of the 500 ball-high impacts, 499 were correctly identified which was a 99.8% success rate.

TABLE 4

| | | Identified | | | | |
|---|---|---|---|---|---|---|
| Location | | 1 | 2 | 3 | 4 | 5 |
| Actual | 1 | 100 | 0 | 0 | 0 | 0 |
| | 2 | 0 | 100 | 0 | 0 | 0 |
| | 3 | 1 | 0 | 99 | 0 | 0 |
| | 4 | 0 | 0 | 0 | 100 | 0 |
| | 5 | 0 | 0 | 0 | 0 | 100 |

Figure 36:
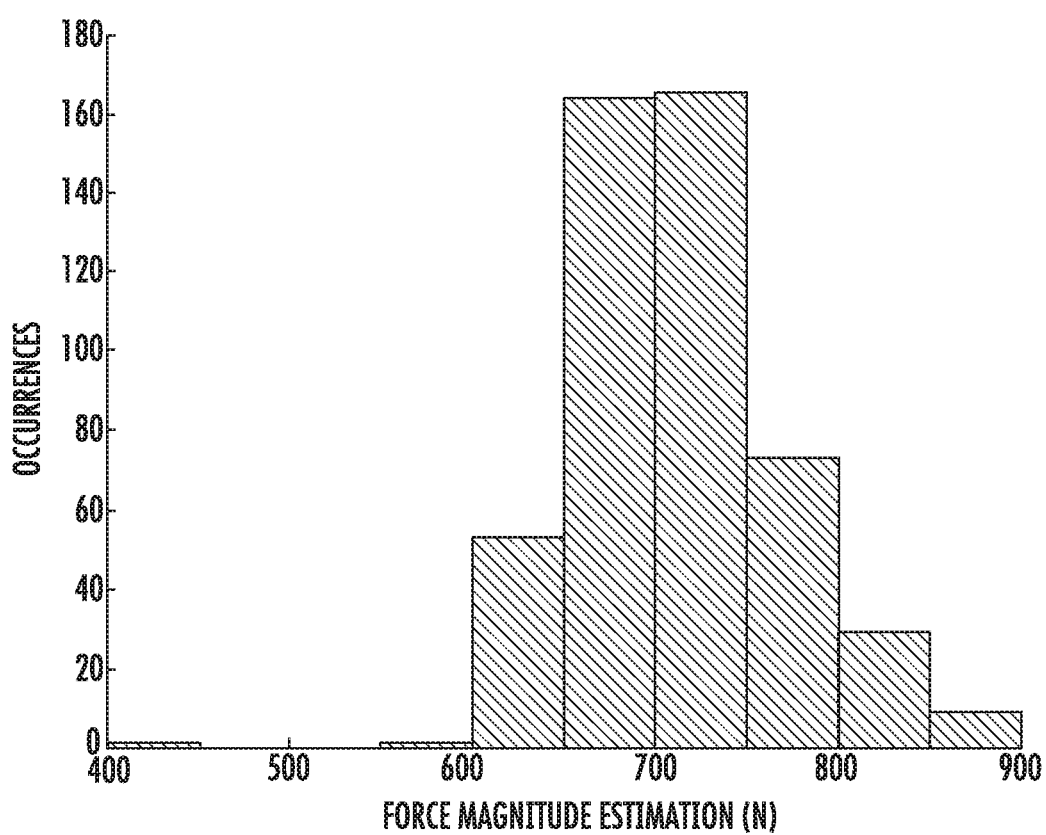
FIG. 36 presents a histogram of force magnitude estimates.

As shown in the histogram of FIG. 36, the force estimations center around 700 N (157 lb) with a mean of 713.2 N (160.3 lb) and standard deviation of 56.5 N (12.7 lb). Variations in the estimates are believed to stem from how the trial was performed like with the ball-low trials.

EXAMPLE 4

Three different people jumped at each location in the layout as described in Example 3 one hundred times. The trial names indicate the following: d-jump is a male weighing 80 kg (176 lb), j-jump is a female weighing 55 kg (121 lb), w-jump is a male weighing 85 kg (187 lb). The height was not recorded for each jump, as jump height landings will vary in actual use.

Figure 37:
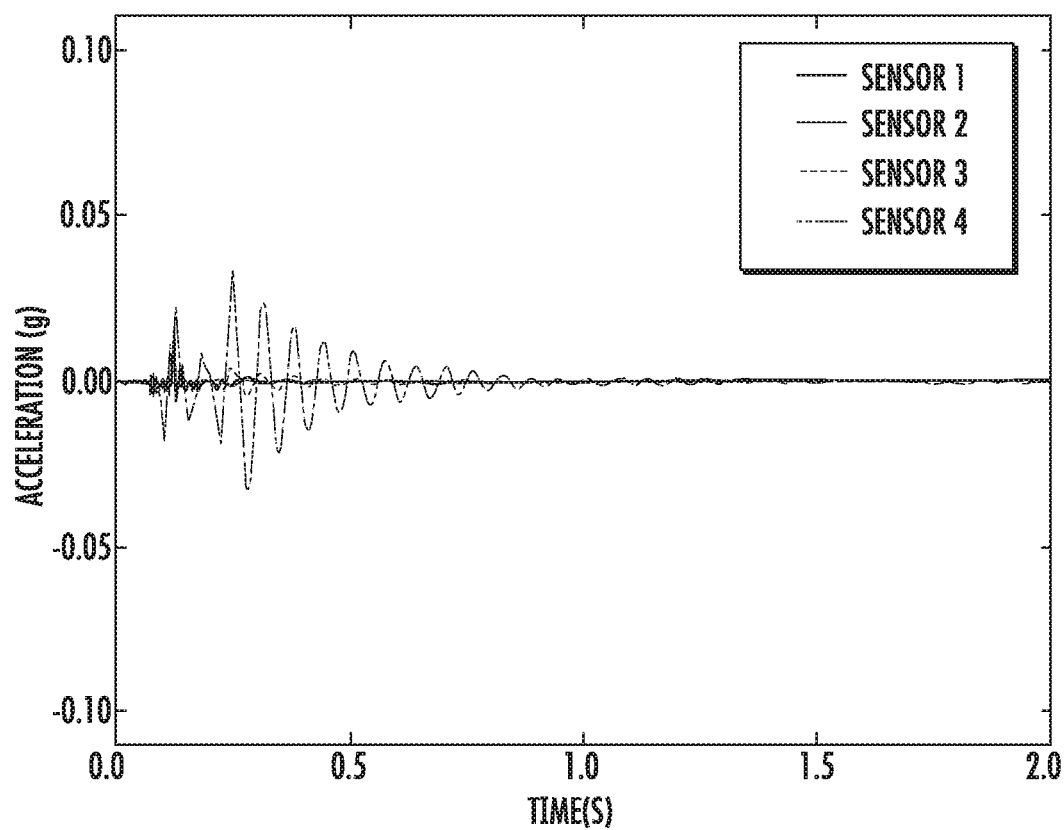
FIG. 37 presents an impact vibrational response at several sensors.
Figure 38:
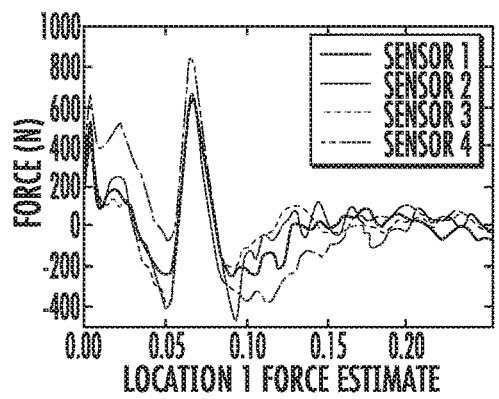
FIG. 38 presents the force estimates at different locations for an impact at one of the locations.
Figure 38:
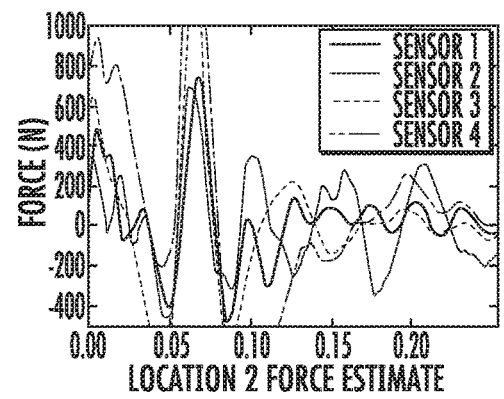
Figure 38:
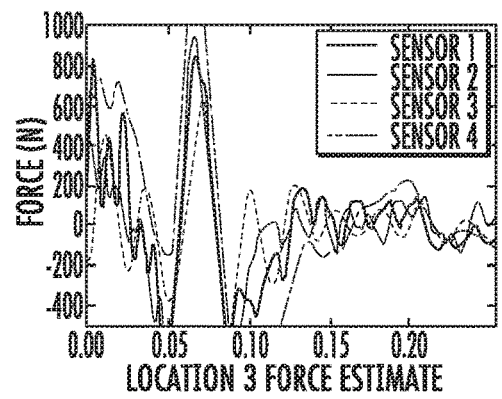
Figure 38:
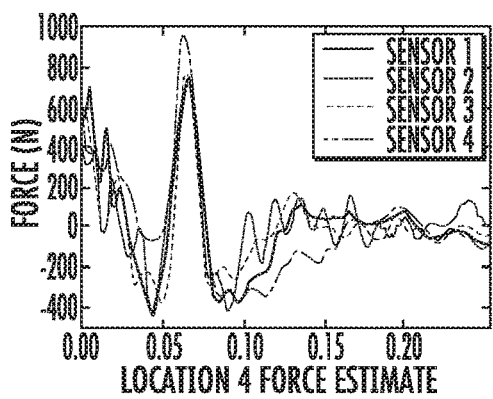
Figure 38:
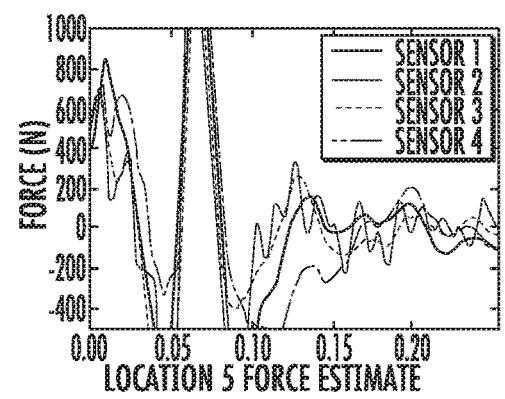
Figure 39:
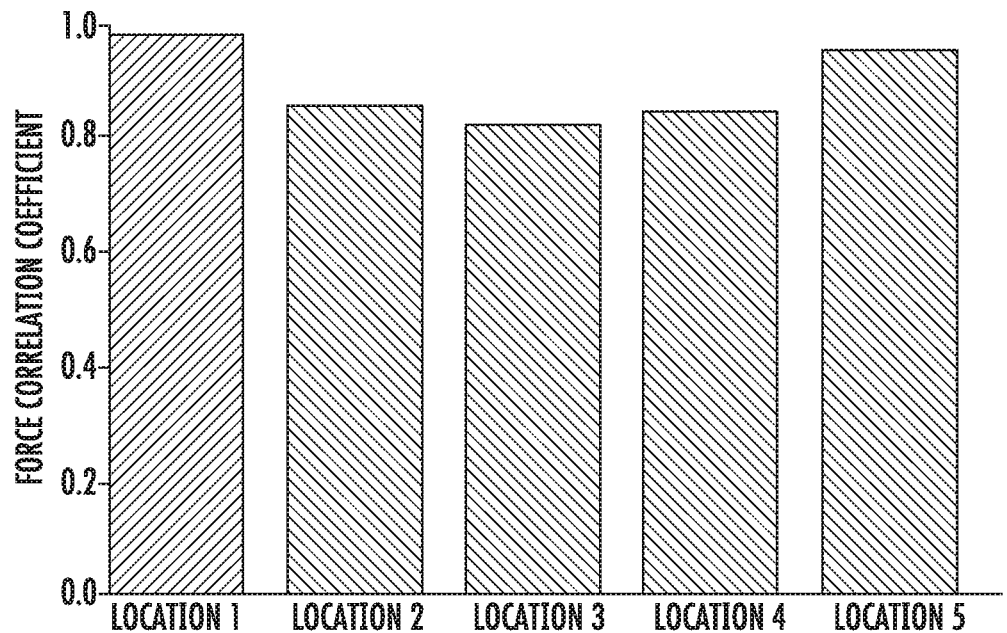
FIG. 39 presents the force correlations by location for an impact at one of the locations.

A sample impact for d-jump at location 2 is illustrated in FIG. 37 showing the structural vibration response measured by the sensors. FIG. 38 presents the force estimations at each location, and FIG. 39 shows the resulting correlation coefficient.

A location confusion matrix was generated (Table 5) to demonstrate the accuracy of the method. Of the 500 d-jump impacts, 476 were correctly identified which is a 95.2% success rate.

TABLE 5

|  | | Identified | | | | |
|---|---|---|---|---|---|---|
| Location | | 1 | 2 | 3 | 4 | 5 |
| Actual | 1 | 86 | 0 | 0 | 2 | 12 |
|  | 2 | 0 | 100 | 0 | 0 | 0 |
|  | 3 | 0 | 0 | 91 | 1 | 8 |
|  | 4 | 0 | 0 | 0 | 99 | 1 |
|  | 5 | 0 | 0 | 0 | 0 | 100 |

Figure 40:
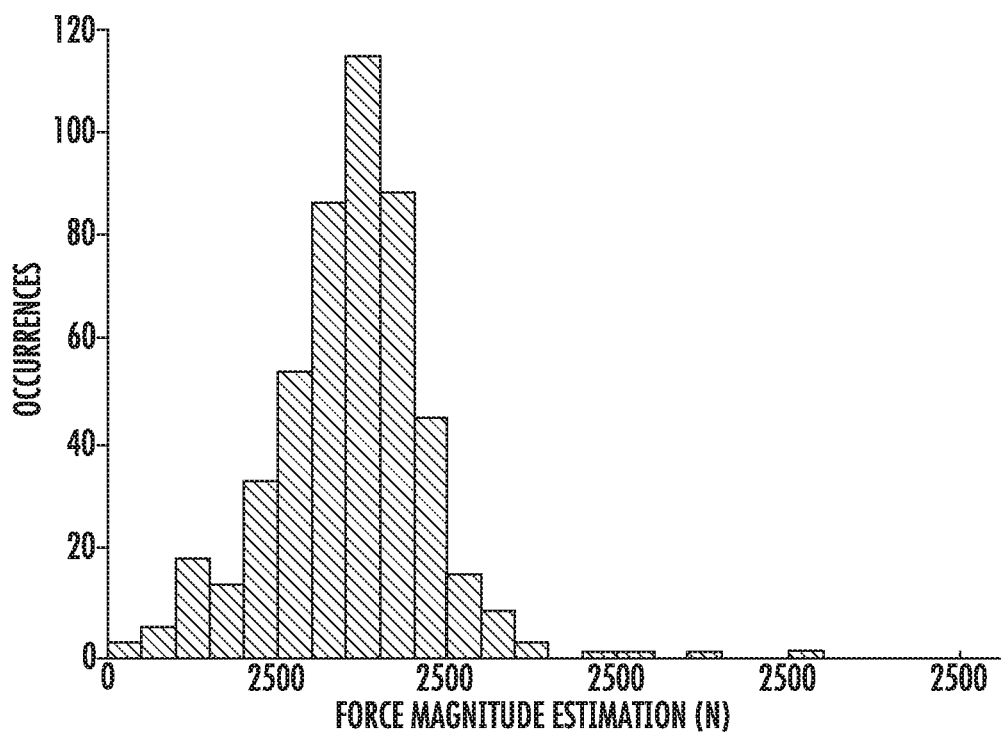
FIG. 40 presents a histogram of force magnitude estimates.

As shown in the histogram of FIG. 40, the force estimations center around 700-800 N (157-180 lb) having a mean of 711.4 N (159.9 lb) and standard deviation of 226.9 N (51.1 lb). Since this trial is record of human-induced vibrations, there is bound to be some variation as the person jumping would not have jumped to the same height every time.

Figure 41:
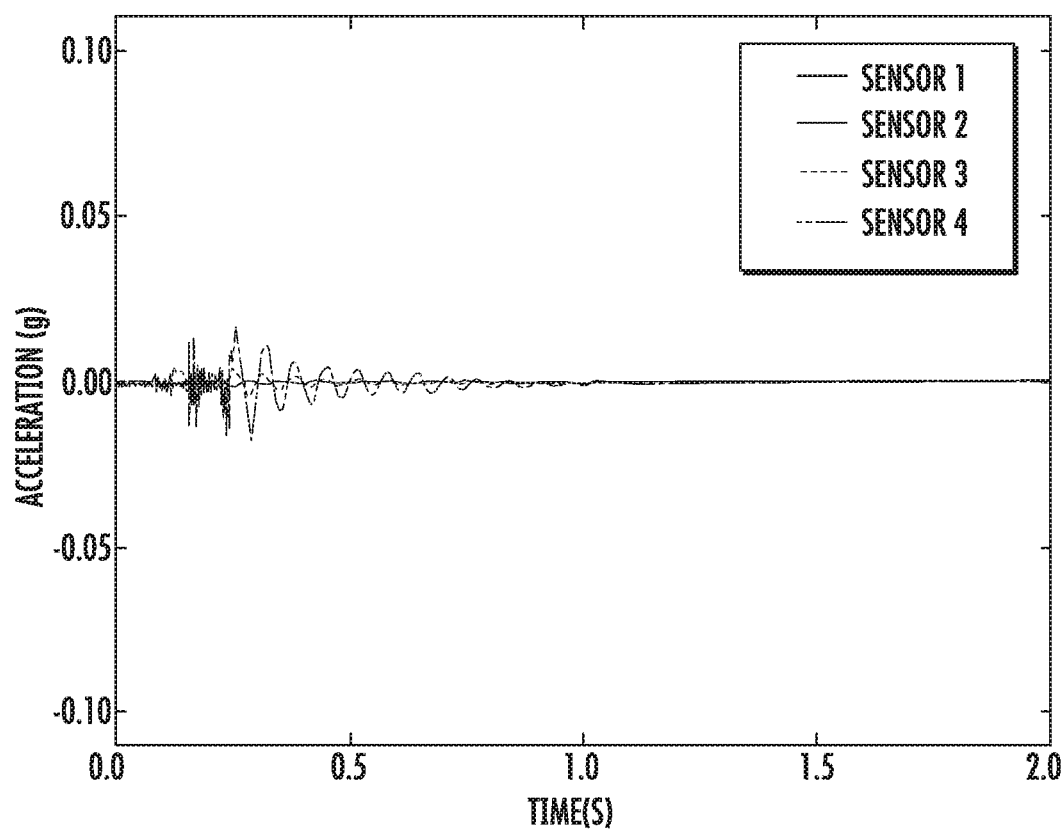
FIG. 41 presents an impact vibrational response at several sensors.
Figure 42:
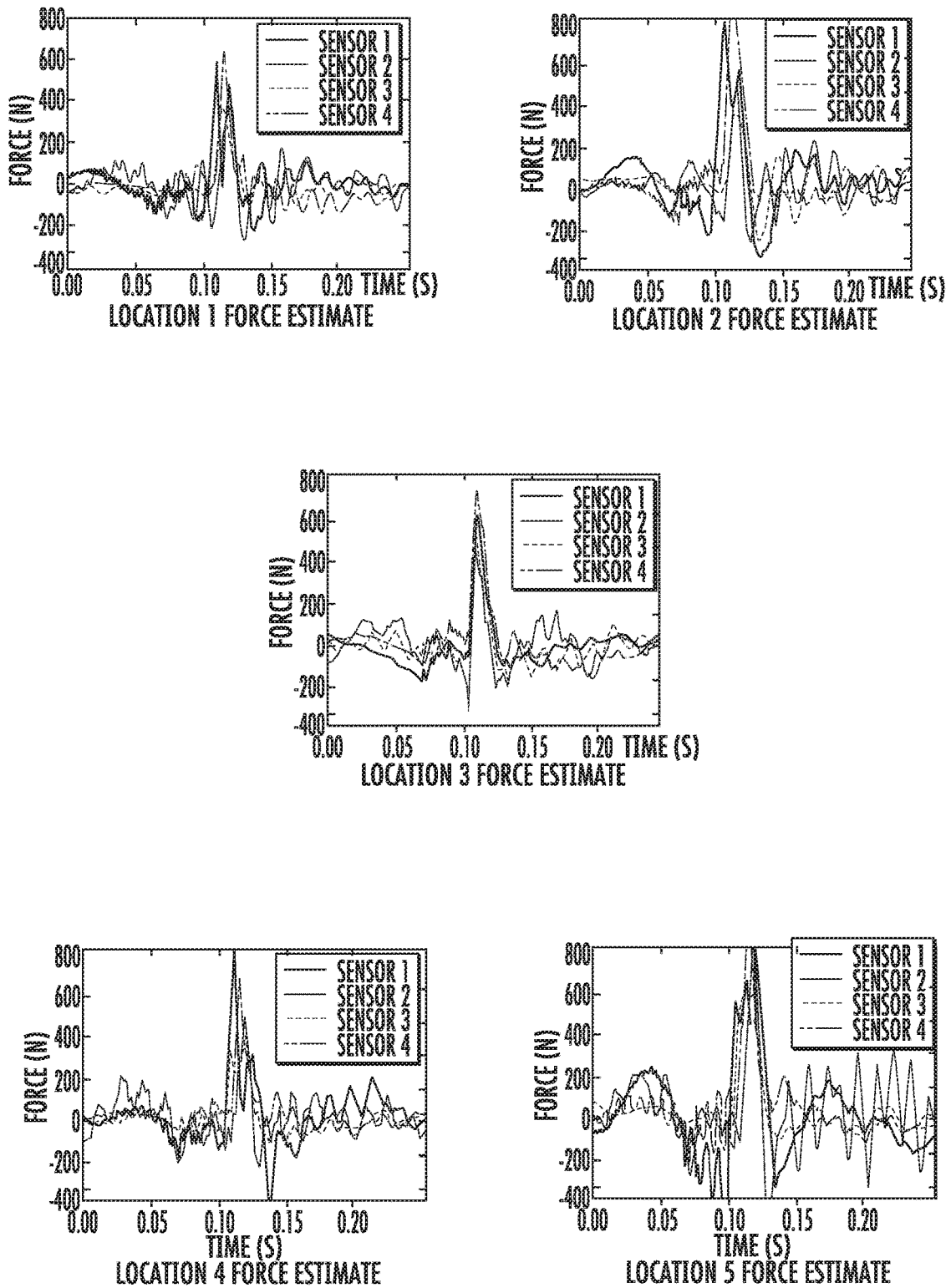
FIG. 42 presents the force estimates at different locations for an impact at one of the locations.
Figure 43:
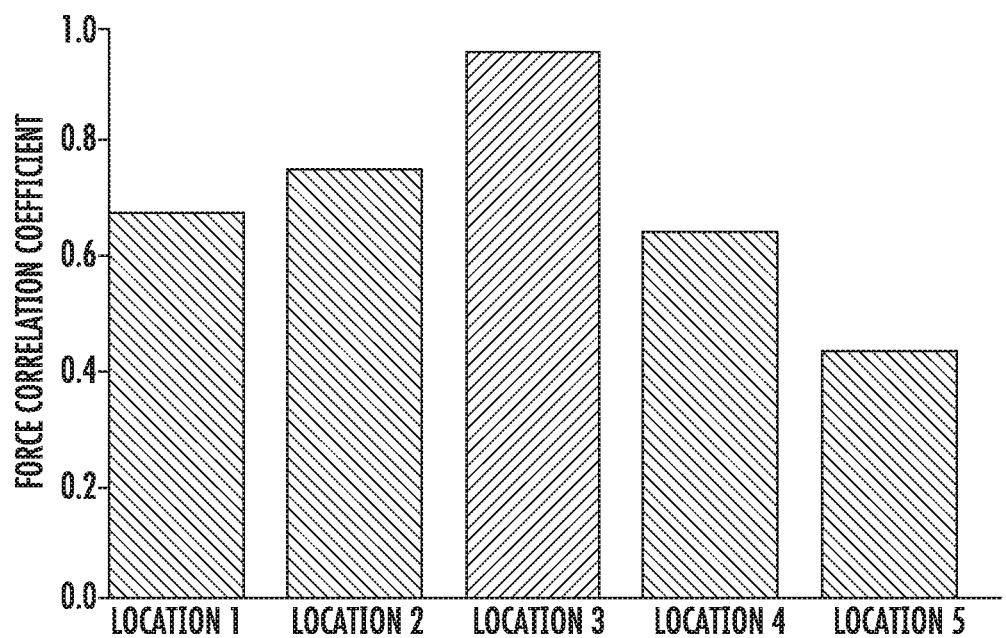
FIG. 43 presents the force correlations by location for an impact at one of the locations.

A sample impact for Hump at location 3 was carried out. FIG. 41 shows the vibrational response as measured by the sensors for the impact at location 3. FIG. 42 shows the force estimations at each location, and FIG. 43 shows the resulting correlation coefficients for the location 3 events.

A location confusion matrix was generated (Table 6) to demonstrate the accuracy of the method. Of the 500 j-jump impacts, 477 were correctly identified which is a 95.4% success rate.

TABLE 6

|  | | Identified | | | | |
|---|---|---|---|---|---|---|
| Location | | 1 | 2 | 3 | 4 | 5 |
| Actual | 1 | 92 | 3 | 0 | 0 | 5 |
|  | 2 | 0 | 100 | 0 | 0 | 0 |
|  | 3 | 2 | 0 | 98 | 0 | 0 |
|  | 4 | 0 | 2 | 1 | 94 | 3 |
|  | 5 | 2 | 4 | 0 | 1 | 93 |

Figure 44:
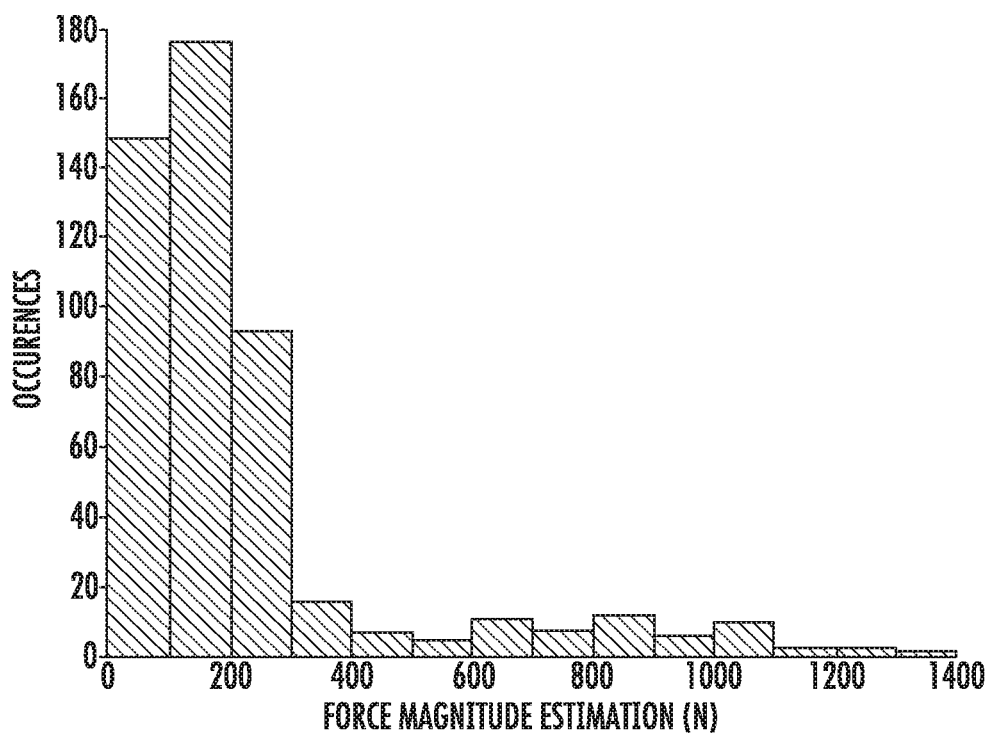
FIG. 44 presents a histogram of force magnitude estimates.

As shown in the histogram of FIG. 44, the force estimations tend to be around 100-200 N (22-45 lb) having a mean of 227.1 N (51.1 lb) and standard deviation of 244.8 N (55.0 lb). The interesting point here is that the estimates tend to be lower in magnitude which makes sense considering the lighter weight of the person jumping compared to the other two jumpers.

Figure 45:
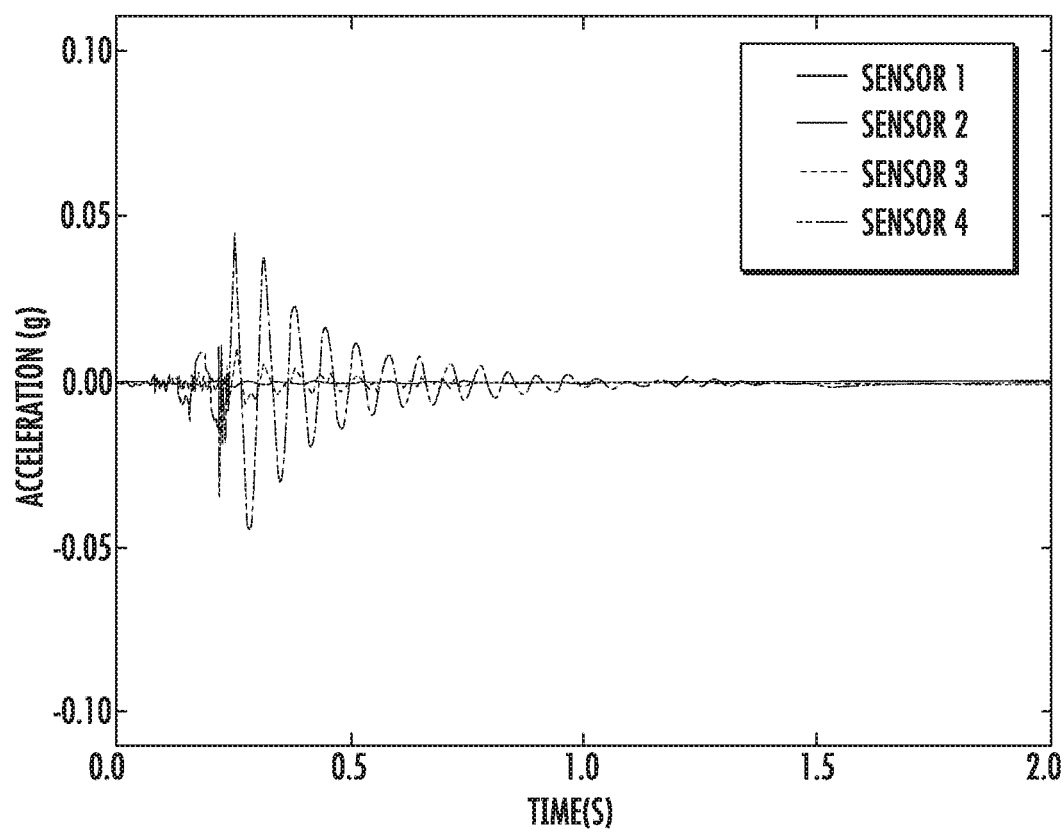
FIG. 45 presents an impact vibrational response at several sensors.
Figure 46:
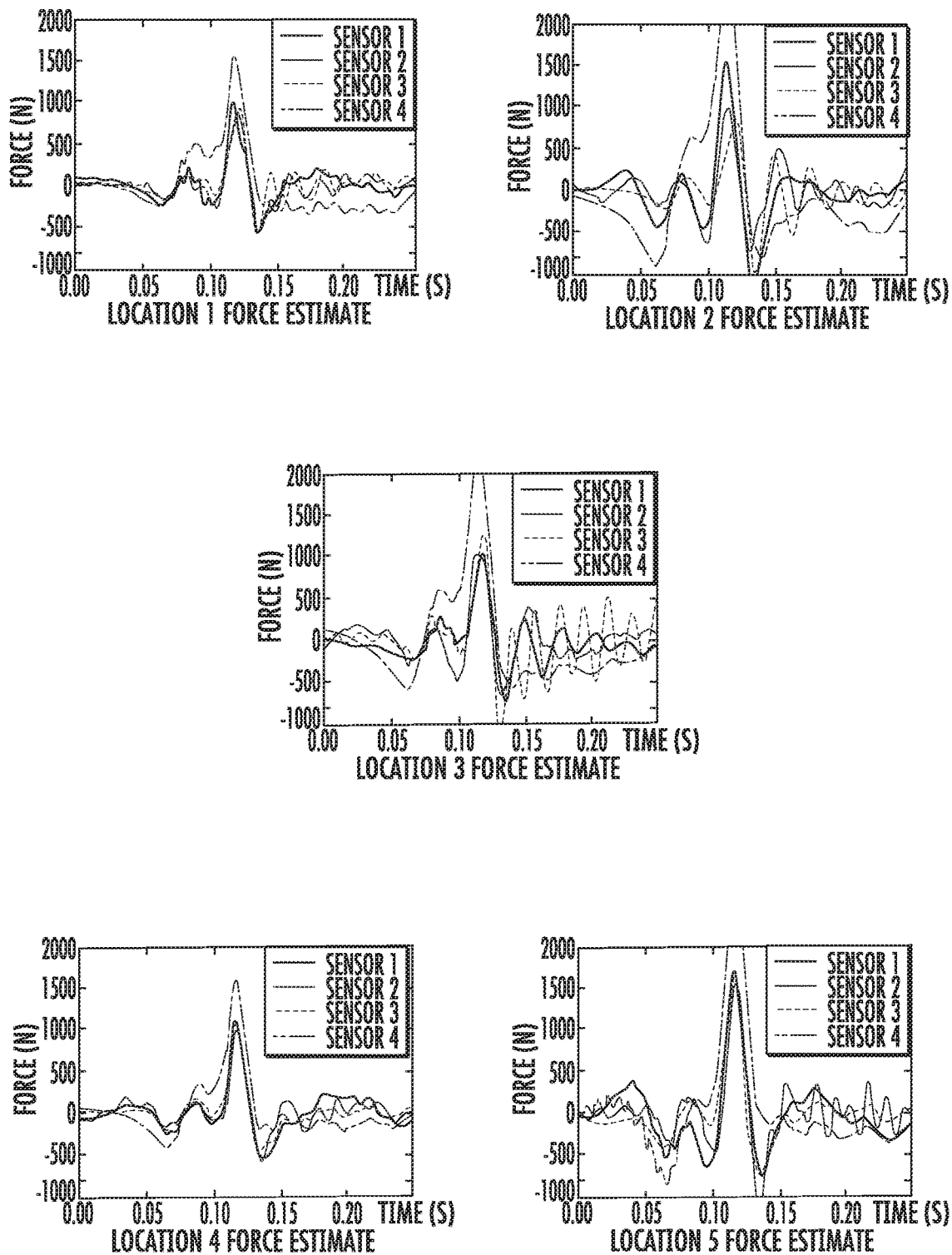
FIG. 46 presents the force estimates at different locations for an impact at one of the locations.
Figure 47:
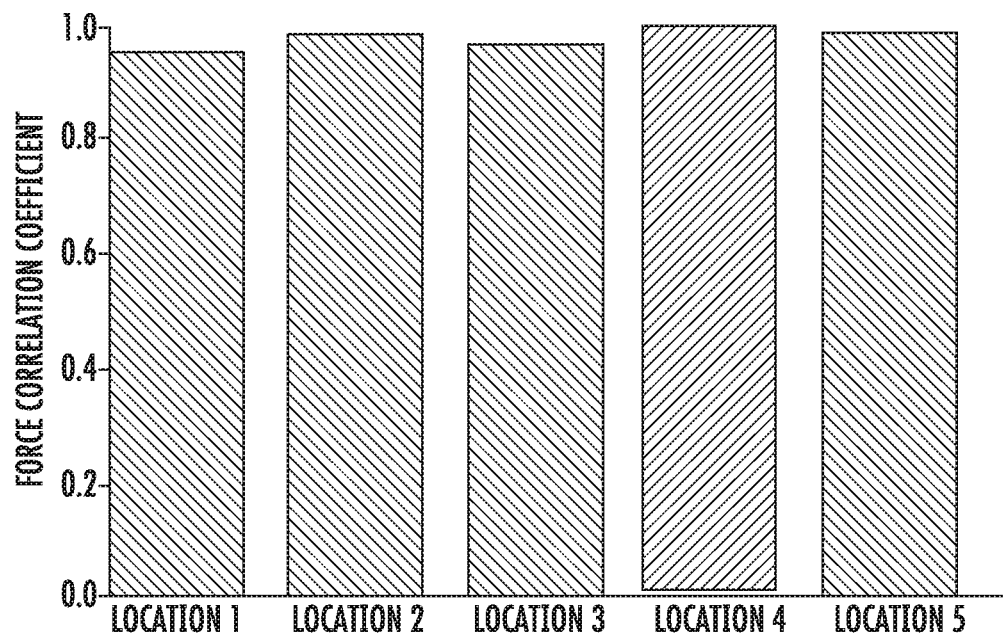
FIG. 47 presents the force correlations by location for an impact at one of the locations.

A sample impact for w-jump at location five is presented with FIG. 45 showing the structural vibration response measured by several sensors, FIG. 46 showing the force estimations at each location, and FIG. 47 showing the resulting correlation coefficients.

A location confusion matrix was generated (Table 7) to demonstrate the accuracy of the method. Of the 500 w-jump impacts, 428 were correctly identified which is an 85.6% success rate.

TABLE 7

|  | | Identified | | | | |
|---|---|---|---|---|---|---|
| Location | | 1 | 2 | 3 | 4 | 5 |
| Actual | 1 | 45 | 6 | 4 | 13 | 32 |
|  | 2 | 1 | 98 | 0 | 0 | 1 |
|  | 3 | 3 | 3 | 90 | 0 | 4 |
|  | 4 | 0 | 0 | 1 | 96 | 3 |
|  | 5 | 0 | 1 | 0 | 0 | 99 |

Figure 48:
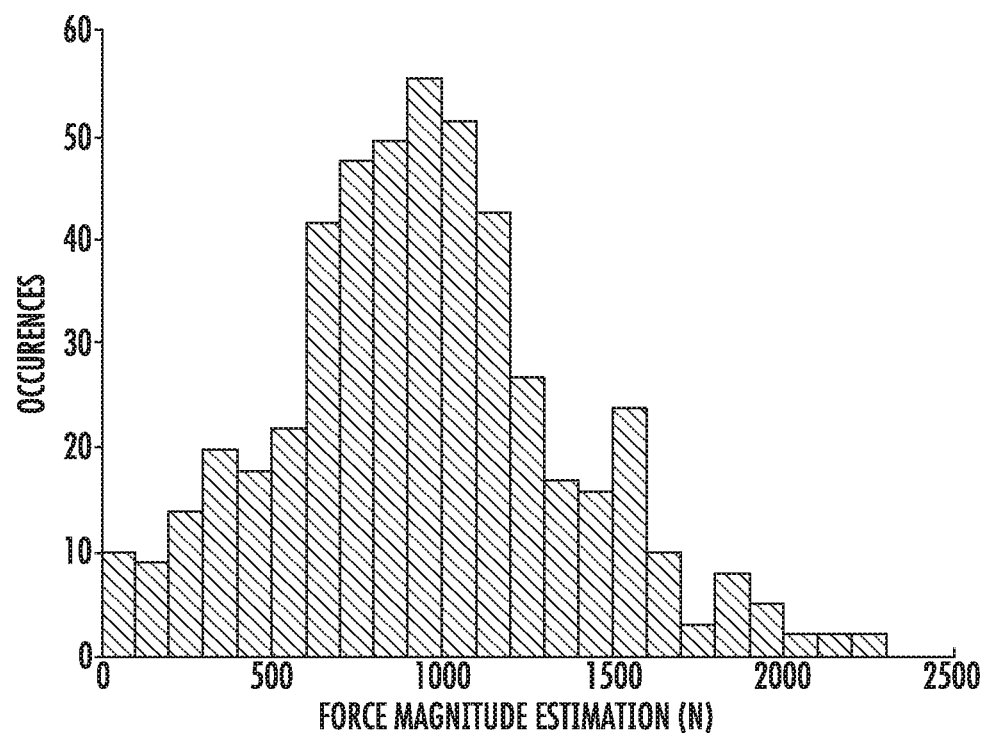
FIG. 48 presents a histogram of force magnitude estimates.

The force estimations center around 900-1000 N (202-225 lb) with a mean of 947.1 N (212.9 lb) and standard deviation of 421.5 N (97.8 lb) (FIG. 48). This test had the heaviest person jumping which the histogram demonstrates with the majority of jumps being higher in magnitude than the other two participants.

EXAMPLE 5

Figure 28:
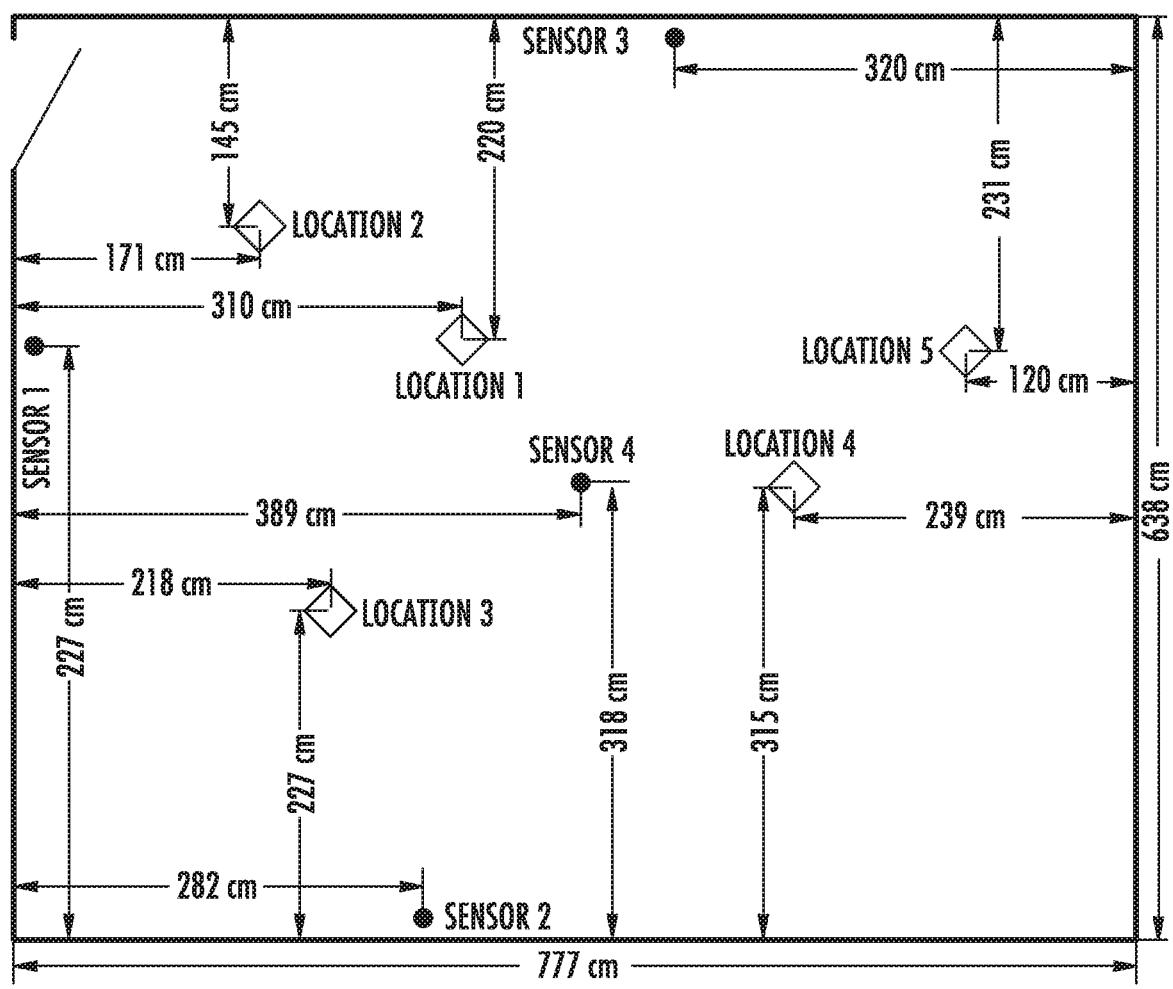
FIG. 28 schematically illustrates the accelerometer layout for concrete floor experiments described herein.

Seventy-five impacts using a PCB® Piezotronics Large-Sledge ICP® Impulse Hammer Model 086D50 with a sensitivity of 0.2305 mV/N (1.025 mV/lb) were performed on the structure of FIG. 28. Results for a single impact on location one are presented below.

Figure 49:
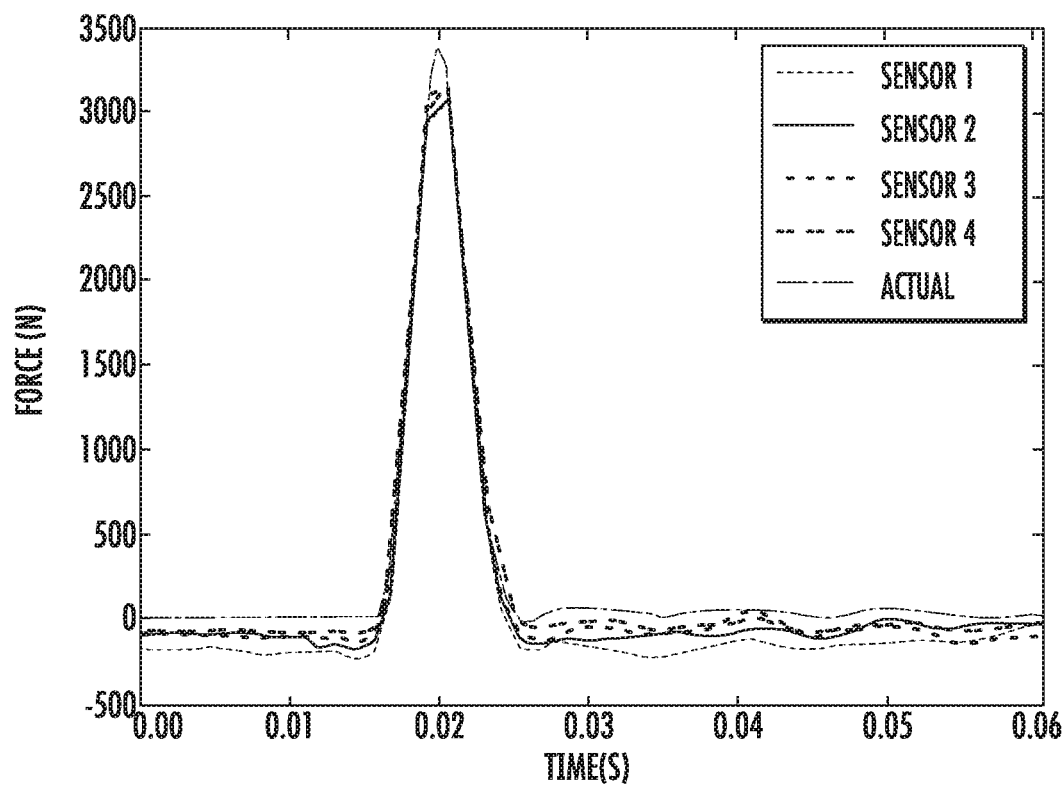
FIG. 49 graphically compares the force estimates obtained from several sensors for a single location within an area with the actual force.

FIG. 49 illustrates the force estimates at location 1 as determined by four sensors and the actual force at location 1.

Figure 50:
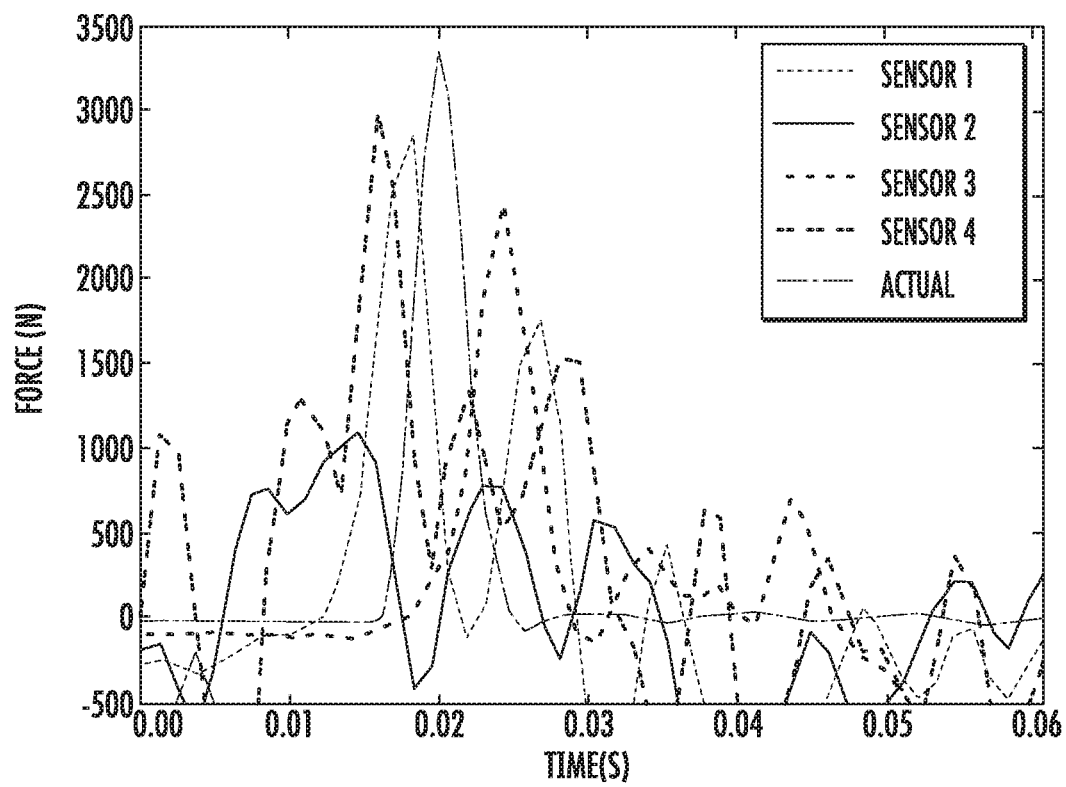
FIG. 50 graphically compares the force estimates obtained from the same sensors for another location within the area with the actual force.

FIG. 50 illustrates the force estimates at location 2 as determined by the same fours sensors as compared to the actual force.

Figure 51:
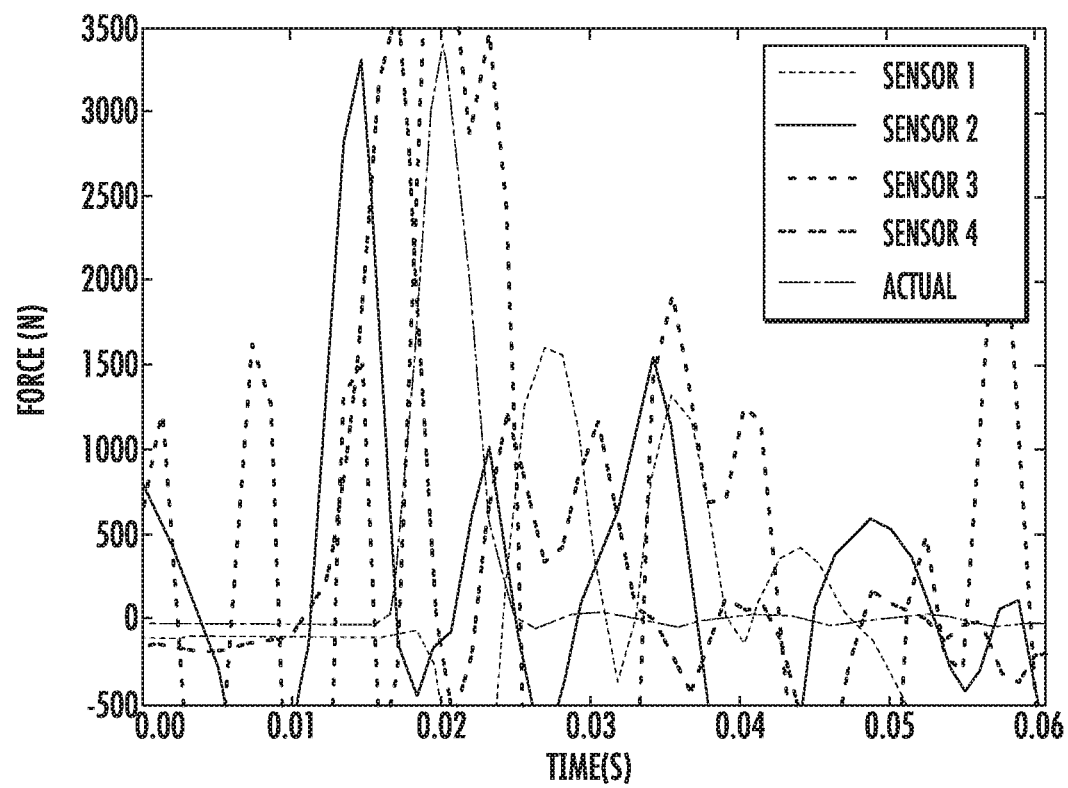
FIG. 51 graphically compares the force estimates obtained from the same sensors for another location within the area with the actual force.

FIG. 51 illustrates the force estimates at location 3 as determined by the same fours sensors as compared to the actual force.

Figure 52:
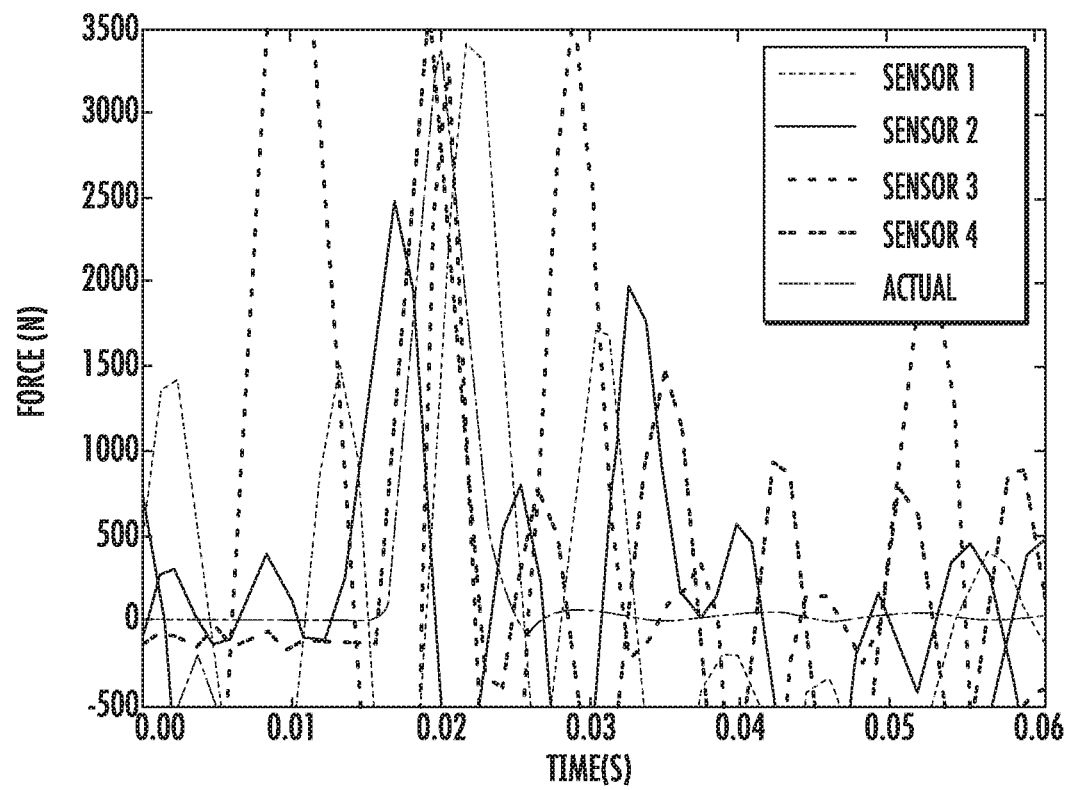
FIG. 52 graphically compares the force estimates obtained from the same sensors for another location within the area with the actual force.

FIG. 52 illustrates the force estimates at location 4 as determined by the same fours sensors as compared to the actual force.

Figure 53:
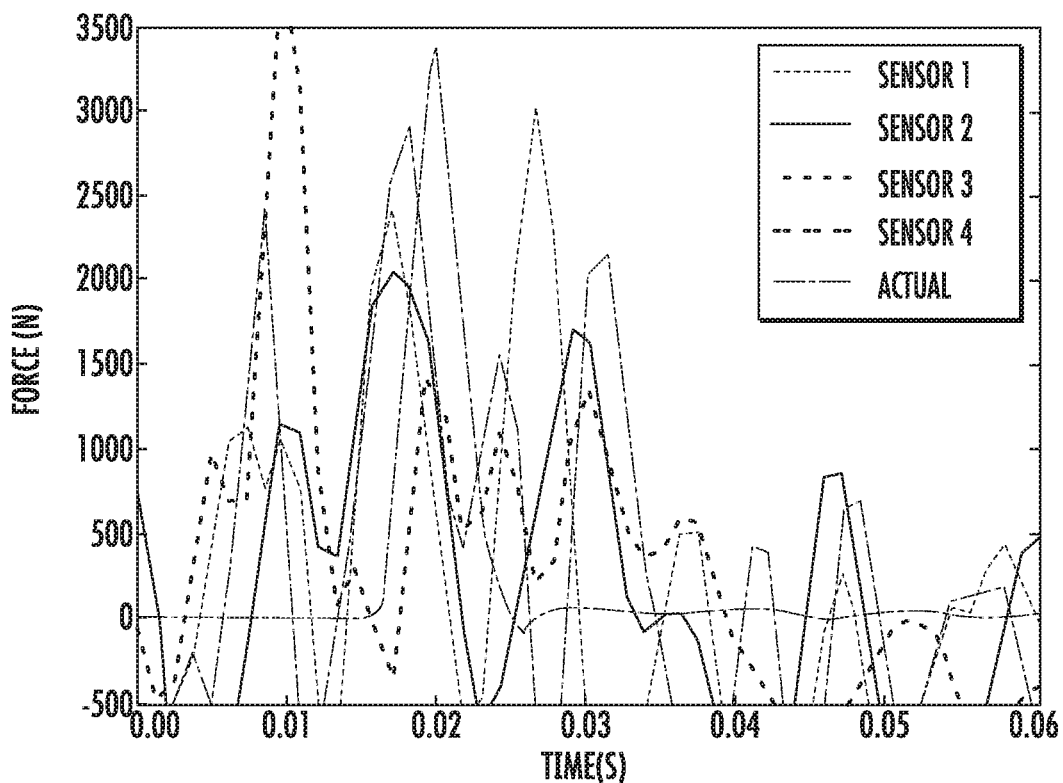
FIG. 53 graphically compares the force estimates obtained from the same sensors for another location within the area with the actual force.

FIG. 53 illustrates the force estimates at location 5 as determined by the same fours sensors as compared to the actual force.

Figure 54:
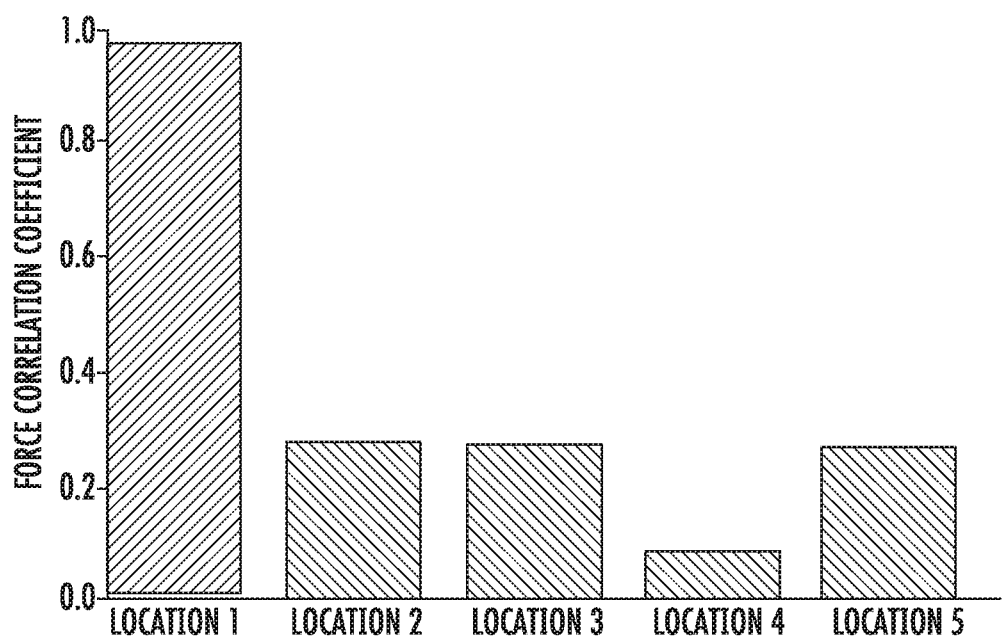
FIG. 54 presents the Correlation Coefficients for an Impact on Location 1 as determined according the disclosed methods.

FIG. 54 presents the Correlation Coefficients for an Impact on Location 1 as determined according the disclosed methods.

Figure 55:
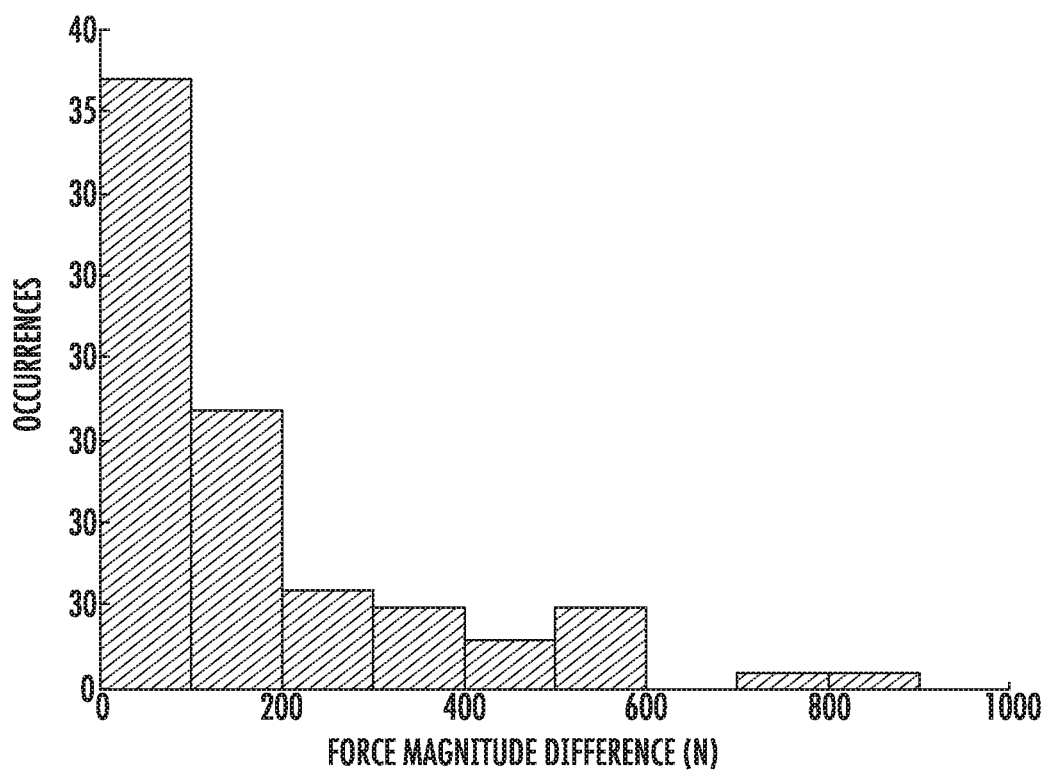
FIG. 55 presents a histogram of the differences between the estimated force magnitudes as determined according to the disclosed methods and actual force magnitudes.
Figure 56:
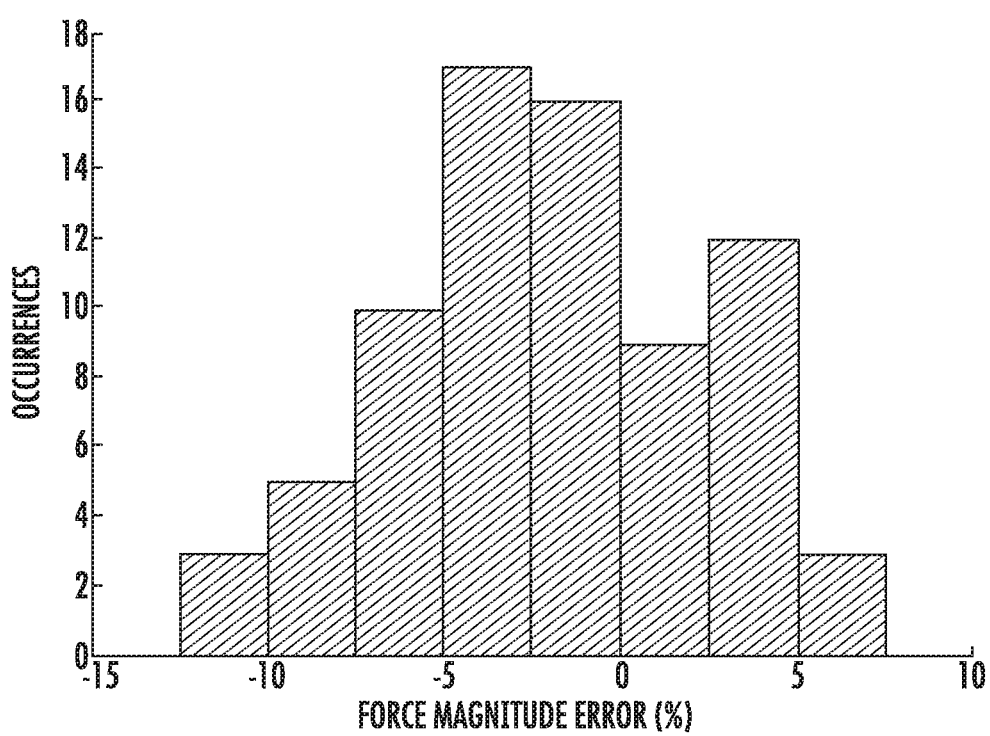
FIG. 56 presents a distribution of force magnitude estimate error.
Figure 57:
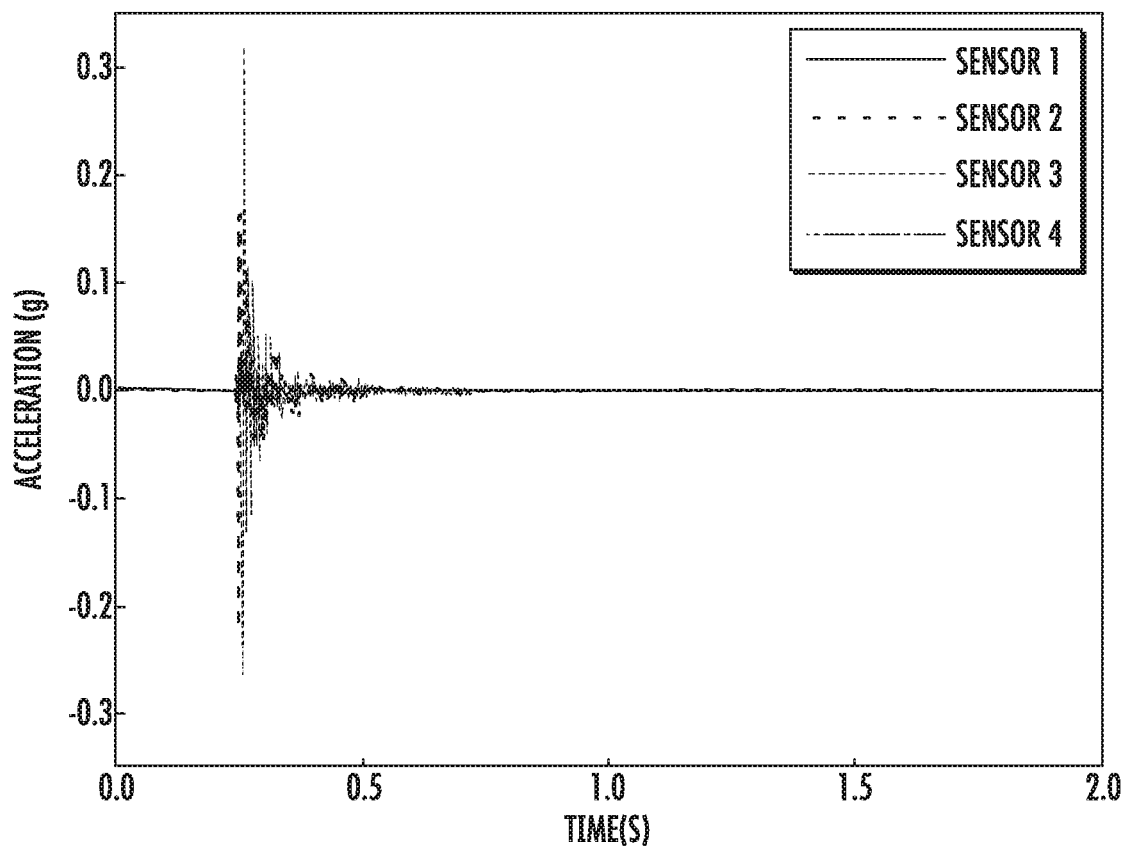
FIG. 57 presents an impact vibrational response at several sensors.

A histogram of the difference between the estimated force magnitudes and those measured with the force hammer are shown in FIG. 55, with a mean of 83.9N (41.3 lb) and a standard deviation of 184.3 N (41.4 lb). The estimates largely tend to be within 200 N (45 lb) of the measured force for each impact, with 72.0% of estimates falling within this range. FIG. 56 displays the distribution of the force magnitude estimate error which has a mean of −2.0% and a standard deviation of 4.4%. This gives a 99% confidence interval for the force magnitude estimate being within −2.0% ±1.3% of the actual force magnitude. An impact plot is presented in FIG. 57 showing the structural vibration response measured by several sensors.

A location confusion matrix was generated (Table 8) to demonstrate the accuracy of the method. Of the 75 hammer impacts, 75 were correctly identified which is a 100.0% success rate.

TABLE 8

|  | | Identified | | | | |
|---|---|---|---|---|---|---|
| Location | | 1 | 2 | 3 | 4 | 5 |
| Actual | 1 | 15 | 0 | 0 | 0 | 0 |
|  | 2 | 0 | 15 | 0 | 0 | 0 |
|  | 3 | 0 | 0 | 15 | 0 | 0 |
|  | 4 | 0 | 0 | 0 | 15 | 0 |
|  | 5 | 0 | 0 | 0 | 0 | 15 |

EXAMPLE 6

All of the results of Example 3, 4 and 5 plus an additional 200 impacts describing a total of 715 impacts of various sorts at each location, with a total of 3,575 impacts (high and low ball drops, three different people jumping, hammer impacts) were combined in the confusion matrix below (Table 9).

TABLE 9

| Location | | Identified | | | | |
|---|---|---|---|---|---|---|
| | | 1 | 2 | 3 | 4 | 5 |
| Actual | 1 | 632 | 12 | 5 | 15 | 51 |
| | 2 | 1 | 713 | 0 | 0 | 1 |
| | 3 | 6 | 4 | 691 | 1 | 13 |
| | 4 | 0 | 2 | 2 | 704 | 7 |
| | 5 | 2 | 5 | 0 | 1 | 707 |

The same data was then examined with a frequency filter used on the collected data. The confusion matrix below (Table 10) provides the results of the event localization when the data were preprocessed. By use of the preprocessing, the accuracy increased from 96.4% to 99.0%.

TABLE 10

| Location | | Identified | | | | |
|---|---|---|---|---|---|---|
| | | 1 | 2 | 3 | 4 | 5 |
| Actual | 1 | 711 | 2 | 0 | 2 | 0 |
| | 2 | 0 | 695 | 0 | 11 | 9 |
| | 3 | 0 | 0 | 709 | 4 | 2 |
| | 4 | 0 | 0 | 1 | 714 | 0 |
| | 5 | 2 | 0 | 0 | 2 | 711 |

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for detecting an impact comprising:
   monitoring a first sensor that is located within or on a structure to detect vibrations within the structure;
   analyzing a first response from the first sensor to determine that the detected vibrations meet or exceed a predetermined first signal threshold value;
   normalizing the first response according to a first transfer function, wherein the first transfer function is a pre-calibrated transfer function that is particular for the first sensor;
   monitoring a second sensor that is located within or on the structure to detect the vibrations within the structure;
   analyzing a second response from the second sensor to determine that the detected vibrations meet or exceed a predetermined second signal value;
   normalizing the second response according to a second transfer function, wherein the second transfer function is a pre-calibrated transfer function that is particular for the second sensor;
   comparing the first and second normalized responses to estimate a first location of an impact to the structure and to estimate a force of the impact to the structure; and
   communicating information regarding the first location and the force thus estimated to a second location, and thereby monitoring from the second location the impact at the first location.

2. The method of claim 1, wherein at least one of the first sensor and the second sensor is an accelerometer.

3. The method of claim 1, wherein the first signal threshold value is a threshold amplitude value.

4. The method of claim 1, wherein one or more additional sensors are monitored for vibrations within the structure, the method further comprising normalizing responses for the one or more additional sensors according to one or more additional transfer functions that are particular to each of the one or more additional sensors.

5. The method of claim 4, wherein the normalized response of the first sensor is used as a reference during a step of comparing the normalized responses of all of the sensors.

6. The method of claim 1, further comprising determining the first transfer function and the second transfer function in a calibration process.

7. The method of claim 6, wherein the first transfer function is the average of a third transfer function and a fourth transfer function.

8. The method of claim 7, wherein the third transfer function is $$T_{xy}(f) = \frac{P_{xy}(f)}{P_{xx}(f)}$$

in which
   x is a force input to the first sensor,
   y is an output of the first sensor,
   $T_{xy}(f)$ is the first transfer function of x to y,
   $P_{xy}(f)$ is a cross power spectral density of x to y, and
   $P_{xx}(f)$ is the power spectral density of x.

9. The method of claim 7, in which the fourth transfer function is $$T_{yx}(f) = \frac{P_{yy}(f)}{P_{yx}(f)}$$

in which
   x is a force input to the first sensor,
   y is an output of the first sensor,
   $T_{yx}(f)$ is the transfer function of y to x,
   $P_{yx}(f)$ is the cross power spectral density of y to x, and
   $P_{yy}(f)$ is the power spectral density of y.

10. The method of claim 6, wherein the second transfer is the average of a fifth transfer function and a sixth transfer function.

11. The method of claim 1, wherein the first location of the impact is estimated prior to the estimation of the force of the impact.

12. The method of claim 1, wherein the force of the impact is estimated prior to the estimation of the first location of the impact.

13. The method of claim 1, wherein the steps of normalizing the first response according to the first transfer function and normalizing the second response according to the second transfer function comprise formation of a normalized correlation coefficient matrix.

14. The method of claim 13, further comprising comparing the normalized correlation coefficients of the matrix by location.

15. The method of claim 1, wherein the structure is a building, a bridge, a vehicle, a sidewalk, or a road.

16. The method of claim 1, wherein the structure comprises one or more rooms, the first sensor and the second sensor each being independently located within or on a wall, a floor, or a ceiling of the one or more rooms.

17. A system for detecting an impact within or on a structure comprising:
two or more sensors, each configured for placement within or on the structure;
a controller configured for communication with the sensors, the controller comprising at least one processor configured to process responses of the sensors and thereby estimate a location and a force of an impact to the structure, the at least one processor including at least one memory containing a first transfer function and a second transfer function, wherein the first transfer function is a pre-calibrated transfer function that is particular for the first sensor and the second transfer function is a pre-calibrated transfer function that is particular for the second sensor, the controller being configured to communicate data with regard to the location and the force of the impact thus estimated to a second location, the system thereby monitoring from the second location the impact at the first location.

18. The system of claim 17, wherein at least one of the sensors is an accelerometer.

19. The system of claim 17, wherein the structure is a building, a bridge, a vehicle, a sidewalk, or a road.

20. The system of claim 17, wherein the structure comprises one or more rooms, the first sensor and the second sensor each being independently located within or on a wall, a floor, or a ceiling of the one or more rooms.

21. The system of claim 17, wherein the controller comprises multiple processors, each sensor incorporating one of the processors.

22. The system of claim 17, further comprising a user identification system.

23. The system of claim 17, wherein the controller is configured for wireless communication with the sensors.

24. The system of claim 17, wherein the controller is configured for wireless communication with the second location.

* * * * *